US012220716B2

(12) United States Patent
Quinn et al.

(10) Patent No.: US 12,220,716 B2
(45) Date of Patent: Feb. 11, 2025

(54) METHOD OF REDUCING WATER FLOW THROUGH A SHOWERHEAD

(71) Applicant: WATER PIK, INC., Fort Collins, CO (US)

(72) Inventors: Michael J. Quinn, Windsor, CO (US); Preston Peterson, Loveland, CO (US); Craig Rogers, Fort Collins, CO (US)

(73) Assignee: WATER PIK, INC., Fort Collins, CO (US)

( * ) Notice: Subject to any disclaimer, the term of this patent is extended or adjusted under 35 U.S.C. 154(b) by 208 days.

(21) Appl. No.: 17/672,202

(22) Filed: Feb. 15, 2022

(65) Prior Publication Data

US 2022/0168758 A1 Jun. 2, 2022

Related U.S. Application Data

(62) Division of application No. 16/188,916, filed on Nov. 13, 2018, now Pat. No. 11,278,919.

(60) Provisional application No. 62/699,553, filed on Jul. 17, 2018, provisional application No. 62/585,456, filed on Nov. 13, 2017.

(51) Int. Cl.

| | |
|---|---|
| ***B05B 1/18*** | (2006.01) |
| ***B05B 1/08*** | (2006.01) |
| ***B05B 1/16*** | (2006.01) |
| ***B05B 3/04*** | (2006.01) |
| ***B05B 3/16*** | (2006.01) |

(52) U.S. Cl.

CPC .............. *B05B 1/185* (2013.01); *B05B 1/083* (2013.01); *B05B 1/1636* (2013.01); *B05B 1/1663* (2013.01); *B05B 3/04* (2013.01); *B05B 3/16* (2013.01); *B05B 1/169* (2013.01)

(58) Field of Classification Search

CPC ....... B05B 1/185; B05B 1/082; B05B 1/1636; B05B 1/1663; B05B 3/04; B05B 3/16; B05B 1/169

USPC ........ 239/380–383, 443–446, 525, 548, 552, 239/562, 443–449

See application file for complete search history.

(56) References Cited

U.S. PATENT DOCUMENTS

| | | | | |
|---|---|---|---|---|
| 3,762,648 A | 10/1973 | Deines | B05B 1/1636 239/381 |
| 3,801,019 A | 4/1974 | Trenary | B05B 1/1636 239/381 |
| 4,190,207 A | 2/1980 | Fienhold | B05B 1/18 239/381 |
| 7,111,795 B2 * | 9/2006 | Thong | B05B 1/18 239/443 |

(Continued)

FOREIGN PATENT DOCUMENTS

| | | | |
|---|---|---|---|
| CN | 101288860 | 10/2008 | |
| CN | 201940296 | 8/2011 | B05B 1/18 |

(Continued)

OTHER PUBLICATIONS

U.S. Appl. No. 16/188,916, filed Nov. 13, 2018.

(Continued)

*Primary Examiner* — Steven J Ganey

(57) ABSTRACT

A method of reducing water flow through a showerhead. The method may include dividing a water stream into two separate water groups and alternating the flow of water through the two separate water groups to reduce water flow through the showerhead.

13 Claims, 46 Drawing Sheets

(56) References Cited

U.S. PATENT DOCUMENTS

| | | | | |
|---|---|---|---|---|
| 7,303,151 | B2 * | 12/2007 | Wu | B05B 1/18 239/443 |
| 7,374,112 | B1 | 5/2008 | Bulan et al. | |
| 7,740,186 | B2 | 6/2010 | Macan et al. | |
| 7,766,260 | B2 * | 8/2010 | Lin | B05B 1/1618 239/448 |
| 8,915,455 | B2 * | 12/2014 | Zhou | B05B 1/18 239/443 |
| 8,967,497 | B2 * | 3/2015 | Luettgen | B05B 1/185 239/449 |
| 9,404,243 | B2 | 8/2016 | Cacka et al. | |
| 2001/0008256 | A1 * | 7/2001 | Marsh | B05B 1/1645 239/447 |
| 2008/0115841 | A1 | 5/2008 | Ruhnke | G05D 7/012 137/492.5 |
| 2011/0073678 | A1 | 3/2011 | Qiu | B05B 1/1654 239/451 |
| 2014/0367482 | A1 | 12/2014 | Cacka | E03C 1/0409 239/11 |
| 2015/0343463 | A1 | 12/2015 | Chan | B05B 3/04 239/447 |
| 2016/0221006 | A1 | 8/2016 | Lin et al. | |
| 2016/0296950 | A1 | 10/2016 | Tian | B05B 1/18 |
| 2017/0297039 | A1 | 10/2017 | Cacka et al. | |

FOREIGN PATENT DOCUMENTS

| | | |
|---|---|---|
| CN | 201940296 U | 8/2011 |
| CN | 203944484 | 11/2014 |
| CN | 105983492 | 10/2016 |
| WO | 2019094911 A1 | 5/2019 |

OTHER PUBLICATIONS

"PCT International Search Report" mailed Feb. 21, 2019, in PCT Application No. PCT/US2018/060691, 3 pages.
"PCT Written Opinion" issued Feb. 21, 2019, in PCT Application No. PCT/US2018/060691, 7 pages.

* cited by examiner

METHOD OF REDUCING WATER FLOW THROUGH A SHOWERHEAD

CROSS-REFERENCE TO RELATED APPLICATIONS

This application is a divisional application of U.S. patent application Ser. No. 16/188,916, filed 13 Nov. 2018 and entitled "Showerhead with Remote Porting," which claims the benefit of priority under 35 U.S.C. § 119(e) of the earlier filing date of U.S. Provisional Patent Application No. 62/585,456 filed 13 Nov. 2017 and entitled "Showerhead with Alternating Full Body Flow," and also claims the benefit of priority under 35 U.S.C. § 119(e) of the earlier filing date of U.S. Provisional Patent Application No. 62/699,553 filed 17 Jul. 2018 and entitled "Showerhead with Remote Porting," all of which are hereby incorporated by reference herein in their entireties.

TECHNICAL FIELD

The technology disclosed herein relates generally to showerheads, and more specifically to pulsating showerheads.

BACKGROUND

Showers provide an alternative to bathing in a bathtub. Generally, showerheads are used to direct water from the home water supply onto a user for personal hygiene purposes.

In the past, bathing was the overwhelmingly popular choice for personal cleansing. However, in recent years showers have become increasingly popular for several reasons. First, showers generally take less time than baths. Second, showers generally use significantly less water than baths. Third, shower stalls and bathtubs with showerheads are typically easier to maintain. Fourth, showers tend to cause less soap scum build-up. Fifth, by showering, a bather does not sit in dirty water—the dirty water is constantly rinsed away.

With the increase in popularity of showers has come an increase in showerhead design and manufacturing as well as an increase in regulation. As regulations on water use are constrained further and further, designers may opt to reduce the number of nozzles in order to maintain high velocity water streams. Additionally or alternatively, designers may decrease the diameter of the nozzles to decrease water flow. Reducing the number of nozzles in a showerhead can make the spray pattern sparse. Decreasing the diameter of the nozzles can make the water streams feel "stingy" and uncomfortable for a user.

The information included in this Background section of the specification is included for technical reference purposes only and is not to be regarded subject matter by which the scope of the present disclosure is to be bound.

SUMMARY

The present disclosure provides a showerhead. The showerhead may include a first group of nozzles and a second group of nozzles, a first plenum in fluid communication with the first group of nozzles, a second plenum in fluid communication with the second group of nozzles, and a water direction assembly in fluid communication with the first plenum, the second plenum, and a fluid inlet. The water direction assembly may alternatingly fluidly connect the first plenum and the second plenum with the fluid inlet.

Another embodiment of the present disclosure includes a showerhead. The showerhead may include a faceplate, a first bank of nozzles distributed along the faceplate, a second bank of nozzles distributed along the faceplate amongst the first bank of nozzles, a turbine, a cam eccentrically coupled to the turbine, and a shutter coupled to the cam such that eccentric movement of the cam oscillates the shutter to alternatingly fluidly connect the first and second banks of nozzles with a fluid inlet.

Another embodiment of the present disclosure includes a method of reducing water flow through a showerhead. The method may include dividing a water stream into two separate water groups and alternating the flow of water through the two separate water groups to reduce water flow through the showerhead.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present disclosure as defined in the claims is provided in the following written description of various embodiments of the claimed subject matter and illustrated in the accompanying drawings.

DETAILED DESCRIPTION

Figure 1:
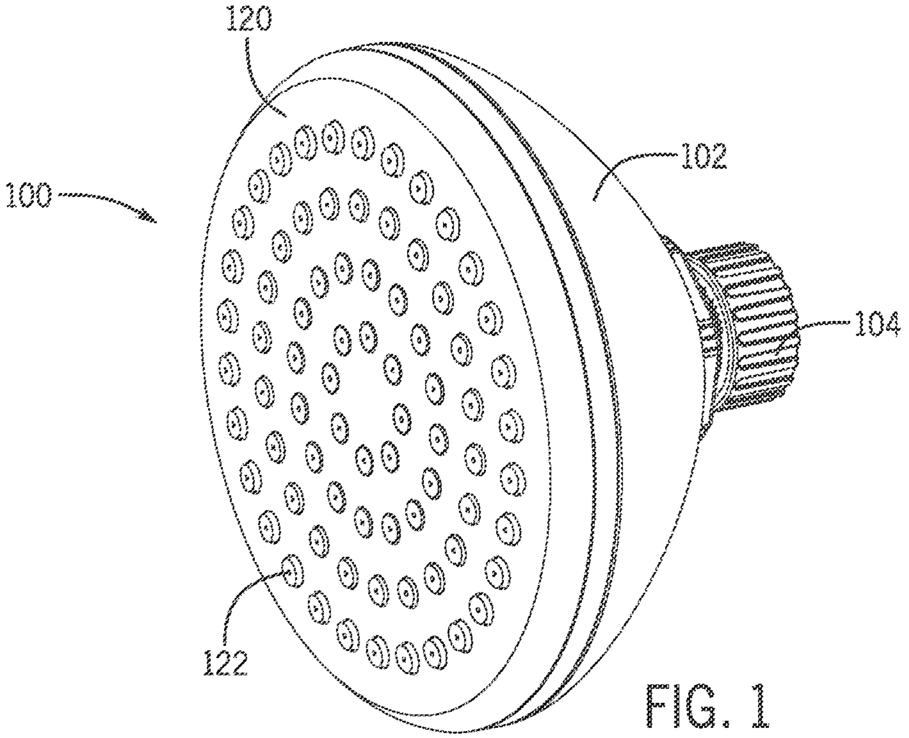
FIG. 1 is an isometric view of a showerhead according to the present disclosure.

The present disclosure relates to a showerhead arranged to time share water distribution across two or more water groups without a noticeable effect to a user. In one example, the showerhead divides a water stream into two separate water groups for time sharing distribution of water across the showerhead. For example, each water group may be associated with a plurality of nozzles distributed across the face of the showerhead. To limit the noticeable effect to a user of time sharing water distribution across two or more water groups, the nozzles of the various water groups are interspersed amongst one another across the showerhead. For example, the nozzles of the various water groups may be spread evenly across the face of the showerhead amongst one another, such as in an alternating or other systematic pattern. In such examples, the showerhead includes porting to distribute water away from the initial time sharing distribution location and to the various nozzles across the showerhead. For instance, the water stream may be divided into the various water groups at a central location within the showerhead, such as adjacent a fluid inlet. Once divided initially, the different water groups are ported within the showerhead and ultimately distributed to the various nozzles across the showerhead. This allows nozzles for any particular "mode" or group to be distributed at various locations around the showerhead and not limited to a specific location.

By time sharing the water to be distributed to a user at any given point in time, the showerhead can limit the amount of fluid flow exiting the nozzles, without a substantial reduction in pressure as experienced by a user. For example, half of the nozzles across the face of the showerhead may expel the total volume of water delivered to the showerhead engine at a first point in time and then the remaining half of the nozzles across the face of the showerhead may expel the total volume of water delivered to the showerhead engine at a second point of time. In this example, the two sets of nozzles may be intermixed together across the face of the showerhead, so as to deliver the water pulses across the face. In this manner, the pressure of the expelled water may be higher than if the entire volume of water was delivered simultaneously across all of the nozzles. This allows the user to experience an increased pressure, but with a reduced water volume being used.

This operation allows the showerhead to meet ever increasing flow restriction regulations while maintaining substantially the same or similar water stream velocity of previous designs. Additionally, the showerhead can satisfy increasing flow restriction regulations while maintaining the same or similar nozzle diameters of previous designs. In this manner, the showerhead may limit fluid flow therethrough without a noticeable effect by a user. In other words, the showerhead can substantially reduce flow while also providing the same or similar fluid flow feel and coverage of conventional showerheads using a much larger flow volume.

In one example, the showerhead may separate water into two or more separate water groups, chambers, or plenums each connected to a plurality of nozzles. In such examples, the showerhead may include a pulsating, intermittent, or oscillating spray pattern. The pulsating, intermittent, or oscillating spray pattern may be produced by a water direction assembly. Depending on the particular application, the water direction assembly may include a turbine and a shutter operably coupled thereto. In one embodiment, the turbine defines one or more cams or cam surfaces. The shutter, which may be restrained in certain directions, follows the movement of the cam to create the intermittent spray effect by alternatingly fluidly connecting the separate groups of outlet nozzles with a fluid inlet.

In instances where the time divided water is distributed to a plenum or chamber, the pulsating effect may be minimized, depending on the size of the outlet nozzles. For example, after the first batch of water is delivered to the first chamber from the division or oscillating engine, the first batch of water exits the chamber through the various outlet nozzles. In instances where the outlet nozzles have a relative small diameter, as compared to the inlet ports, the first batch of water exits from the chamber slower than it was distributed into the chamber. As such, as the division engine distributes the second batch of water into the chamber, the second batch of water exerts a force on the first batch of water to help push it through the outlet nozzles. This forcing effect, helps to smooth out the nozzle steams and may eliminate or reduce the "pulse" effect of the water.

In operation, water flowing through the showerhead causes the turbine to spin. As the turbine spins, the cam moves (e.g., rotates) causing the shutter to oscillate. In examples where the shutter movement is constrained in one or more directions, the shutter may move in a reciprocal motion, such as in a back and forth motion, rather than in a continuous motion. The reciprocal motion allows the shutter to alternatingly fluidly connect the fluid inlet with first and second groups of nozzles. For example, when the first group of nozzles are fluidly connected with the fluid inlet, the second group of nozzle is fluidly disconnected from the fluid inlet. As the shutter reciprocates, the shutter moves to fluidly connect the second group of nozzles with the fluid inlet at the same time that the first group of nozzles is fluidly disconnected from the fluid inlet. Depending on the particular application, the nozzles in both groups may not be open or "on" at the same time. In particular, nozzles from the first group of nozzles may be closed while nozzles from the second group of nozzles are open, and vice versa. In some embodiments, the first group of nozzles may progressively open as the second group of nozzles progressively close, and vice versa.

Unlike conventional massage mode configurations that output a narrow pulsating stream, in the embodiments herein, the water can be spread across spatially separated nozzles to deliver a full body spray pattern, e.g., nozzles that extend across the face of the showerhead. Thus, the showerhead may be able to conserve more water than conventional showerheads, while still avoiding a decrease in force performance while also maintaining a comfortable fluid flow feel to a user, as explained more fully below.

Turning to the figures, illustrative embodiments of the present disclosure will now be discussed in more detail. FIG. 1 is an isometric view of a showerhead 100. Referring to FIG. 1, the showerhead 100 includes a housing 102 and a fluid inlet 104 for receiving water from a fluid source, such as a hose, a J-pipe, or the like. In some embodiments, the showerhead 100 may include a fluid conduit 106 (see FIG. 3) to deliver water from the fluid inlet 104 to within the housing 102 of the showerhead 100. Depending on the water source, the fluid inlet 104 may include threading or another connection mechanism operable to secure the showerhead 100 to the fluid source. Though FIG. 1 illustrates the showerhead 100 as a fixed or wall mount showerhead, in some embodiments the showerhead 100 may be a handheld showerhead including a handle. In such embodiments, the fluid inlet 104 may be defined on the handle, such as at a terminal end of the handle. Depending on the particular application, the handle may be configured to be held comfortably in a user's hand. For example, the handle may be an elongated member having a generally circular cross section sized to fit comfortably in a user's hand.

As shown in FIG. 1, the showerhead 100 includes a faceplate 120 through which a plurality of outlet nozzles 122 extends. As explained more fully below, water flows through the showerhead 100 (such as through the housing 102 of the showerhead 100) from the fluid inlet 104 and out the nozzles 122. The nozzles 122 may be arranged in substantially any suitable manner. For example, the nozzles 122 may have a cylindrical or frustoconical shape, among others. In some embodiments, the nozzles 122 may extend a distance away from the faceplate 120, though other configurations are contemplated, including embodiments where the nozzles 122 sit substantially flush with or are recessed a depth within the faceplate 120, to provide a desired aesthetic and/or functional characteristic. To allow flow of fluid therethrough and provide a desired water stream characteristic, each nozzle includes a nozzle diameter, which in some embodiments is about 0.030 inches. The nozzle diameters, either collectively across all nozzles 122 or selectively to particular groups of nozzles 122, may be varied to provide a desired fluid flow characteristic of the showerhead 100. For example, decreasing the diameters of the nozzles 122 may increase the velocity of the water jets to provide a more powerful sensation to a user. In like manner, increasing the diameters of the nozzles 122 may decrease the velocity of the water jets to provide a more soothing sensation to a user.

Figure 2:
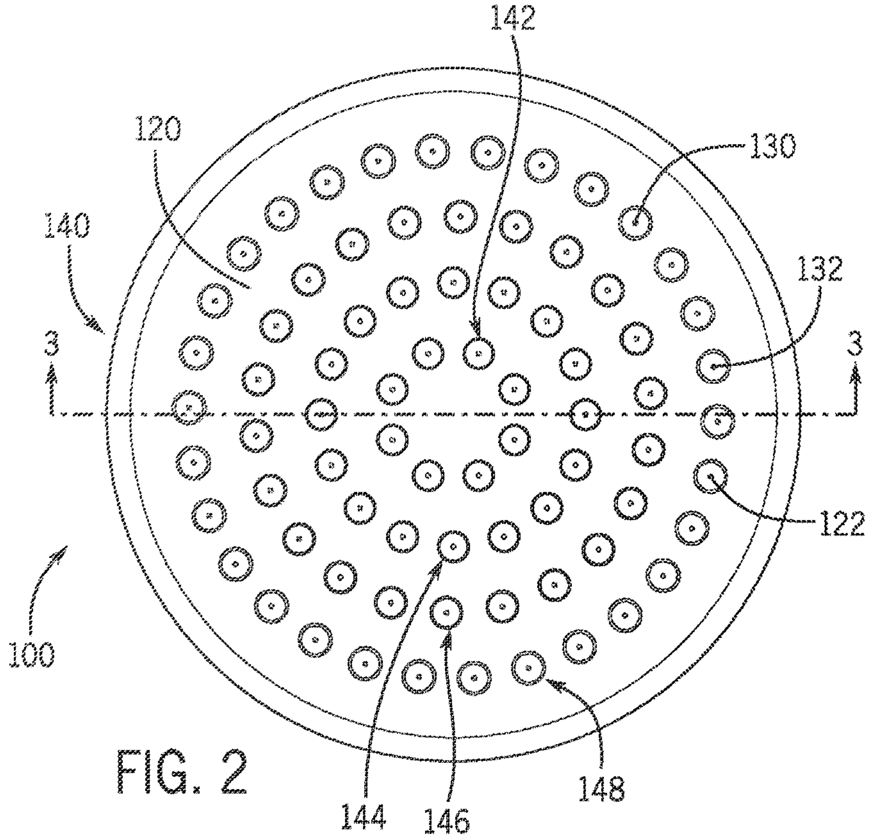
FIG. 2 is an end view of the showerhead of FIG. 1.

FIG. 2 is an end view of the showerhead 100. With reference to FIG. 2, the plurality of outlet nozzles 122 may be arranged in nozzle subsets or groups, such as in a first bank of nozzles 130 and in a second bank of nozzles 132. As shown, the first bank of nozzles 130 is distributed along the faceplate 120, such as evenly along the faceplate 120. Similarly, the second bank of nozzles 132 is distributed along the faceplate 120, such as evenly along the faceplate 120. In some embodiments, the second bank of nozzles 132 may be distributed along the faceplate 120 amongst the first bank of nozzles 130, or vice versa. For example, as shown in FIG. 2, the second bank of nozzles 132 may be distributed evenly amongst the first bank of nozzles 130, such as in an alternating fashion. In this manner, the showerhead 100 may time share water distribution across the faceplate 120 to limit the noticeable effect to a user, whereas some conventional showerheads focus or concentrate a divided water flow through a small number of nozzles and/or only within a concentrated area of the faceplate 120. Also, some conventional showerheads distribute a divided water stream through nozzles with decreased nozzle diameters, whereas the first and second banks of nozzles 130, 132 may include industry standard nozzle diameters associated with full body spray patterns.

In some embodiments, the first bank of nozzles 130 and the second bank of nozzles 132 may include the same number of nozzles. For example, in the illustrative embodiment of FIG. 2, each of the first bank of nozzles 130 and the second bank of nozzles 132 includes thirty-eight nozzles, though other configurations are contemplated including more than thirty-eight nozzles or less than thirty-eight nozzles each. In like manner, the nozzles 122 of the first and second banks of nozzles 130, 132 may include the same nozzle diameter.

The faceplate 120 may distribute the first bank of nozzles 130 and the second bank of nozzles 132 therealong. For instance, the faceplate 120 may include a plurality of nozzle rows 140 (e.g., three nozzle rows 140, four nozzle rows 140, five nozzle rows 140, etc.). In one embodiment, the nozzle rows 140 may be spaced radially from one another along the faceplate 120, such as radially equidistant from adjacent nozzle rows 140. For example, the nozzle rows 140 may be formed in concentric rings surrounding the center of the faceplate 120. Depending on the particular application, each nozzle row may include an equal number of nozzles 122 from the first and second banks of nozzles 130, 132. For example, a first nozzle row 142 may include four nozzles 122 from each of the first bank of nozzles 130 and the second bank of nozzles 132. A second nozzle row 144 may include eight nozzles 122 from each of the first bank of nozzles 130 and the second bank of nozzles 132. A third nozzle row 146 may include eleven nozzles 122 from each of the first bank of nozzles 130 and the second bank of nozzles 132. A fourth nozzle row 148 may include fifteen nozzles 122 from each of the first bank of nozzles 130 and the second bank of nozzles 132. The examples above are for illustrative purposes only and the showerhead 100 may include any other suitable configuration.

As explained in more detail below, each nozzle group or bank (or a set of nozzle groups or banks) may be associated with a different mode for the showerhead 100. For example, a first nozzle group (such as the first and second banks of nozzles 130, 132) may be associated with a first mode (e.g., a full body spray mode) of the showerhead 100, a second nozzle group may be associated with a second mode (e.g., a massage mode) of the showerhead 100, and a third nozzle group may be associated with a third mode (e.g., a concentrated spray mode) of the showerhead 100. In some embodiments, a fourth nozzle group may be associated with a fourth mode (e.g., a mist mode) of the showerhead 100. In such embodiments, the showerhead 100 may include a mode selection assembly 150 (see FIGS. 15 and 18) allowing a user to select the desired operating mode of the showerhead 100, as explained further below.

Figure 3:
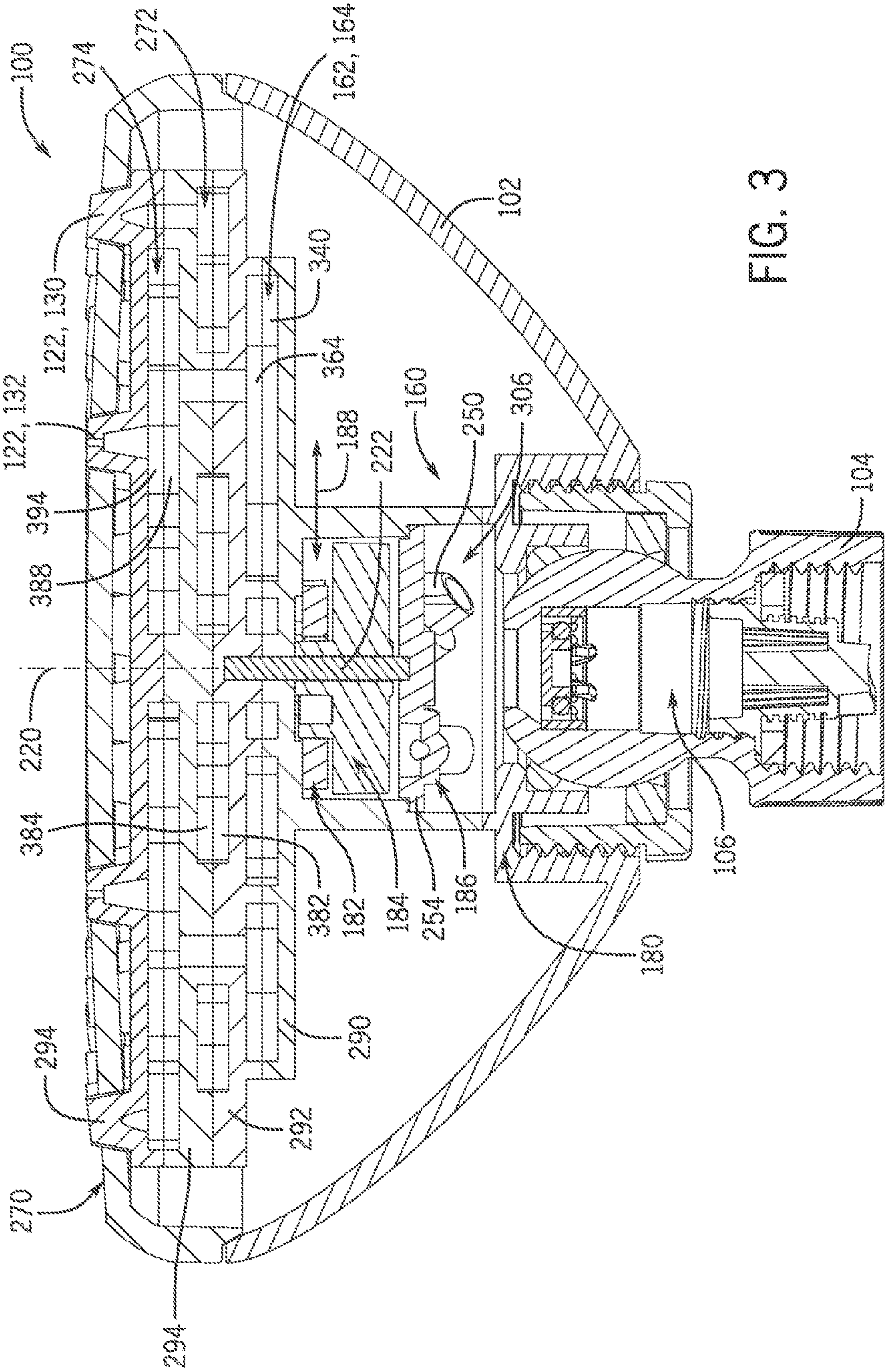
FIG. 3 is a cross-sectional view of the showerhead of FIG. 1 taken along line 3-3 in FIG. 2.
Figure 4:
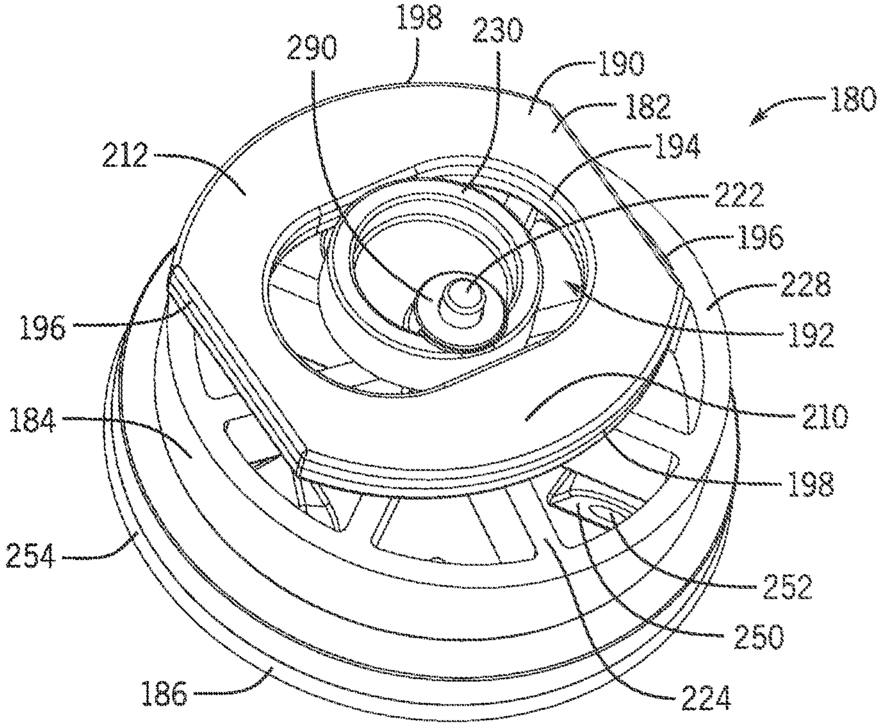
FIG. 4 is an isometric view of a water direction assembly according to the present disclosure.
Figure 5:
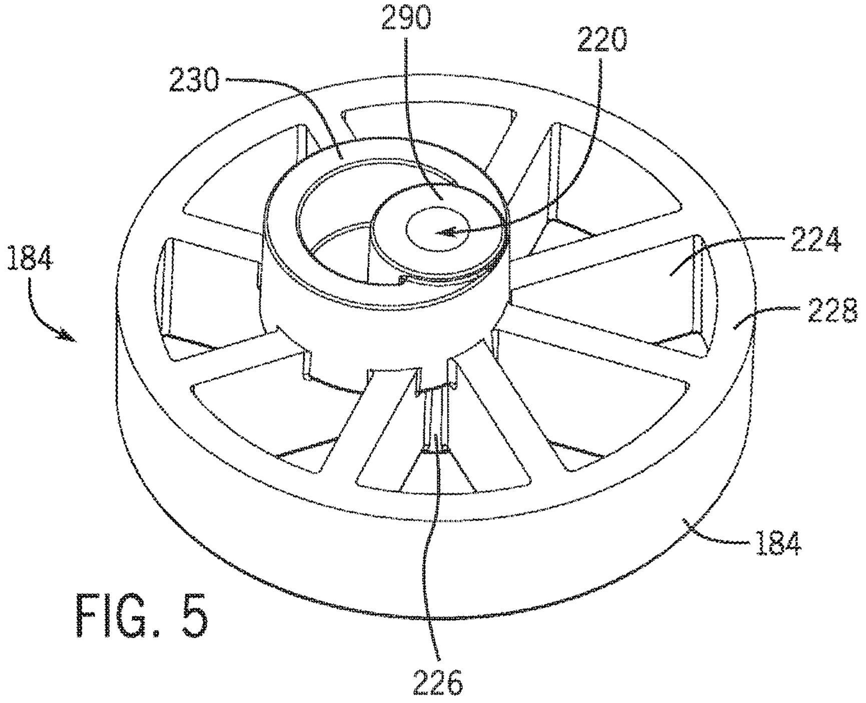
FIG. 5 is an isometric view of a turbine of the water direction assembly of FIG. 4.

FIG. 3 is a cross-sectional view of the showerhead 100. FIG. 4 is an isometric view of a water direction assembly arranged to alternatingly fluidly connect the fluid inlet 104 with the first and second banks of nozzles 130, 132. FIG. 5 is an isometric view of a turbine of the water direction assembly. Referring to FIG. 3, the housing 102 may define a chamber 160 in fluid communication with the fluid inlet 104. The chamber 160 may also be in fluid communication with the outlet nozzles 122. In such embodiments, fluid flows through the chamber 160 between the fluid inlet 104 and the outlet nozzles 122. A first plenum 162 may be defined within the chamber 160. A second plenum 164 may also be defined within the chamber 160. The first and second plenums 162, 164, which may be referred to as plenum chambers, may be operable to deliver water across the faceplate 120 of the showerhead 100. For example, the first bank of nozzles 130 may be in fluid connection, either directly or indirectly, with the first plenum 162 such that water flowing through the first plenum 162 is delivered across the faceplate 120 through the first bank of nozzles 130, as explained below. In some embodiments, the first plenum 162 may distribute water equally to the first bank of nozzles 130. For example, the first plenum 162 may be sized and shaped to distribute water pressure evenly across the first bank of nozzles 130. In this manner, each nozzle within the first bank of nozzles 130 may have a substantially equal nozzle velocity.

The second plenum 164 may be configured similarly to the first plenum 162. For example, the second bank of nozzles 132 may be in fluid connection, either directly or indirectly, with the second plenum 164 such that water flowing through the second plenum 164 is delivered across the faceplate 120 through the second bank of nozzles 132. Like the first plenum 162, the second plenum 164 may distribute water equally to the second bank of nozzles 132. For example, the second plenum 164 may be sized and shaped to distribute water pressure evenly across the second bank of nozzles 132. In this manner, each nozzle within the second bank of nozzles 132 may have a substantially equal nozzle velocity, which may be similar to or different from the nozzle velocity of each nozzle of the first bank of nozzles 130.

In some embodiments, the first and second plenums 162, 164 may be operable to deliver water across the faceplate 120 at alternating times. For example, as explained in more detail below, the showerhead 100 may alternate the flow of fluid through the first and second plenums 162, 164 to time share fluid flow through the showerhead 100. As such, the showerhead 100 may include a relative high number of nozzles 122 without decreasing the nozzle diameter and/or the nozzle velocity to meet ever increasing flow restriction requirements. For example, by time sharing the water across different water or nozzle groups (e.g., across the first and second plenums 162, 164 and the corresponding first and second banks of nozzles 130, 132), the showerhead 100 may include a relatively full spray head without sacrificing the "feel" of the showerhead 100 to a user, which sometimes occurs in other designs limiting fluid flow through a showerhead.

With continued reference to FIG. 3, the showerhead 100 includes a water direction or division assembly 180 arranged to alternatingly fluidly connect the first and second plenums 162, 164 with the fluid inlet 104. The water direction assembly 180 may be received at least partially within the chamber 160, such as between the fluid inlet 104 and the first and second plenums 162, 164. The water direction assembly 180 may include a shutter 182, a turbine 184, a jet plate 186, or any combination thereof. The shutter 182, the turbine 184, and the jet plate 186 may be configured similarly to similar components disclosed in U.S. Pat. No. 9,404,243 B2, the disclosure of which is hereby incorporated in its entirety, for all purposes. Each of these components will be discussed in turn below.

The shutter 182 may alternatingly fluidly connect the first and second plenums 162, 164, and therefore the first and second banks of nozzles 130, 132, with the fluid inlet 104. For example, the shutter 182, which may be referred to alternatively as a shoe, may move between a first position fluidly connecting the first plenum 162 with the fluid inlet 104, and a second position fluidly connecting the second plenum 164 with the fluid inlet 104. In some embodiments, the shutter 182 may oscillate between the first and second positions to alternatingly fluidly connect the first and second plenums 162, 164 with the fluid inlet 104. The shutter 182 may move (or oscillate) between the first and second positions in substantially any manner. For example, the shutter 182 may rotate between the first and second positions in some embodiments. In other embodiments, the shutter 182 may oscillate axially along an axis (e.g., along a first axis 188) between the first and second positions, as explained below.

The shutter 182 may be sized and shaped in substantially any manner capable of alternatingly fluidly connecting the first and second plenums 162, 164 with the fluid inlet 104. In one embodiment, illustrated in FIG. 4, the shutter 182 may include a shutter body 190 having a cam aperture 192 defined therethrough. The cam aperture 192 may be a generally oval-shaped aperture defined by an interior sidewall 194 of the shutter body 190. As explained below, the shutter 182 may be caused to oscillate between the first and second positions via engagement of another element of the water direction assembly 180 (e.g., the turbine 184) with the interior sidewall 194. For example, at least a portion of the turbine 184 may slidably or rollably engage the interior sidewall 194 to move the shutter 182 between the first and second positions.

In some embodiments, the shutter 182 may include opposing constraining edges 196 formed at opposite sides of the shutter body 190, and opposing sealing edges 198 formed at opposite ends of the shutter body 190. The constraining edges 196 may be substantially straight, and the sealing edges 198 may be curved, such as curved to match the curvature of the chamber 160. In other embodiments, however, the shutter 182 may be otherwise configured. The constraining edges 196 may be sized and shaped to guide the shutter 182 between the first and second positions. For instance, the constraining edges 196 may slidably abut structure defined within the housing 102 to cause the shutter 182 to move axially along the first axis 188 between the first and second positions, as described more fully below.

As described herein, the shutter body 190 may be sized and shaped to selectively block fluid flow to the first and second plenums 162, 164 depending on the positon of the shutter 182. For example, when the shutter 182 is positioned in the first position, at least a portion of the shutter body 190 may selectively block fluid flow to the second plenum 164, such as by selectively blocking one or more ports or apertures in fluid connection with the second plenum 164, as described more fully below. Similarly, when the shutter 182 is positioned in the second position, at least a portion of the shutter body 190 may selectively block fluid flow to the first plenum 162, such as by selectively blocking one or more ports or apertures in fluid connection with the first plenum 162.

Figure 12:
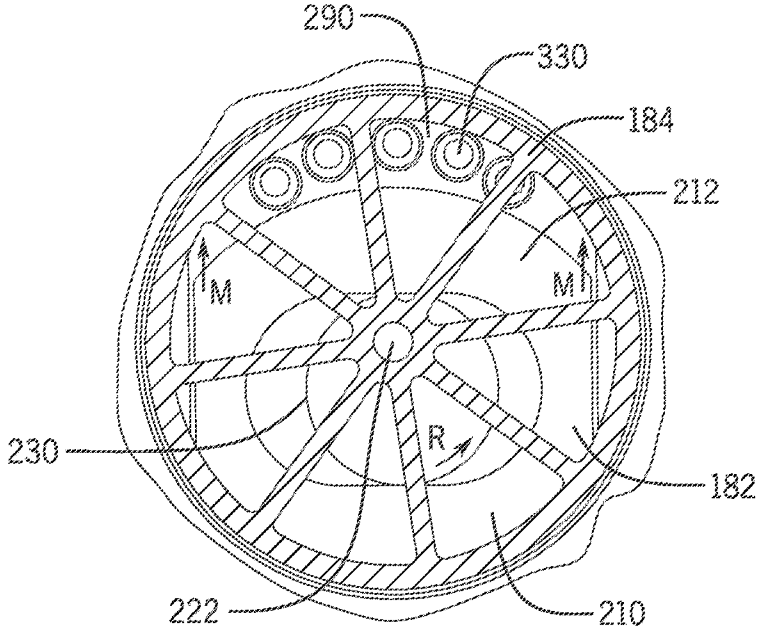
FIG. 12 is a cross-sectional view illustrating a shutter in a first position according to the present disclosure.
Figure 13:
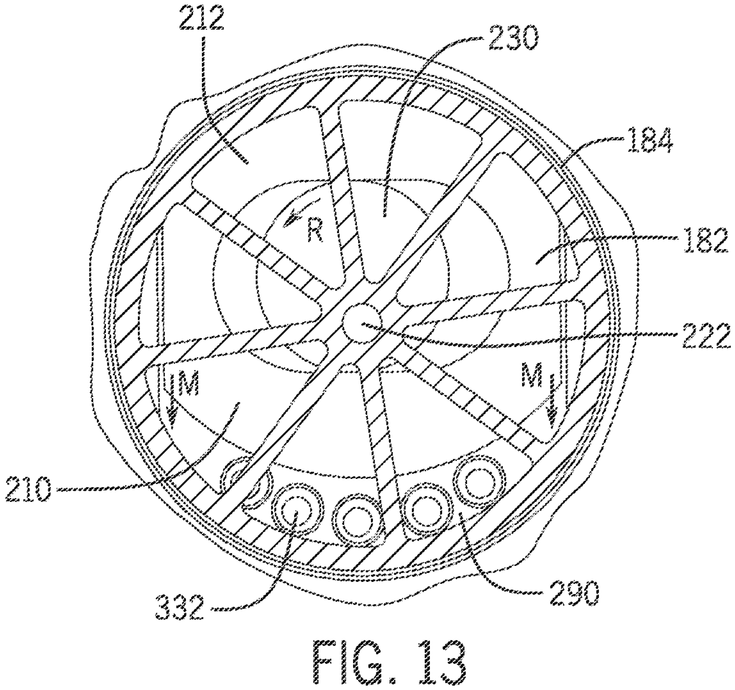
FIG. 13 is a cross-sectional view illustrating the shutter in a second position according to the present disclosure.

Depending on the particular application, the same or different portions of the shutter body 190 may selectively block fluid flow to the first and second plenums 162, 164. For instance, as shown in FIGS. 12 and 13, a first portion 210 may selectively block fluid flow to the second plenum 164 when the shutter 182 is positioned in the first position, whereas a second portion 212 may selectively block fluid flow to the first plenum 162 when the shutter 182 is positioned in the second position. As shown in FIG. 4, the first and second portions 210, 212 may be positioned on opposing sides of the cam aperture 192, though other suitable configurations are contemplated. In some embodiments, fluid connection of the first plenum 162 with the fluid inlet 104 fluidly disconnects the second plenum 164 from the fluid inlet 104. Similarly, fluid connection of the second plenum 164 with the fluid inlet 104 may fluidly disconnect the first plenum 162 from the fluid inlet 104.

The turbine 184 of the water direction assembly 180 will now be discussed in more detail. FIGS. 3-5 are various views of the turbine 184. The turbine 184 may move the shutter 182 between the first and second positions. For instance, the turbine 184 may be coupled to the shutter 182 such that rotation of the turbine 184 oscillates the shutter 182 between the first and second positions. As shown in FIG. 3, the turbine 184 may rotate about a second axis 220. For example, the turbine 184 may be rotatably coupled to a shaft 222, the shaft 222 defining the second axis 220. During operation, the turbine 184 rotates about the shaft 222 to move the shutter 182 between the first and second positions. As shown, the second axis 220 may extend substantially orthogonal to the first axis 188, though other configurations are contemplated.

The turbine 184 may include substantially any configuration capable of moving the shutter 182 between positions. In the embodiments illustrated in FIGS. 4 and 5, the turbine 184 is a generally hollow, open-ended cylinder including blades 224 extending radially from a central hub 226. In some embodiments, the turbine 184 may include an outer turbine wall 228, in which case the blades 224 extend between the central hub 226 and the turbine wall 228. As shown, a cam 230 may be coupled eccentrically to the turbine 184, such as to a downstream side of the turbine 184. For instance, the cam 230, which may be referred to as a cam structure, may be positioned off-center from the central hub 226. In some embodiments, the cam 230 may be formed integrally with the turbine 184 or may be a separate element attached or otherwise secured to the turbine 184. In these and other embodiments, the cam 230 may be operable to oscillate the shutter 182 between the first and second positions as the turbine 184 rotates. For example, the cam 230 may be received at least partially within the cam aperture 192 defined in the shutter 182. In such embodiments, the cam aperture 192 may be sized to permit eccentric or orbital rotation of the cam 230 about the second axis 220 as the shutter 182 oscillates along the first axis 188. For example, the width of the cam aperture 192 may match the diameter of the cam 230, whereas the length of the cam aperture 192 is longer than the diameter of the cam 230.

The jet plate 186 will now be discussed in detail. Referring to FIGS. 3 and 4, the jet plate 186 may drivingly rotate the turbine 184 as fluid flows through the showerhead 100. For example, the jet plate 186 may be a generally planar disc 248 including a plurality of jets 250 (e.g., two jets 250, three jets 250, four jets 250, etc.) arranged to rotate the turbine 184 as fluid flows through the jets 250. In particular, the jets 250 may be arranged to cause rotation of the turbine 184 about the second axis 220. For example, the jets 250 may direct water onto the blades 224 of the turbine 184 such that the turbine 184 rotates about the shaft 222, as explained below.

In one embodiment, the jets 250 may be raised protrusions extending at an angle from the disc 248 (e.g., from either a top or bottom surface of the disc 248). Each jet 250 includes a jet aperture 252 providing fluid communication through the disc 248 to direct fluid onto the turbine 184 (e.g., onto the blades 224 of the turbine 184) at an angle. As shown in FIG. 3, the jet plate 186 may be fixedly attached to the shaft 222 such that the jet plate 186 remains stationary as fluid flows through the jets 250. In some embodiments, a periphery 254 of the disc 248 may be coupled to or abut a wall defining a portion of the chamber 160 within the housing 102. In such embodiments, the engagement between the wall and the periphery 254 of the disc 248 may limit lateral and/or rotational movement of the disc 248 within the chamber 160. In some embodiments, the engagement between the wall and the periphery 254 of the disc 248 may create a sealing engagement limiting fluid flow between the periphery 254 of the disc 248 and the wall to direct fluid through only desired portions of the jet plate 186 (e.g., through the jet apertures 252).

Figure 6:
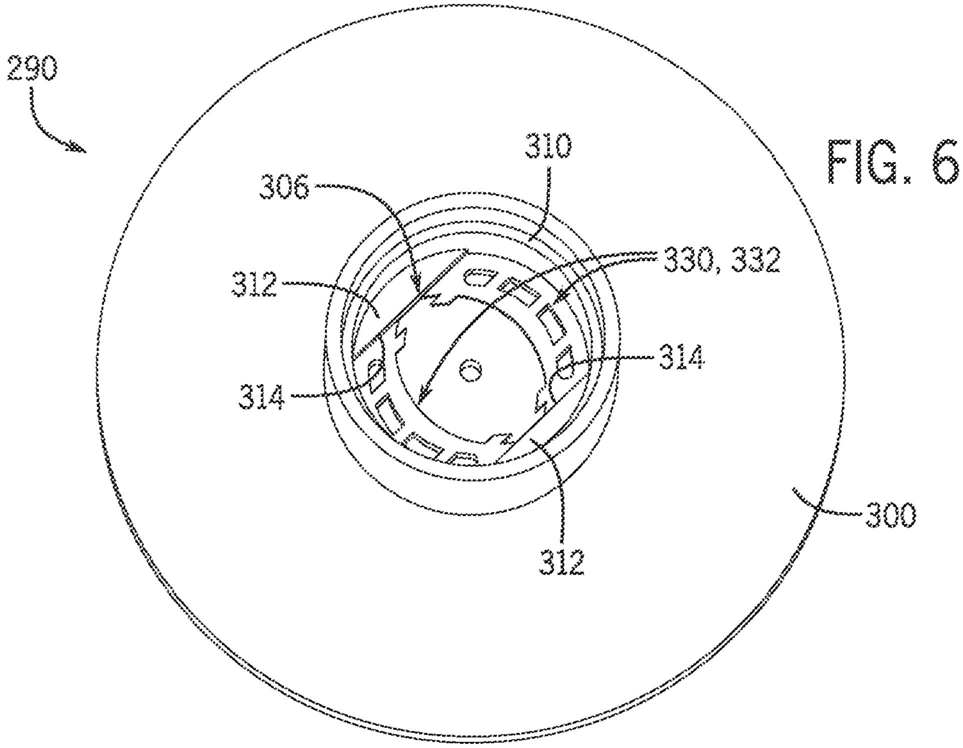
FIG. 6 is an isometric view of a first side of a first flow plate according to the present disclosure.
Figure 7:
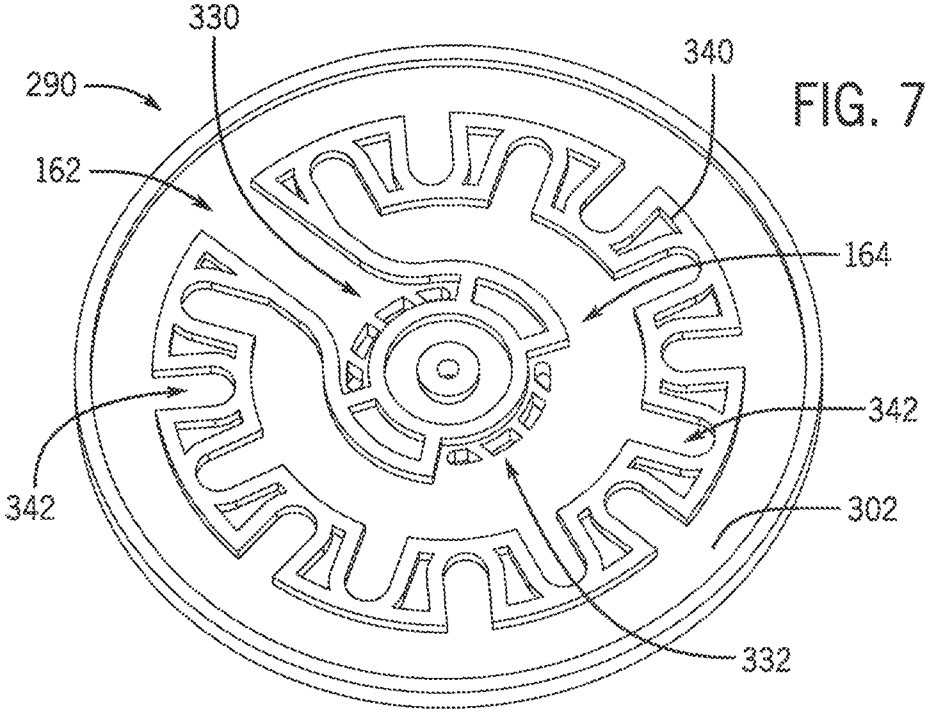
FIG. 7 is an isometric view of a second opposing side of the first flow plate of FIG. 6.
Figure 8:
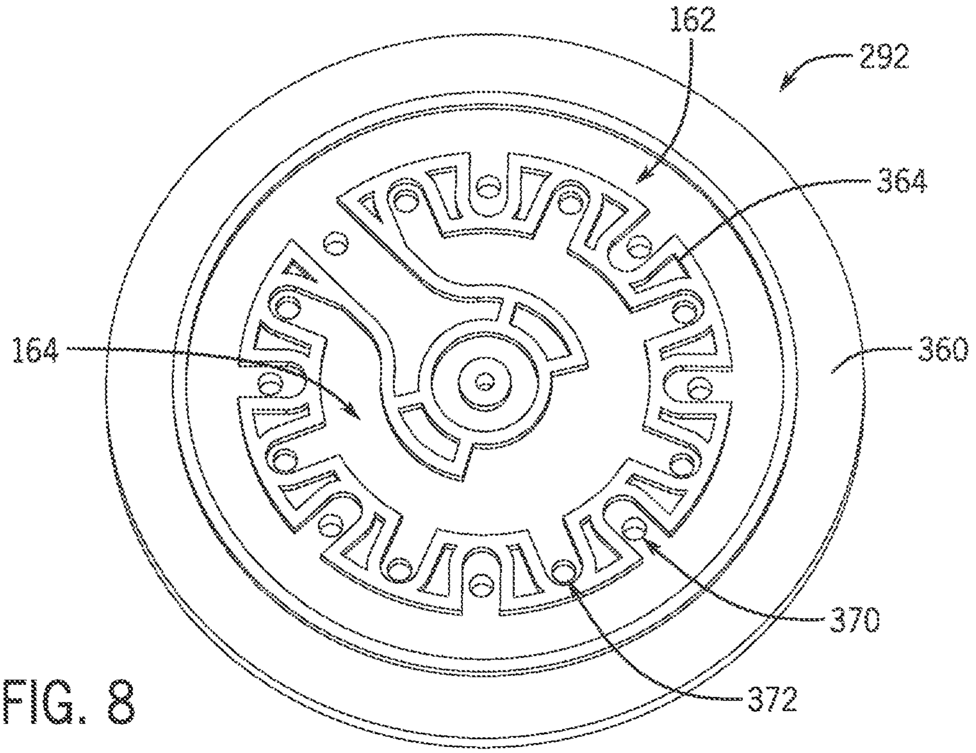
FIG. 8 is an isometric view of a first side of a second flow plate according to the present disclosure.
Figure 9:
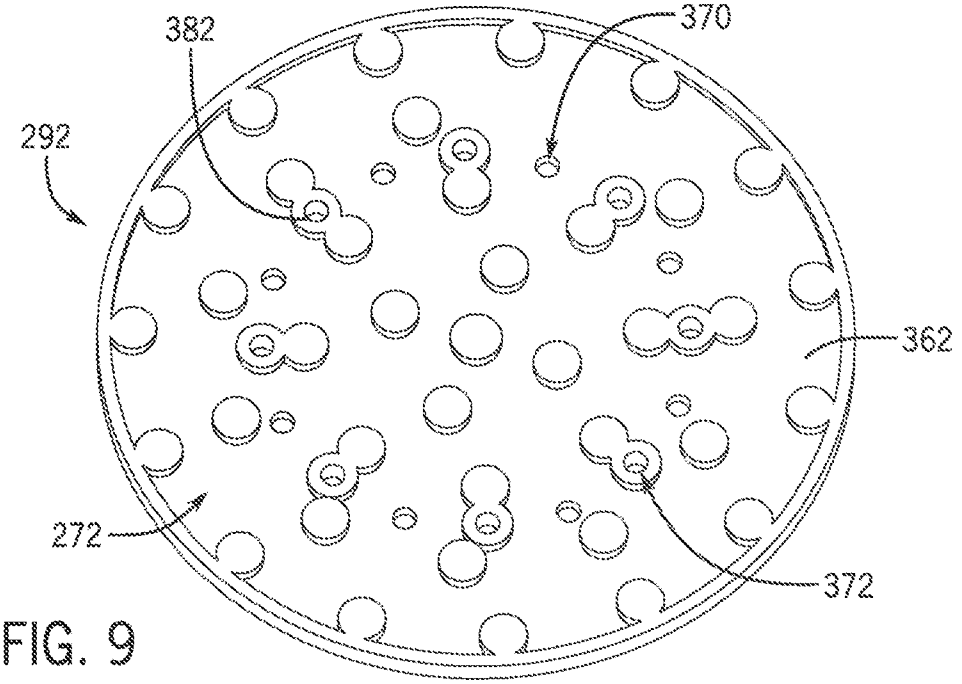
FIG. 9 is an isometric view of a second opposing side of the second flow plate of FIG. 8. First and second sides of a third flow plate may be mirror images of FIG. 9.
Figure 10:
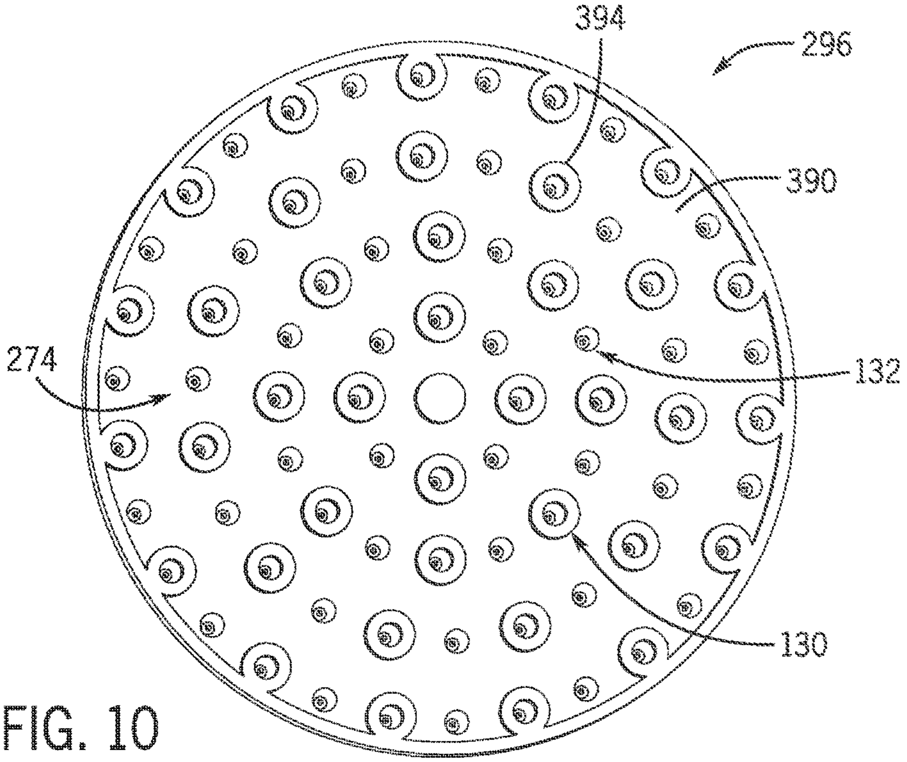
FIG. 10 is an isometric view of a first side of a fourth flow plate according to the present disclosure.
Figure 11:
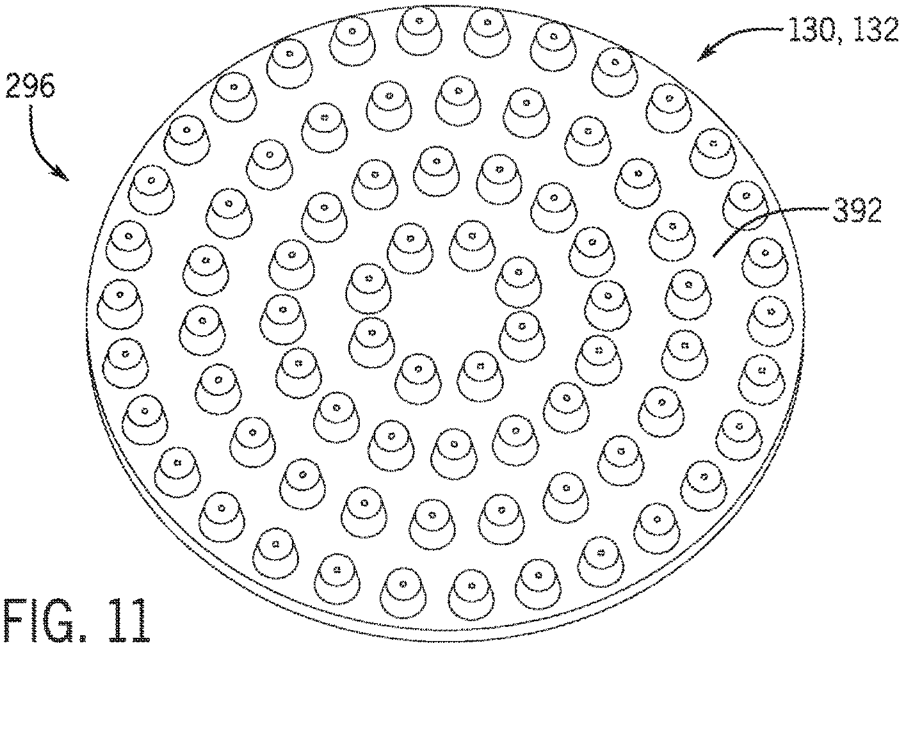
FIG. 11 is an isometric view of a second opposing side of the fourth flow plate of FIG. 10.

FIG. 6 is an isometric view of a first flow plate. FIG. 7 is another isometric view of the first flow plate. FIG. 8 is an isometric view of a second flow plate. FIG. 9 is another isometric view of the second flow plate. Opposing sides of a third flow plate may be similar to FIG. 9. FIG. 10 is an isometric view of a fourth flow plate. FIG. 11 is another isometric view of the fourth flow plate. Referring to FIGS. 3 and 6-11, the showerhead 100 may include a plurality of flow plates 270 received at least partially in the chamber 160 to fluidly connect the fluid inlet 104 with an outlet of the showerhead 100 (e.g., with the first and second banks of nozzles 130, 132). In such embodiments, the plurality of flow plates 270, or at least subset groups of the plurality of flow plates 270, may collectively define various chambers or plenums. For example, the plurality of flow plates 270, or at least a subset group of the plurality of flow plates 270, may collectively define the first and second plenums 162, 164. In some embodiments, the plurality of flow plates 270, or at least a subset group of the plurality of flow plates 270, may collectively define first and second nozzle chambers 272, 274 fluidly connected with the first and second banks of nozzles 130, 132, respectively. As shown in FIG. 3, the various chambers or plenums may be defined on different levels within the housing 102. For example, the first and second plenums 162, 164 may be defined on the same level within the housing 102. In other embodiments, the first and second nozzle chambers 272, 274 may be defined on adjacent levels within the housing 102, such as on a downstream side of the first and second plenums 162, 164. In the specific embodiment of FIG. 3, the first and second plenums 162, 164 may be defined on a first level within the housing, the first nozzle chamber 272 may be defined on a second level within the housing adjacent the first level, and the second nozzle chamber 274 may be defined on a third level within the housing adjacent the second level.

The plurality of flow plates 270 may include a first plate 290, a second plate 292 connected to the first plate 290, a third plate 294 connected to the second plate 292, and a fourth plate 296 connected to the third plate 294. In such embodiments, the first and second plates 290, 292 may combine to define the first and second plenums 162, 164. The second and third plates 292, 294 may combine to define the first nozzle chamber 272. The third and fourth plates 294, 296 may combine to define the second nozzle chamber 274. Each plate may be referred to as a flow plate or a flow directing plate.

FIG. 6 is an isometric view of a first side of the first plate 290. FIG. 7 is an isometric view of an opposing second side of the first plate 290. Referring to FIGS. 6 and 7, the first plate 290 may be a generally circular disc including opposing first and second sides 300, 302 (see FIGS. 6 and 7, respectively). A cylindrical wall 304 may extend from the first side 300 to define an inlet chamber 306. In such embodiments, the water direction assembly 180 may be received at least partially within the inlet chamber 306 defined by the cylindrical wall 304. For example, a circular ledge 310 may be defined within the inlet chamber 306, such as on an interior side of the cylindrical wall 304. In such embodiments, the periphery 254 of the jet plate 186 may be seated against the ledge 310, such as for sealing engagement therewith. A pair of semicircular shelves 312 may be formed on the first side 300 of the first plate 290 within the inlet chamber 306. Each shelf 312 may be defined at least partially by a curb wall 314, which may be substantially straight in some examples. In such embodiments, the constraining edges 196 of the shutter 182 may slidably engage the curb walls 314 of the first plate 290 to constrain movement of the shutter 182 along the first axis 188.

As shown in FIGS. 6 and 7, various ports may be defined through the first plate 290 within the inlet chamber 306 to divide an inlet water stream into two or more separate water groups for time sharing distribution of water across the showerhead. For instance, a first plurality of ports 330 may be defined through the first plate 290 to fluidly connect the fluid inlet 104 with the first plenum 162. Similarly, a second plurality of ports 332 may be defined through the first plate 290 to fluidly connect the fluid inlet 104 with the second plenum 164. The ports 330, 332 may be configured as desired. For example, the ports 330, 332 may have various shapes, such as circular or polygonal. The ports 330, 332 may also be sized to provide a desired flow characteristic. For instance, the ports 330, 332 may be relatively large, as compared to the nozzle outlets, to limit pressure drops across the first plate 290 between the fluid inlet 104 and the first and second plenums 162, 164. As explained below, the showerhead 100 may include porting, flow paths, or other distribution structure to distribute water away from the ports 330, 332 and the inlet chamber 306 (e.g., to the first and second banks of nozzles 130, 132), whereas some conventional showerheads discharge a divided water stream through nozzles located within the same water chamber in which water division/sharing occurs.

FIG. 7 illustrates the second side 302 of the first plate 290. As shown in FIG. 7, the first plenum 162 may be defined along substantially an outer portion of the first plate 290. The second plenum 164 may be defined along substantially an inner portion of the first plate 290. In such embodiments, the first and second plenums 162, 164 may be separated by a dividing wall 340. The dividing wall 340 may be shaped such that the first and second banks of nozzles 130, 132 fluidly connected to the first and second plenums 162, 164 is evenly distributed across the faceplate 120 of the showerhead 100. For instance, the dividing wall 340 may be shaped such that each of the first and second plenums 162, 164 includes a plurality of channel chambers 342. As shown, the channel chambers 342 of the first plenum 162 may extend inwardly towards the center of the first plate 290 to provide fluid to inner positioned nozzles of the first bank of nozzles 130. Similarly, the channel chambers 342 of the second plenum 164 may extend outwardly away from the center of the first plate 290 to provide fluid to outer positioned nozzles of the second bank of nozzles 132.

FIG. 8 is an isometric view of a first side of the second plate 292. FIG. 9 is an isometric view of a second opposing side of the second plate 292. Referring to FIGS. 8 and 9, the second plate 292 may be a generally circular disc including opposing first and second sides 360, 362 (see FIGS. 8 and 9, respectively). The first side 360 of the second plate 292 may be configured similarly to the second side 302 of the first plate 290. For example, a dividing wall 364 may extend from the first side 360 of the second plate 292. The dividing wall 364 of the second plate 292 may be a mirror image of the dividing wall 340 of the first plate 290 such that when the first side 360 of the second plate 292 is positioned against the second side 302 of the first plate 290, the dividing walls 340, 364 of the first and second plates 290, 292 collectively separate and define the first and second plenums 162, 164. Unlike the first plate 290, however, the second plate 292 includes distribution apertures defined therethrough to distribute fluid from the first and second plenums 162, 164. For instance, fluid within the first plenum 162 may be distributed through a first plurality of distribution apertures 370. Similarly, fluid within the second plenum 164 may be distributed through a second plurality of distribution apertures 372. In the embodiment shown in FIG. 8, the first plurality of distribution apertures 370 is defined within the channel chambers 342 of the first plenum 162, and the second plurality of distribution apertures 372 is defined within the channel chambers 342 of the second plenum 164, though the distribution apertures 370, 372 may be defined in other positions. In embodiments where the distribution apertures 370, 372 are positioned within the channel chambers 342, the distribution apertures 370, 372 can be aligned radially relative to a center of the showerhead 100 to allow the exit flow from the two different plenums 162, 164 to occur within the same area of the faceplate 120.

FIG. 9 illustrates the second side 362 of the second plate 292. As shown in FIG. 9, the first nozzle chamber 272 may be defined at least partially on the second side 362 of the second plate 292 (such as in combination with a first side 380 of the third plate 294). To maintain separation between water groups, blocking walls 382 may extend from the second side 362 of the second plate 292 around each distribution aperture associated with the second plenum 164 (e.g., around each of the second plurality of distribution apertures 372). The first side 380 of the third plate 294 may be configured similarly to the second side 362 of the second plate 292. For example, blocking walls 384 may extend from the first side 380 of the third plate 294 such that when the first side 380 of the third plate 294 is positioned against the second side 362 of the second plate 292, the blocking walls 382, 384 of the second and third plates 292, 294 collectively separate the water groups, such as at least partially defining the first nozzle chamber 272 and creating passageways for fluid to collect in the separate second nozzle chamber 274.

A second side 386 of the third plate 294 may be configured similarly to the first side 380 of the third plate 294. For example, blocking walls 388 may extend from the second side 386 of the third plate 294 to surround select distribution apertures. However, unlike the first side 380 of the third plate 294, the blocking walls 388 extend from the second side 386 of the third plate 294 to surround each distribution aperture associated with the first plenum 162, rather than with the second plenum 164. In this manner, the two water groups may be separated as the water progresses through the distribution structure of the showerhead 100.

FIG. 10 is an isometric view of a first side of the fourth flow plate. FIG. 11 is an isometric view of a second opposing side of the fourth flow plate. Referring to FIGS. 10 and 11, the fourth plate 296 may be a generally circular disc including opposing first and second sides 390, 392 (see FIGS. 10 and 11, respectively). As shown in FIG. 10, the second nozzle chamber 274 may be defined at least partially on the first side 390 of the fourth plate 296 (such as in combination with the second side 386 of the third plate 294). The outlet nozzles 122 may be defined through the fourth plate 296. To maintain separation between the first and second banks of nozzles 130, 132, blocking walls 394 may extend from the first side 390 of the fourth plate 296 around each outlet nozzle associated with the first bank of nozzles 130 such that when the first side 390 of the fourth plate 296 is positioned against the second side 386 of the third plate 294, the blocking walls **388*b* 394 of the third and fourth plates 294, 296 at least partially define the second nozzle chamber 274 and create passageways for fluid to flow from the first nozzle chamber 272 to each nozzle of the first bank of nozzles 130. As shown in FIG. 11, the first and second banks of nozzles 130, 132 may extend from the second side 392 of the fourth plate 296, such as from an outer surface of the fourth plate 296**.

Operation of the showerhead 100 will now be discussed in more detail. During operation, water enters the showerhead 100 through the fluid inlet 104. As the water enters the fluid inlet 104, the water travels through the fluid conduit 106 to the chamber 160. The chamber 160 is fluidly connected to the inlet chamber 306 of the first plate 290. The fluid flows through the inlet chamber 306 of the first plate 290 and through the jet apertures 252 defined within the jet plate 186. As fluid flows through the jet apertures 252, fluid is directed onto the blades 224 of the turbine 184. For example, the jet apertures 252 may be angled relative to turbine 184 such that fluid directed onto the blades 224 causes the turbine 184 to rotate about the second axis 220, such as about the shaft 222.

As noted above, rotation of the turbine 184 causes the shutter 182 to oscillate (such as axially along the first axis 188) between the first and second positions. FIG. 12 is a cross-sectional view illustrating the shutter 182 in the first position. FIG. 13 is a cross-sectional view illustrating the shutter 182 in the second position. As the turbine 184 rotates, the cam 230 moves correspondingly. As the cam 230 is rotated, the cam 230 abuts against the interior sidewall 194 of the shutter 182 and moves the shutter 182. As noted above, movement of the shutter 182 is constrained by the constraining edges 196 engaging the curb walls 314 defining the shelves 312 extending from the first side 300 of the first plate 290. As such, as the cam 230 rotates, the shutter 182 is moved substantially linearly across the inlet chamber 306 in a reciprocating manner. In particular, the engagement between the curb walls 314 and the constraining edges 196 restricts the motion of the shutter 182 to a substantially linear pathway.

Movement of the shutter 182 will be explained in more detail. As shown in FIG. 12, as the cam 230 rotates in direction R, the shutter 182 moves in linear direction M across the inlet chamber 306 of the first plate 290. In the position shown in FIG. 12, fluid flows from the jet plate 186 through the open spaces between each of the turbine blades 224 and past the shutter 182 to the first plurality of ports 330. As the shutter 182 moves from its first position to its second position, each port of the second plurality of ports 332 is covered or closed by the shutter 182 (such as at substantially the same time), and each port of the first plurality of ports 330 is uncovered or opened (such as at substantially the same time).

With reference to FIG. 13, as the turbine 184 continues to rotate, the cam 230 continues to move in direction R, causing the shutter 182 to move in linear direction M towards the opposite sidewall of the inlet chamber 306. In the position shown in FIG. 13, fluid flows from the jet plate 186 through the open spaces between each of the turbine blades 224 and past the shutter 182 to the second plurality of ports 332. As the shutter 182 moves from its second position to its first position, each port of the first plurality of ports 330 is covered or closed by the shutter 182 (such as at substantially the same time), and each port of the second plurality of ports 332 is uncovered or opened (such as at substantially the same time).

In this manner, the oscillating motion of the shutter 182 distributes or divides the flow of water (i.e., a water stream) into a plurality of (e.g., two) separate water groups. The flow of fluid may then alternate between the water groups to time share the fluid flow through the showerhead 100. The alternating flow between the various water groups may be seamless without any noticeable effect on a user. That is, the alternating fluid flow through the first and second banks of nozzles 130, 132 may be timed such that the shower experience appears and/or feels similar to a conventional showerhead. In this manner, the showerhead 100 can use a reduced water flow rate and still produce a showering experience that replicates showerheads with an increased water flow rate.

Referring to FIG. 3, when the shutter 182 is positioned in the first position, such as the position illustrated in FIG. 12, fluid flows through the first plurality of ports 330 and into the first plenum 162 defined between the first and second plates 290, 292. The fluid flows through the first plenum 162 and through the first plurality of distribution apertures 370. The fluid flows through the first plurality of distribution apertures 370 and into the first nozzle chamber 272 defined between the second and third plates 292, 294. The first bank of nozzles 130 are fluidly connected to the first nozzle chamber 272. As such, the fluid flows through the first nozzle chamber 272 and through the first bank of nozzles 130. As described herein, the first plenum 162 and/or the first nozzle chamber 272 may be designed to evenly distribute fluid. For example, the first plenum 162 may be designed to equalize pressure across the first plurality of distribution apertures 370. In like manner, the first nozzle chamber 272 may be designed to equalize pressure across the first bank of nozzles 130. In this manner, the first bank of nozzles 130 may have substantially equal nozzle velocities.

With continued reference to FIG. 3, when the shutter 182 is positioned in the second position, such as the position illustrated in FIG. 13, fluid flows through the second plurality of ports 332 and into the second plenum 164 defined between the first and second plates 290, 292. The fluid flows through the second plenum 164 and through the second plurality of distribution apertures 372. The fluid flows through the second plurality of distribution apertures 372 and into the second nozzle chamber 274 defined between the third and fourth plates 294, 296. The second bank of nozzles 132 are fluidly connected to the second nozzle chamber 274. As such, the fluid flows through the second nozzle chamber 274 and through the second bank of nozzles 132. As described herein, the second plenum 164 and/or the second nozzle chamber 274 may be designed to evenly distribute fluid. For example, the second plenum 164 may be designed to equalize pressure across the second plurality of distribution apertures 372. In like manner, the second nozzle chamber 274 may be designed to equalize pressure across the second bank of nozzles 132. In this manner, the second bank of nozzles 132 may have substantially equal nozzle velocities. In some embodiments, the nozzle velocities of the second bank of nozzles 132 may be similar to the nozzle velocities of the first bank of nozzles 130.

FIGS. 14-18 are various views of a showerhead 400 including a multi-mode feature. Except as otherwise noted below, the showerhead 400 is similar to the showerhead 100 described above. Accordingly, in certain instances, like features will not be discussed when they would be apparent to those skilled in the art.

Figure 14:
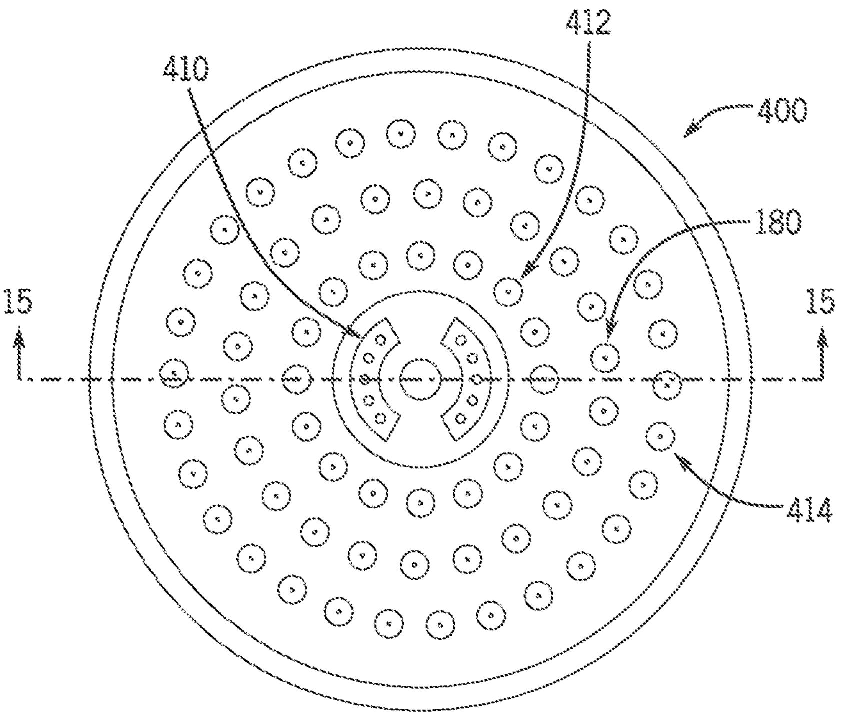
FIG. 14 is an end view of an additional showerhead including a multi-mode feature in a co-axial configuration according to the present disclosure.
Figure 15:
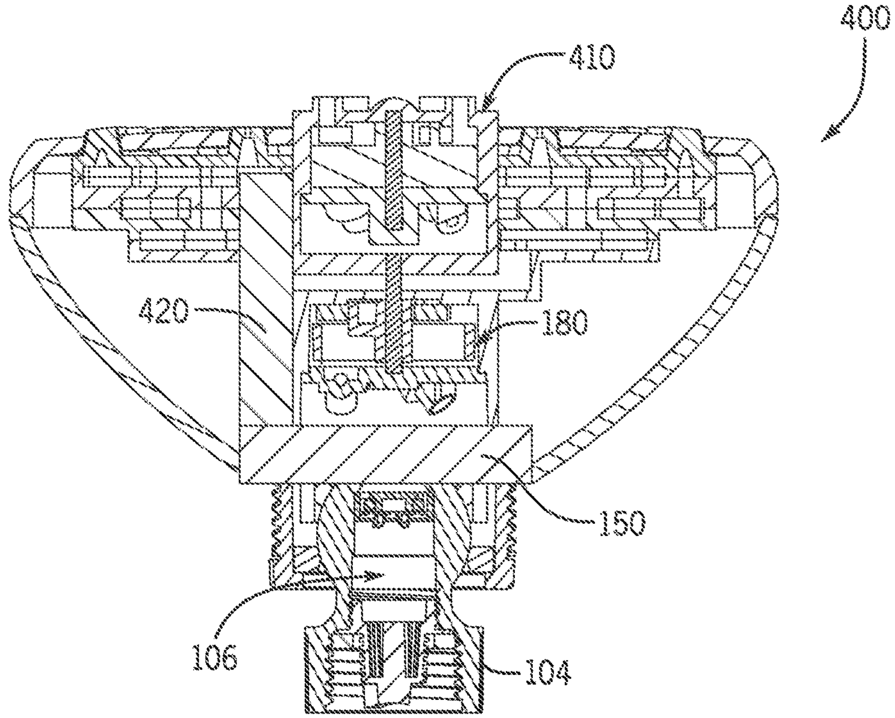
FIG. 15 is a cross-sectional view of the showerhead of FIG. 14 taken along line 15-15 in FIG. 14.
Figure 16:
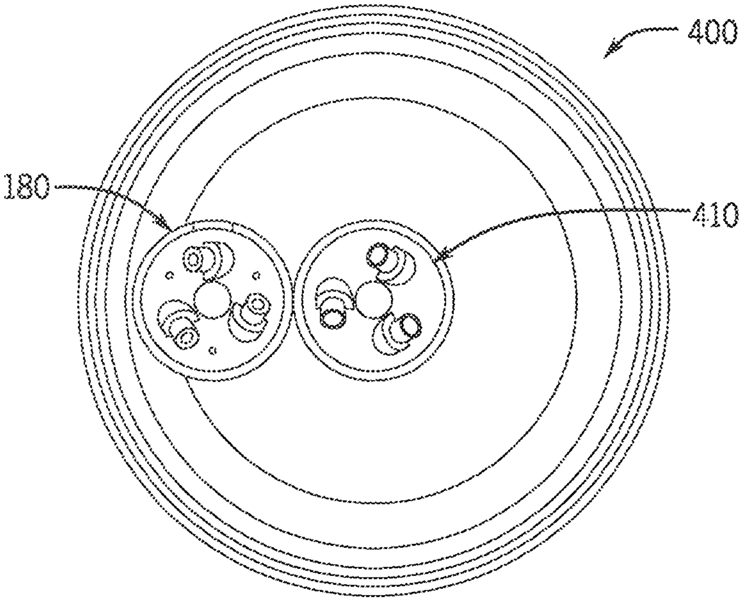
FIG. 16 is a schematic view of an additional showerhead including a multi-mode feature in a side-by-side configuration according to the present disclosure.
Figure 17:
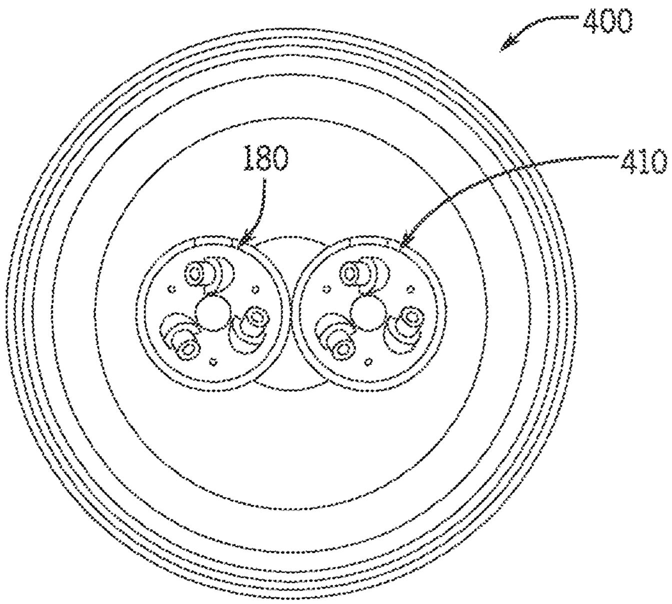
FIG. 17 is a schematic view of an additional showerhead including a multi-mode feature in an alternative side-by-side configuration according to the present disclosure.
Figure 18:
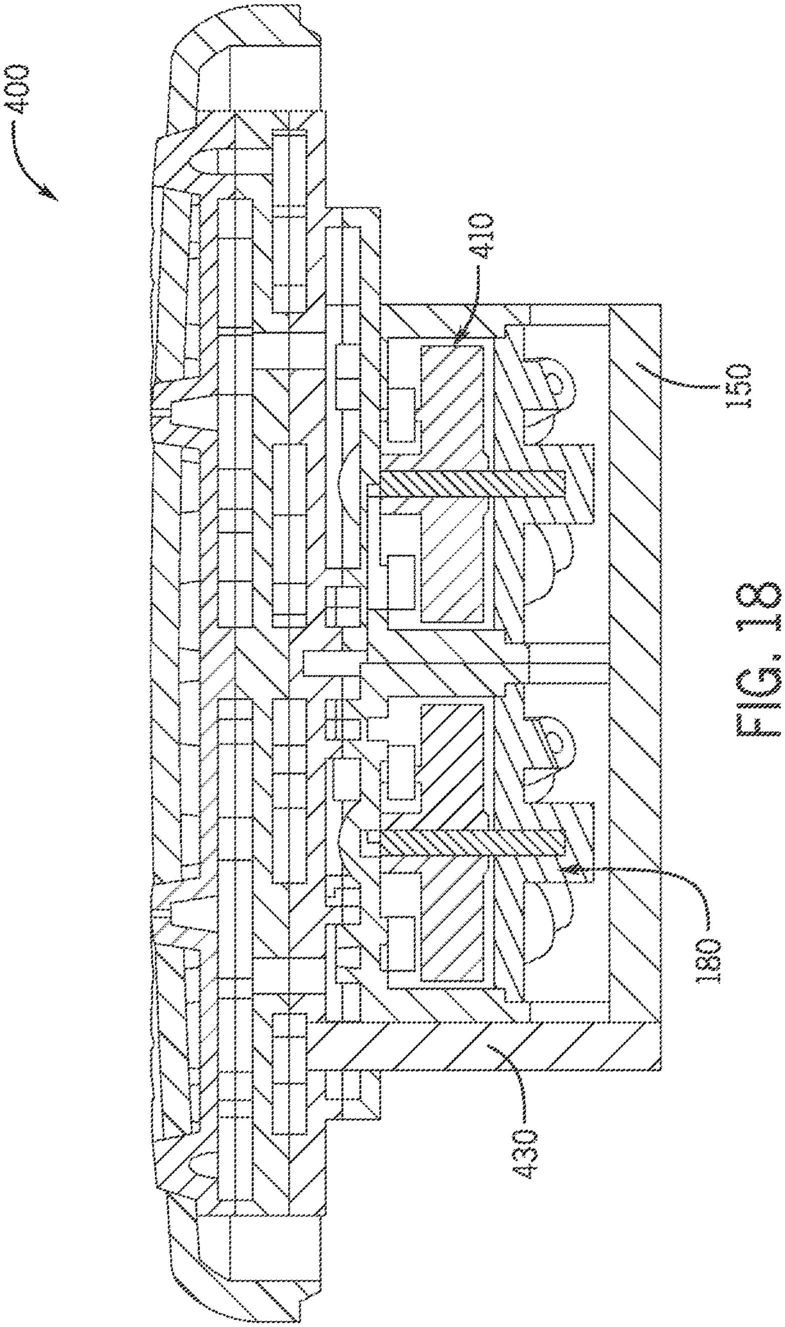
FIG. 18 is a cross-sectional view of the showerhead of FIG. 17.

FIG. 14 is an end view of the showerhead 400 including a multi-mode feature in a co-axial configuration. FIG. 15 is a cross-sectional view of the showerhead 400 of FIG. 14. FIG. 16 is a schematic view of the showerhead 400 including a multi-mode feature in a side-by-side configuration. FIG. 17 is a schematic view of the showerhead 400 including a multi-mode feature in an alternative side-by-side configuration. FIG. 18 is a cross-sectional view of the showerhead 400 of FIG. 17. Referring to FIGS. 14-18, the showerhead 400 may selectively direct fluid into one more different flow control assemblies. For example, the showerhead 400 may include a massage mode assembly 410, a concentrated mode assembly 412, a mist mode assembly 414, and/or any other flow controlling assembly in any combination thereof, as explained below. For instance, the showerhead 400 may include the water direction assembly 180 in combination with the massage mode assembly 410, in combination with the massage mode assembly 410 and the concentrated mode assembly 412, or in combination with the massage mode assembly 410, the concentrated mode assembly 412, and the mist mode assembly 414. Each of the massage mode assembly 410, the concentrated mode assembly 412, and the mist mode assembly 414 will be discussed in turn below.

The massage mode assembly 410 may provide a pulsating or massaging spray. As shown in FIG. 14, the massage mode assembly 410 may be positioned at or adjacent the center of the faceplate 120. In such embodiments, the outlet nozzles 122 associated with the water direction assembly 180 (e.g., the first and second banks of nozzles 130, 132) may at least partially annularly surround the massage mode assembly 410. The massage mode assembly 410 may include substantially any configuration operable to provide a pulsating water stream. For example, the massage mode assembly 410 may be arranged similarly to the massage mode assembly disclosed in U.S. Pat. No. 9,404,243 B2, the disclosure of which is hereby incorporated in its entirety, for all purposes.

The massage mode assembly 410 may be positioned relative to the water direction assembly 180 in either a co-axial arrangement (see FIGS. 14 and 15) or a side-by-side arrangement (see FIGS. 16-18). For example, as shown in FIG. 15, the massage mode assembly 410 may be aligned axially with the shaft 222 about which the turbine 184 rotates. In such embodiments, the showerhead 400 may include porting to feed the massage mode assembly 410. For example, a first tube 420 may extend from the fluid conduit 106 to the massage mode assembly 410 to fluidly connect the fluid inlet 104 with the massage mode assembly 410.

In some embodiments, the massage mode assembly 410 may be positioned in a side-by-side configuration with the water direction assembly 180. For example, as shown in FIG. 16, the water direction assembly 180 may be positioned near the center axis of the showerhead 400. In such embodiments, the massage mode assembly 410 may be positioned adjacent the water direction assembly 180 off-centered within the showerhead 400. In some embodiments, as illustrated in FIGS. 17 and 18, each of the water direction assembly 180 and the massage mode assembly 410 may be off-centered within the showerhead 400. For instance, as shown in FIG. 18, the water direction assembly 180 and the massage mode assembly 410 may be positioned side-by-side.

The concentrated mode assembly 412 will now be discussed in more detail. The concentrated mode assembly 412 may provide a concentrated spray. For example, the concentrated mode assembly 412 may direct water flow through a limited number of outlet nozzles 122. As such, the concentrated mode assembly 412 may provide a more forceful flow compared to the water direction assembly 180, which may be desired by a user in certain situations. As shown in FIG. 14, the concentrated mode assembly 412 may be positioned adjacent the center of the faceplate 120, such as annularly surrounding the massage mode assembly 410. In some embodiments, the concentrated mode assembly 412 may be positioned between the massage mode assembly 410 and the outlet nozzles 122 associated with the water direction assembly 180. As shown in FIG. 15, the showerhead 400 may include porting to feed the concentrated mode assembly 412. For instance, a second tube 430 may extend from the fluid conduit 106 to the concentrated mode assembly 412 to fluidly connect the fluid inlet 104 with the concentrated mode assembly 412.

The mist mode assembly 414 will now be discussed in more detail. The mist mode assembly 414 may include substantially any configuration operable to provide a mist output. For example, the mist mode assembly 414 may be arranged similarly to misting assembly disclosed in U.S. Pat. No. 9,404,243 B2, the disclosure of which is hereby incorporated in its entirety, for all purposes. The nozzles 122 associated with the mist mode assembly 414 may be positioned anywhere along the faceplate 120 of the showerhead 400. Similar to the other modes described above, the showerhead 400 may include porting to feed the mist mode assembly 414.

In the embodiments described above, the showerhead 400 may include a mode selection assembly 150 to select a desired operating mode of the showerhead 400. The mode selection assembly 150 may be movable between a plurality of positions to fluidly connect the fluid inlet 104 with one or more of the water direction assembly 180, the massage mode assembly 410, the concentrated mode assembly 412, and the mist mode assembly 414. For example, the mode selection assembly 150 may be moved to a first position fluidly connecting the fluid inlet 104 with the water direction assembly 180, a second position fluidly connecting the fluid inlet 104 with the massage mode assembly 410, a third position fluidly connecting the fluid inlet 104 with the concentrated mode assembly 412, and a fourth position fluidly connecting the fluid inlet 104 with the mist mode assembly 414, among others. In some embodiments, the mode selection assembly 150 may be moved to positions fluidly connecting the fluid inlet 104 with any combination of the water direction assembly 180, the massage mode assembly 410, the concentrated mode assembly 412, and the mist mode assembly 414. The mode selection assembly 150 may include substantially any configuration operable to selectively fluidly connect the fluid inlet 104 with one or more mode assemblies of the showerhead 400. For example, the mode selection assembly 150 may be arranged similarly to the mode selection assembly disclosed in U.S. Pat. No. 9,404,243 B2, the disclosure of which is hereby incorporated in its entirety, for all purposes.

Figure 19:
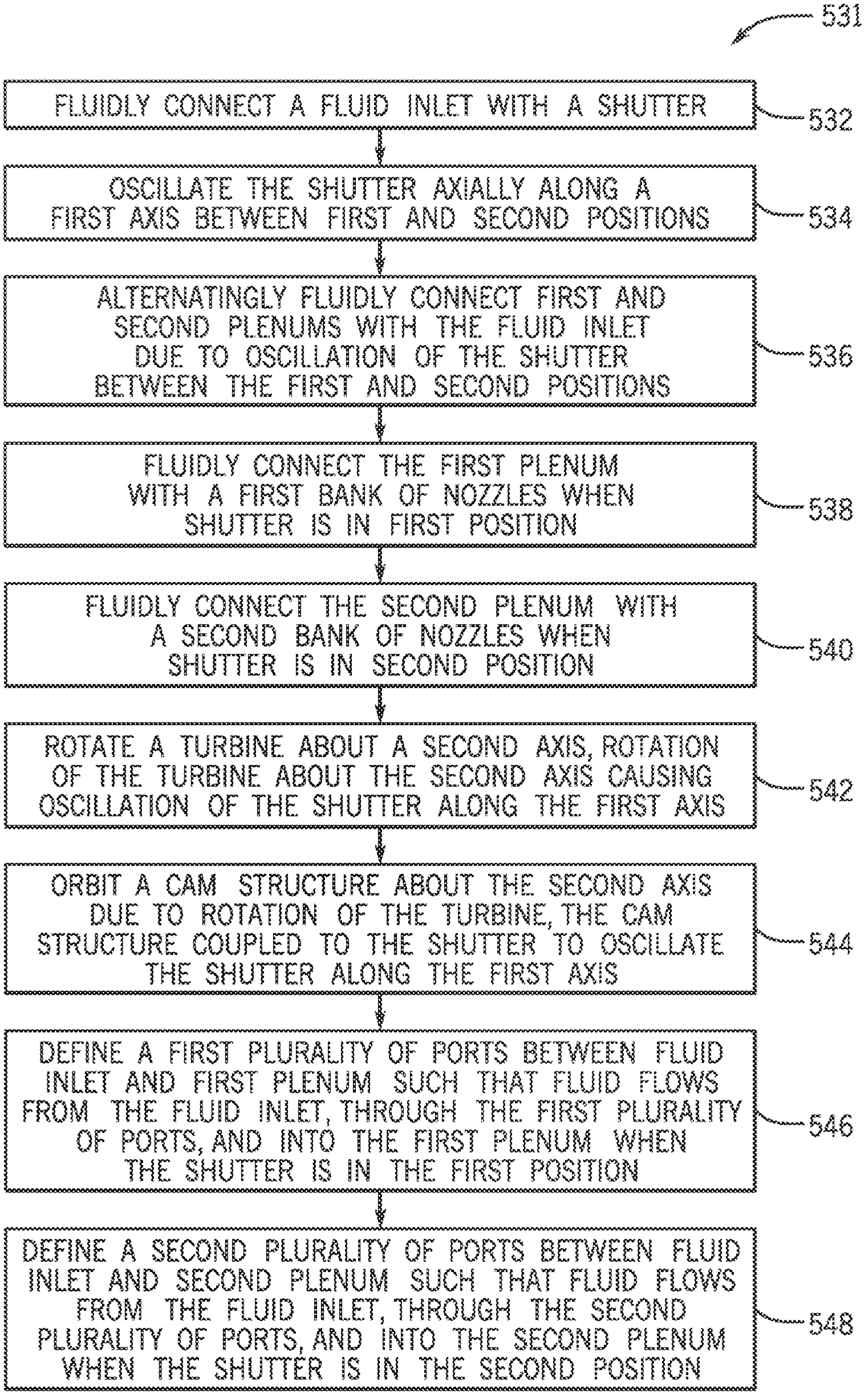
FIG. 19 is a flow chart illustrating a method of oscillating fluid flow through a showerhead according to the present disclosure.

FIG. 19 is a flow chart illustrating a method 531 of oscillating fluid flow through a showerhead, such as showerhead 100 or showerhead 400. Referring to FIG. 19, the method 531 includes fluidly connecting the fluid inlet 104 with the shutter 182 (Block 532), oscillating the shutter 182 axially along the first axis 188 between the first and second positions (Block 534), and alternatingly fluidly connecting the first and second plenums 162, 164 with the fluid inlet 104 due to oscillation of the shutter 182 between the first and second positions (Block 536). In some embodiments, the method 531 may include fluidly connecting the first plenum 162 with the first bank of nozzles 130 when the shutter 182 is in the first position (Block 538). The method 531 may also include fluidly connecting the second plenum 164 with the second bank of nozzles 132 when the shutter 182 is in the second position (Block 540).

With continued reference to FIG. 19, the method 531 may include rotating the turbine 184 about the second axis 220, rotation of the turbine 184 about the second axis 220 causing oscillation of the shutter 182 along the first axis 188 (Block 542). In conjunction with Block 542, the method 531 may include orbiting the cam 230 about the second axis 220 due to rotation of the turbine 184, the cam 230 coupled to the shutter 182 to oscillate the shutter 182 along the first axis 188 (Block 544). As noted above, the cam 230 may be coupled eccentrically to the turbine 184.

In some embodiments, the method 531 may include defining the first plurality of ports 330 between the fluid inlet 104 and the first plenum 162 such that fluid flows from the fluid inlet 104, through the first plurality of ports 330, and into the first plenum 162 when the shutter 182 is in the first position (Block 546). Similarly, the method 531 may include defining the second plurality of ports 332 between the fluid inlet 104 and the second plenum 164 such that fluid flows from the fluid inlet 104, through the second plurality of ports 332, and into the second plenum 164 when the shutter 182 is in the second position (Block 548).

Figure 20:
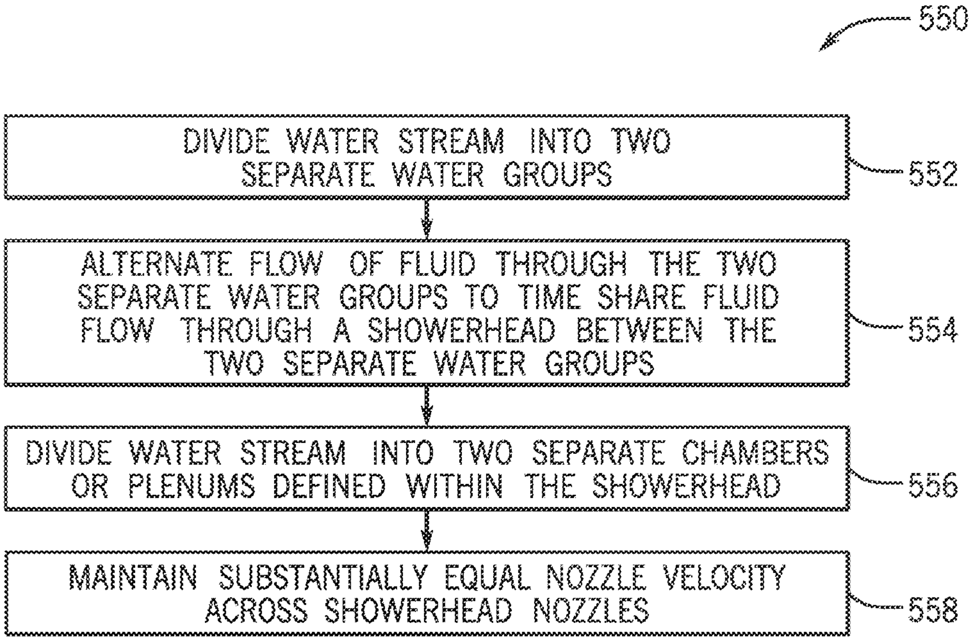
FIG. 20 is a flow chart illustrating a method of limiting fluid flow through a showerhead according to the present disclosure.

FIG. 20 is a flow chart illustrating a method 550 of limiting fluid flow through a showerhead, such as showerhead 100 or showerhead 400. Referring to FIG. 20, the method 550 includes dividing a water stream into two separate water groups (Block 552), and alternating the flow of fluid through the two separate water groups to time share fluid flow through the showerhead between the two separate water groups (Block 554). In some embodiments, the method 550 may include dividing the water stream into two separate chambers or plenums defined within the showerhead (Block 556). Each of the two separate chambers or plenums may be in selective fluid connection with the fluid inlet 104. Each chamber or plenum may be fluidly connected to a plurality of outlet nozzles 122 distributed along the faceplate 120 of the showerhead. In some embodiments, the method 550 may include maintaining substantially equal nozzle velocity across the nozzles 122 (Block 558).

ALTERNATIVE EMBODIMENTS

As noted above, the water division and porting functions of the water direction assembly 180 may be implemented in various embodiments to vary the location and output characteristics of nozzles on the showerhead. FIGS. 21A-27B illustrate various views of another example of a showerhead including a water division or porting assembly. In this example, the water porting allows nozzles corresponding to a pulsating mode to be located outside of the central area of the spray head, so that the showerhead can include a set of comb function nozzles in the central area.

Figure 21A:
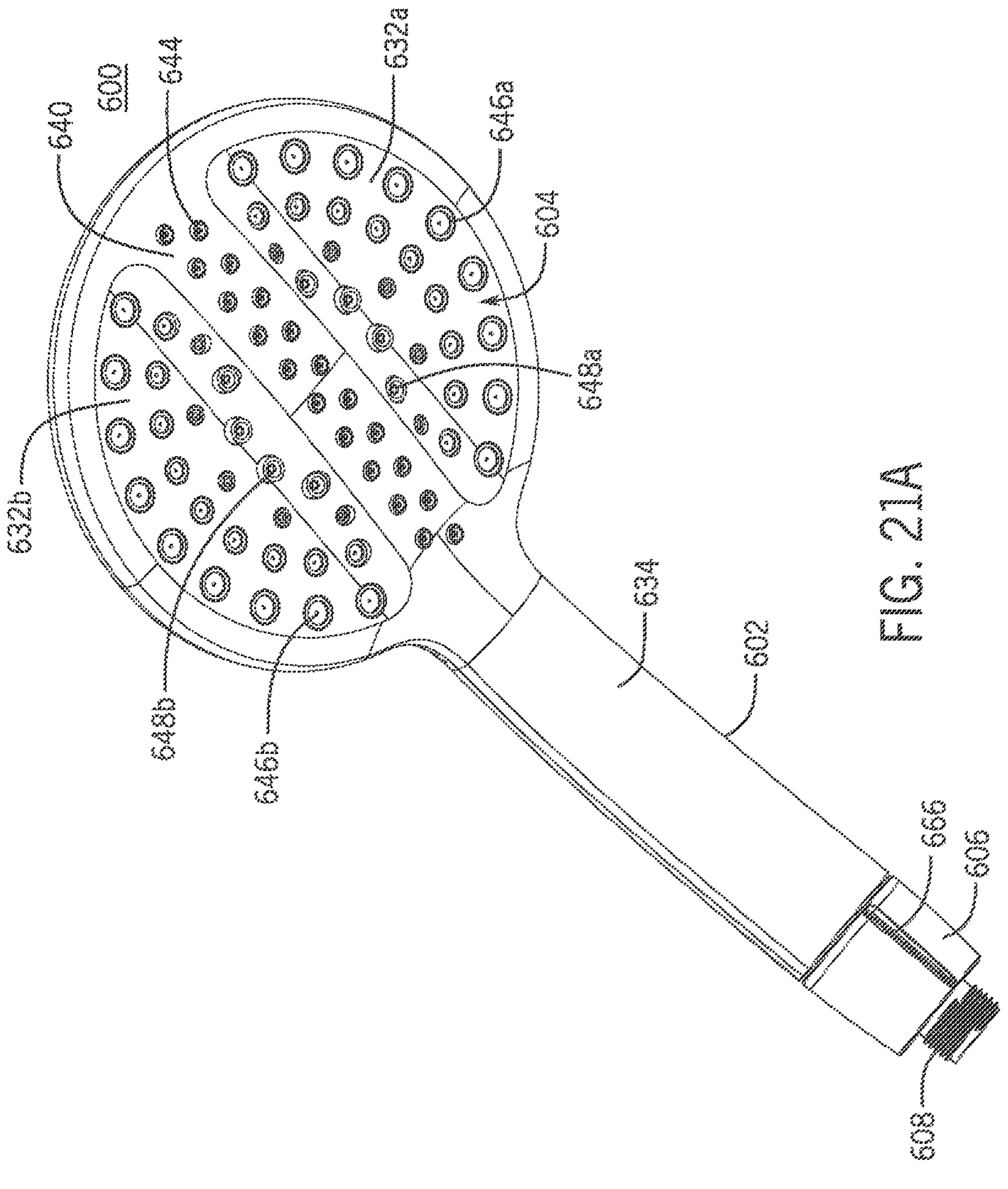
FIG. 21A is a front isometric of a showerhead including a water direction assembly and a spray cap.
Figure 21B:
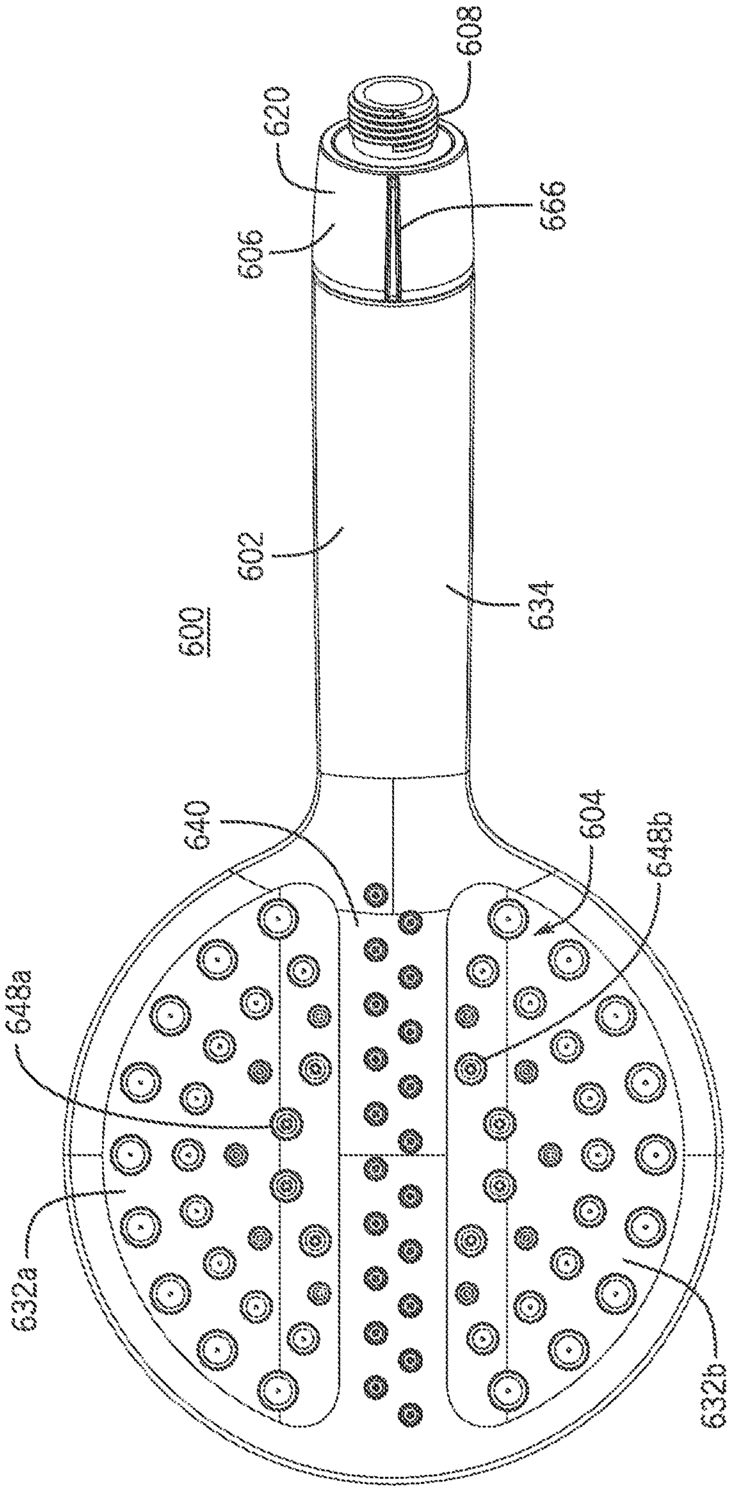
FIG. 21B is a front plan view of the showerhead of FIG. 21A.
Figure 21C:
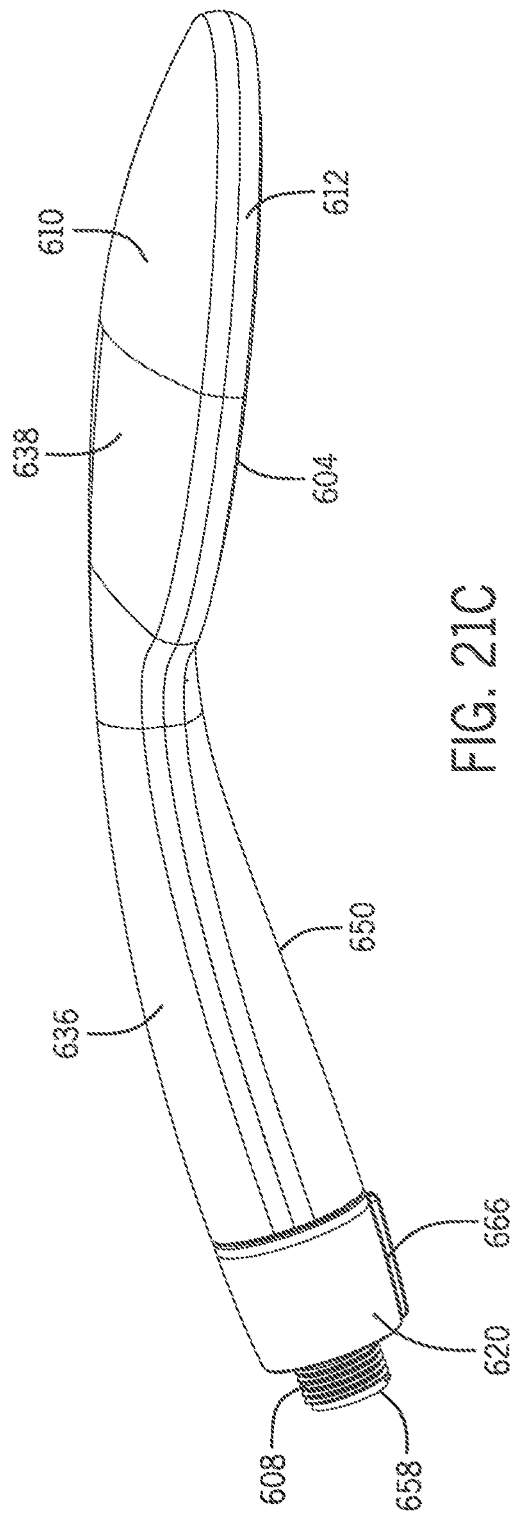
FIG. 21C is a right side elevation view of the showerhead of FIG. 21A.
Figure 22:
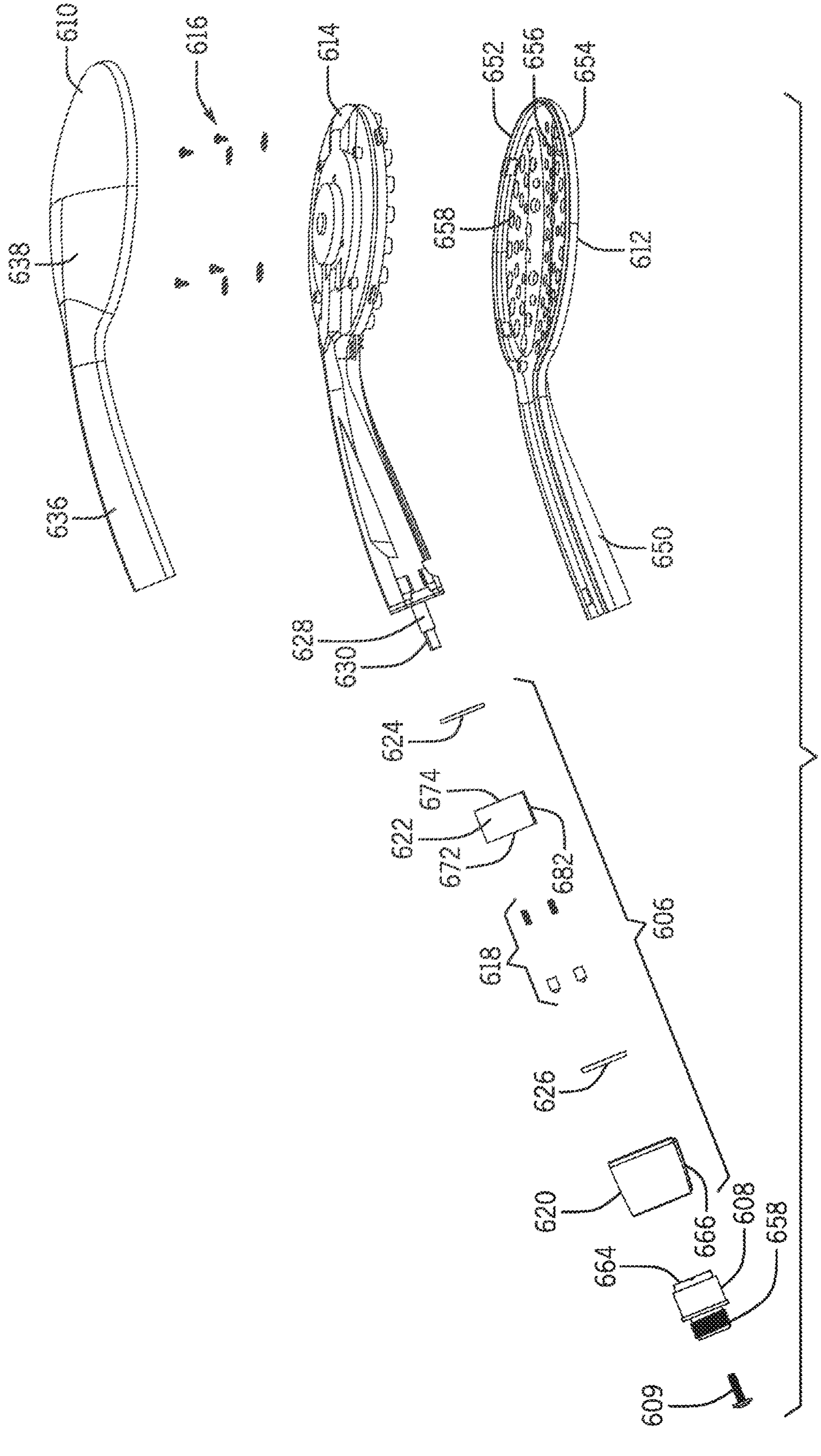
FIG. 22 is an exploded view of the showerhead of FIG. 21A.

With reference to FIGS. 21A-22, the showerhead 600 may be similar to the showerhead 100 of FIG. 1, but may include a handle mode selector and a combing function. The showerhead 600 includes a housing 602 defining a handle 634 and a spray head 604 extending therefrom. In addition to the functional features, the housing 602 may be designed to be aesthetically pleasing. The housing 602 may be a uniform member or, as shown in FIG. 22, may be formed of two or more shells or components, such as a first or upper housing 610 and a second or lower housing 612. The first housing 610 defines a top surface of the showerhead 600 and may include an elongated handle portion 636 that extends radially outwards at a second end to define a head portion 638. The second housing 612 forms a complementary shape to the first housing 610 and may include a handle portion 650 and a head portion 652 extending therefrom. The head portion 652 generally matches the diameter of the head portion 638 of the first housing 610 and may include a raised rim 654 extending annularly around the perimeter and one or more securing tabs 656 positioned along the perimeter rim 654 to assist in securing the two housings 610, 612 together.

With reference to FIG. 22, the second housing 612 includes a plurality of spray apertures 658 defined therethrough. The spray apertures 658 may be formed as circular or other shaped apertures to receive one more nozzles of the showerhead 600. The interior and exterior surfaces of the head portion 652 may be varied as desired to accommodate the spray plates and engine. In one embodiment, the head portion 652 defines a comb structure 640, which may be formed as a recessed well on the interior side of the head portion 652 and a raised formation on the exterior side of the head portion 652. In one embodiment, the comb structure 640 may be formed as a raised rectangular bar extending longitudinally across a diameter of the spray head 604 and may be longitudinally aligned in the extension direction of the handle portion 650 of the second housing 612. The sidewalls surrounding the comb structure 640 may be angled to define a gentle slope, rather than an extreme angle, but other variations are envisioned. The comb structure 640 may have a width that varies depending on the number and structure of the combing nozzles, described below.

With continued reference to FIGS. 22 and 23, the showerhead 600 may also include a source connector 608 for securing and fluidly connecting the showerhead 600 to a fluid source, such as a hose or a J-pipe. In one example, the source connector 608 is a cylindrically shaped member with a threaded post 658 extending from a bottom surface thereof. The source connector 608 is substantially hollow and defines a connection lumen 660 therethrough. A fastener bridge 662, which may be formed as a central hub supported by one or more lateral supports spaced apart from one another and extending between the central hub and the interior sidewalls of the source connector 608 is positioned in the connection lumen 660. The fastener bridge 662 allows a fastener to be located centrally within the source connector 608 without substantially interfering with water flow through the source connector 608. However, in other embodiments, the fastener bridge 662 or support may be differently configured, e.g., the fastener may connect to a portion of the sidewall or top end of the source connector 608. In some embodiments, the source connector 608 may include one or more feedback detents 664 defined as a recessed grooves on a top surface.

With reference to FIG. 22, the showerhead 600 may also include a mode assembly 602, which may be used to selectively direct water to select groups of nozzles, e.g., to select a particular spray mode. The mode assembly may be similar to the valve shown in U.S. Pat. No. 8,146,838 entitled "Handheld Showerhead with Mode Control in Handle" granted on Apr. 3, 2012 and incorporated for all purposes herein.

Figure 23A:
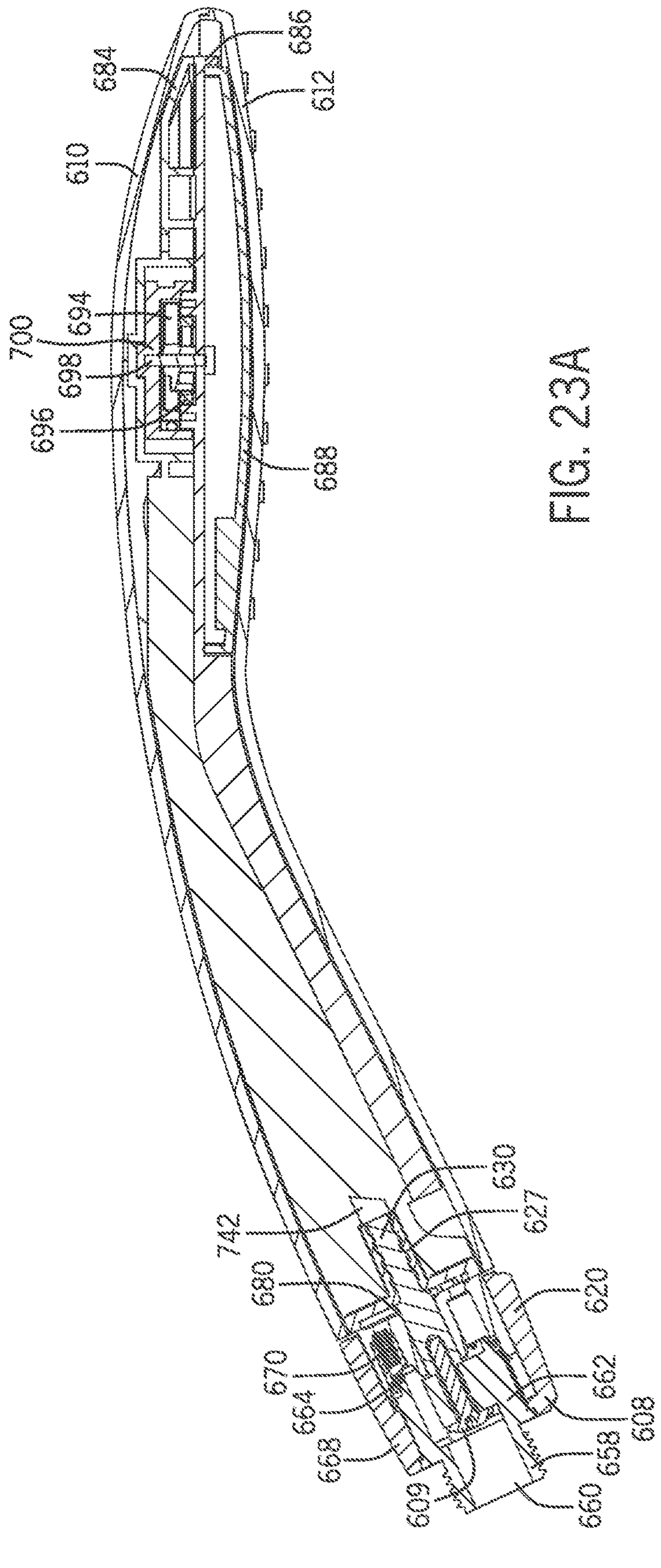
FIG. 23A is a longitudinal cross-section view of the showerhead of FIG. 21A.

In one example, the mode assembly 603 may include an actuator 620, a feedback assembly 618, a valve 622, and one or more seals 624, 626 (e.g., O-ring, U-Cup), each of which are operably coupled together. With reference to FIGS. 22 and 23A, the actuator 620 enables a user to rotate or otherwise move the valve 622 to change the modes. In one example, the actuator 620 is a hollow sleeve that fits around the outer surface of the valve 622 and may have a diameter similar to the diameter of the handle 602 to ensure a substantially flush transition between the bottom end of the handle 602 and the mode assembly 603. Additionally, the actuator 620 may include one or more grip features 666 positioned around or extending from its outer surface. In one example, the grip feature 666 may be a longitudinal rib extending from a first end to a second end of the actuator 620. The actuator 620 may also include interior gripping elements, such as securing ribs 668 that engage the valve 622 as discussed below.

The valve 622 selectively directs fluid into one or more flow channels of the engine 614. The valve 622 includes an inlet side 672 and an outlet side 674, the valve 622 may be formed as a cylindrical body with the inlet side 672 having an open end and the outlet side 674 having a back wall and defining a valve outlet 676 and a fastening aperture 678. The valve outlet 676 may be shaped as arc shaped aperture in fluid communication with the inlet side 672 of the valve 622 and the fastening aperture 678 may be formed as a cylindrical aperture and may be surrounded by a support post extending downward from the interior surface of the outlet side 674 of the valve 622. Further, in some embodiments, the valve 622 may include one or more feedback cavities to receive one or more feedback components, e.g., feedback assemblies 618. In one embodiment, the feedback cavities 670 are defined through posts or other supporting walls extending downward from the valve outlet side 674 back wall and parallel to, but offset from, the fastening post. The shape, position, and configuration of the feedback cavities 670 may be modified depending on the type and position of the feedback assemblies, if included.

With reference to FIG. 22, the valve 622 may also include a connection tab 682 that extends from an outer surface to engage the actuator 620. In one example, the connection tab 682 is a longitudinal rib that seats within a corresponding groove within the actuator 620, but many other types of connection structures are envisioned, e.g., posts, fasteners, or the like.

With reference to FIGS. 22 and 23A, the feedback assemblies 618, are used to provide the user feedback, such as through a tactile and/or acoustic sensation. In one example, the feedback assemblies 618 include a spring element and a plunger biased by the spring element. It should be noted that although two feedback assemblies 618 are illustrated, a single assembly may be used, depending on the type of notification to a user and initial biasing force to be experienced by a user before changing modes.

Figure 24A:
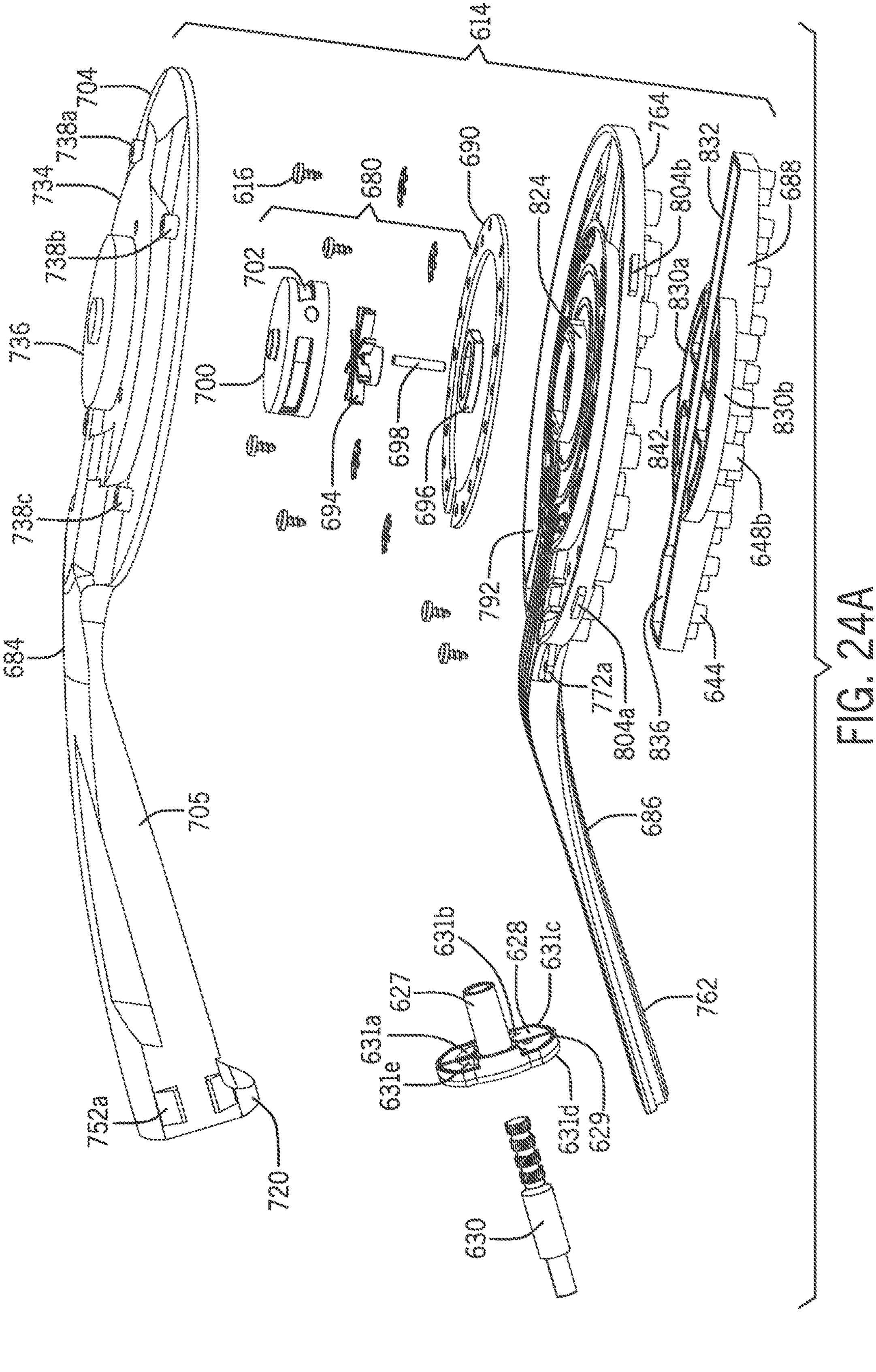
FIG. 24A is a first isometric exploded view of an engine for the showerhead of FIG. 21A.
Figure 24B:
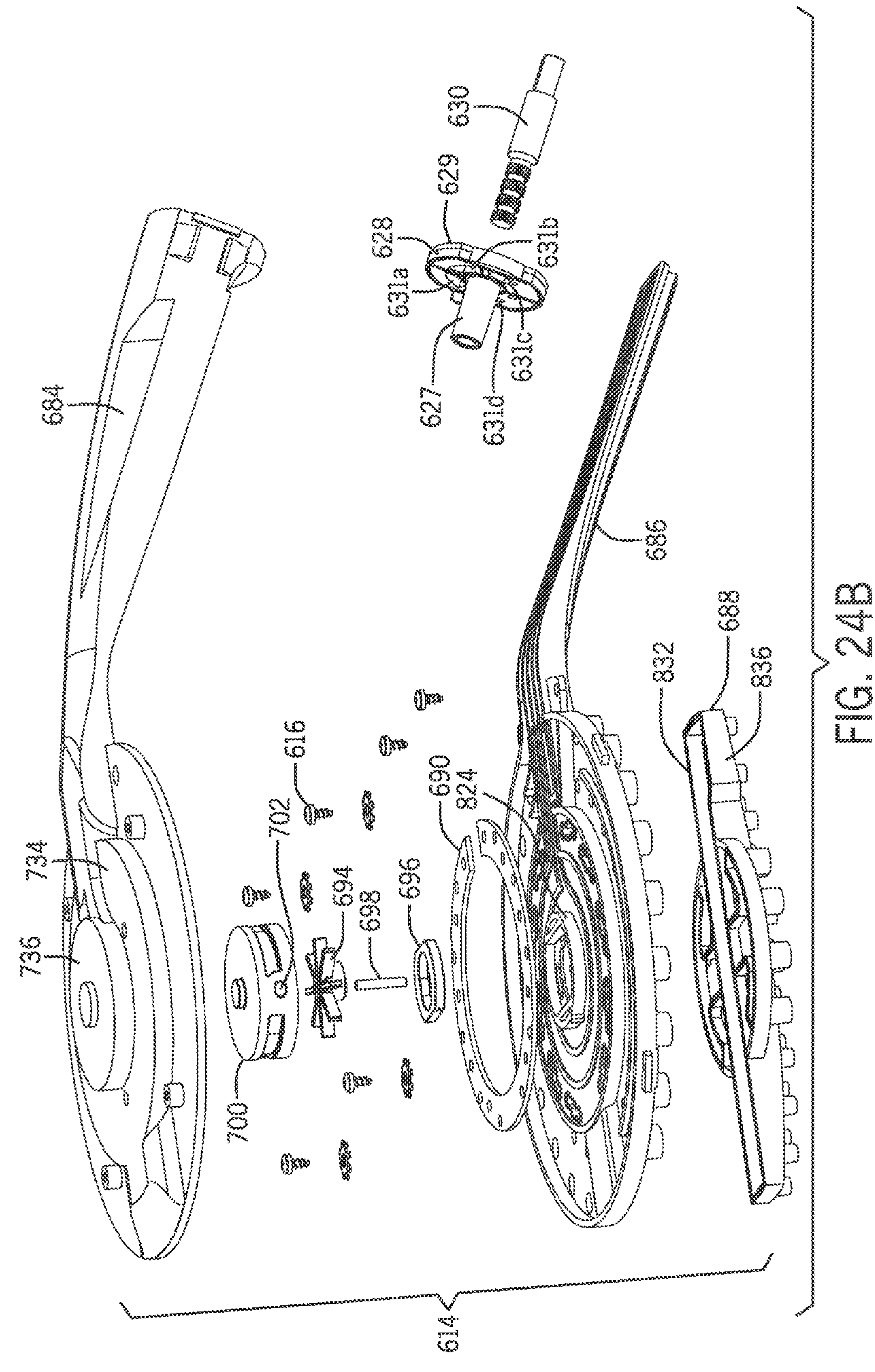
FIG. 24B is a second isometric exploded view of the engine of FIG. 24A.

With reference to FIG. 22, the showerhead 600 includes an engine 614 to define the various flow paths and spray patterns exiting the spray head 604 of the showerhead 600. FIGS. 24A and 24B illustrate exploded views of the engine 614. The engine 614 may include top and bottom flow directing plates 684, 686, a water direction or division assembly 680, a spray cap 688 or comb plate, a mist plate 690, a valve stud 640, and a valve face 628, each of which may be operably connected together discussed in more detail below.

The mist plate 690 is configured to define a mist spray pattern through one or more nozzles. The mist plate 690 therefore may include misting apertures 692 defined therethrough. The shape of the mist plate 690 and the mist apertures 692 may vary depending on the desired location and pattern of the mist mode, but in one embodiment, the mist plate 690 may be shaped as a circular rim having a width sufficient to define the misting nozzles therethrough. In this example, the circular rim may be discontinuous and include two ends spaced apart from one another, e.g., a cut out in the rim, to allow positioning over the respective flow channel walls or the like. In embodiments where a misting mode or feature is not desired, the mist plate 690 may be omitted.

The water direction assembly 680 may be substantially similar to the water direction assembly 180 and any elements not specifically mentioned with respect to showerhead 600 may be the same as those in the water division engine 180. For example, the water direction assembly 680 may include a turbine 694, a shutter 696, an axel or pin 698, as well as a jet plate 700. Each of these elements may be the same as in the water direction assembly 180. However the jet plate 700 may include inlet jet apertures 702 defined through a sidewall thereof, rather than through the top wall of the jet plate 700. In this manner, the jet apertures 702 may direct flow tangentially relative to the turbine 694 blades and may allow a reduced thickness for the water direction assembly 680, allowing a thinner showerhead 600. This type of tangential porting into the water direction assembly 680 is described in more detail in U.S. Provisional Application No. 62/696,944 entitled "Tangential Oscillating Massage Engine," filed on Jul. 12, 2018, and incorporated herein for all purposes.

With reference to FIG. 24A, the valve stud 630 may be shaped as an elongated member including an internal threaded cavity at one end and a plurality of splines or other engaging features on a second end. The valve stud 630 is configured to secure the mode assembly 606 to the engine 614.

The valve face 628 defines a plurality of varying sized mode apertures to selectively change the volume of fluid delivered to a particular mode inlet in the engine 614. In one embodiment, the valve face 628 is defined as a circular base plate 629 with a securing post 627 extending upwards from a center therefor. The mode apertures 631*a*, 631*b*, 631*c*, 631*d* are defined through the base plate 629 and may be arc or circular shaped. In one example, four of the mode apertures 631*a*, 631*b*, 631*d*, 631*e* may have a similar width and size and a fifth mode aperture 631*c* may be substantially smaller and defined as a trickle or pause aperture. However, the shape and configuration of the mode apertures may be varied depending on the desired flow characteristics through the outlet nozzles.

Figure 25A:
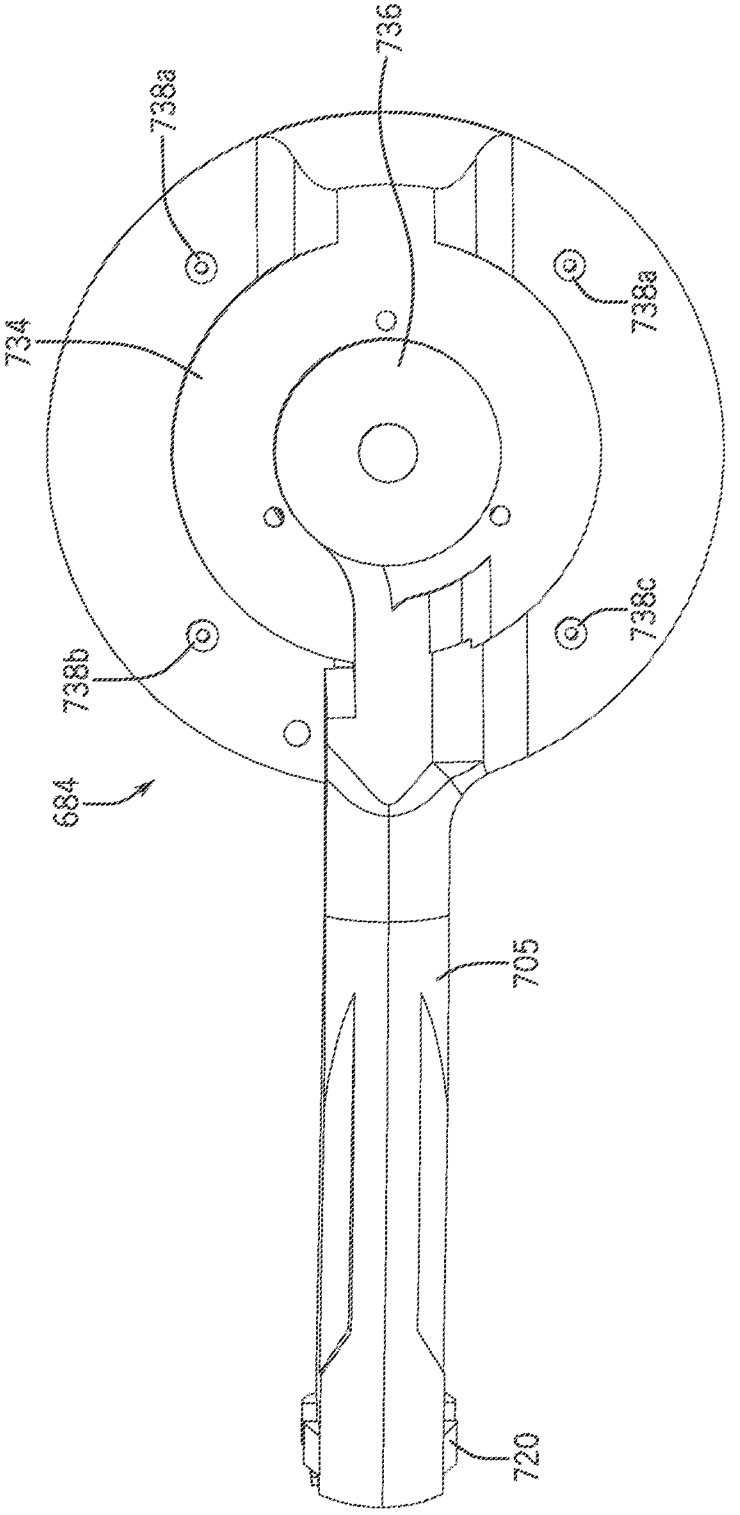
FIG. 25A is a rear plan view of the back plate of the engine of FIG. 24A.
Figure 25B:
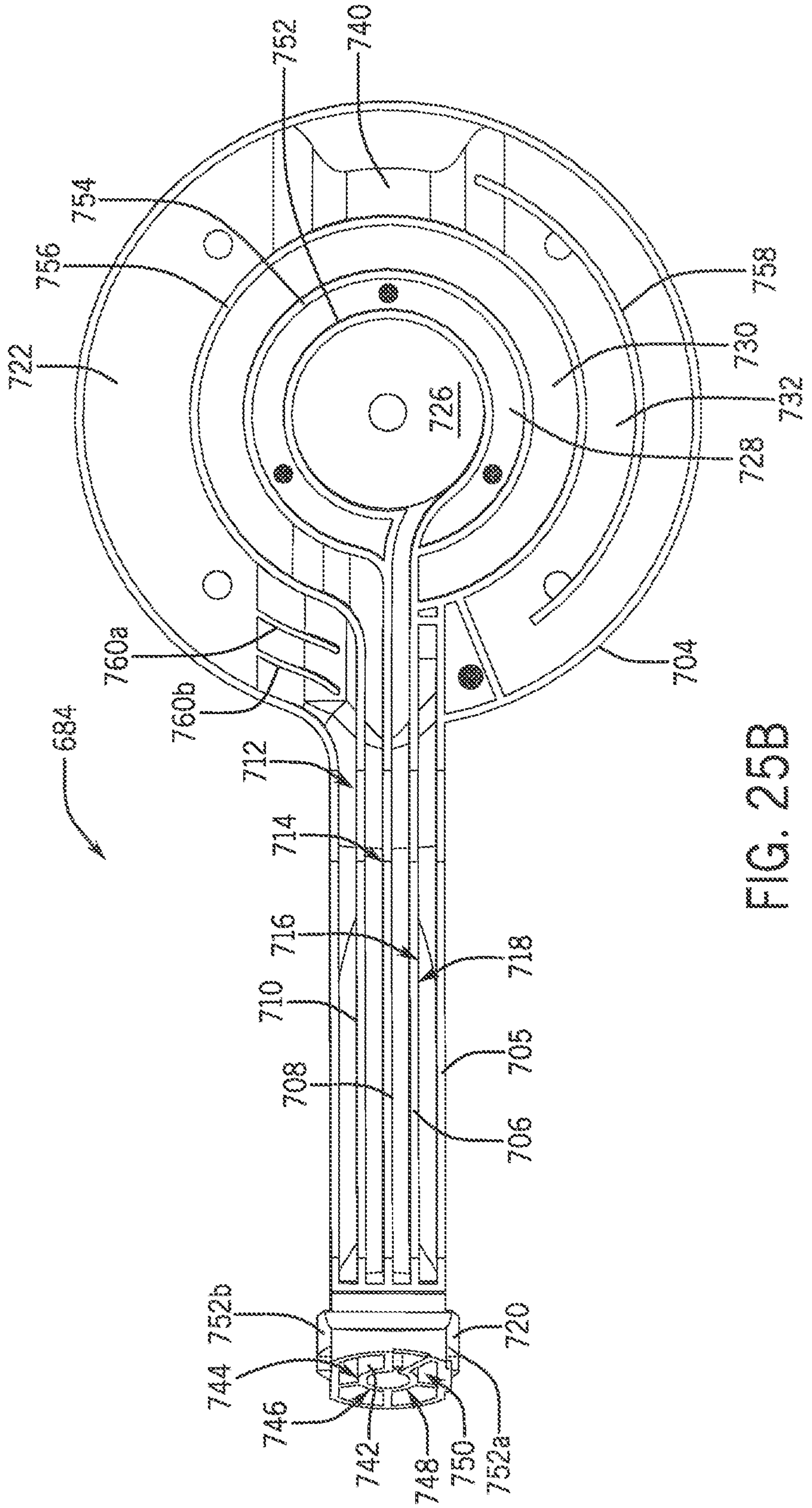
FIG. 25B is a front plan view of the back plate of FIG. 25A.

The first or back plate 684 will now be discussed in more detail. FIGS. 25A and 25B illustrate top and bottom plan views, respectively, of the back plate 684. The back plate 684 defines a portion of the flow channels for each of the spray modes of the showerhead and includes a head portion 704 that generally matches the shape and diameter of the head portion 638 and in one embodiment is generally circular. In embodiments where the showerhead 600 is a handheld, as opposed to a fixed mount, the back plate 684 may further include a hand portion 705 extending from the head portion 704. The handle portion 705 may be generally rectangular and elongated.

The handle portion 705 terminates at an inlet end 720 that is fluidly connected the source connector 608. The inlet end 720 includes interior webbing or walls that define fluidly separate inlets corresponding to each of the modes. In one example, the inlet end 720 defines a first or full mode inlet 744, a second or mist mode inlet 746, a third or massage mode inlet 748, and a fourth or comb mode inlet 750. It should be noted that the type and number of inlets may be varied depending on the desired functionality of the showerhead 600 and the discussion of any particular mode is used for ease of explanation and can be easily varied to direct to other types of modes, depending on the nozzle types fluidly connected thereto. Additionally, the inlet end 720 may include a fastening post 742 connected to a center of the webbing, such that the walls defining each of the inlets may extend radially outwards from the outer wall of the fastening post 742 and the fastening post 742 may be generally aligned with a center of the inlet end 720. In some embodiments, one or more fastening walls 752*a*, 752*b* may be defined on the outer sidewalls of the inlet end 720. Each of the pairs of fastening walls 752*a*, 752*b*, which may be angled or triangular shaped, may be spaced apart from one another to define a securing notch therebetween.

With reference to FIG. 25A, the exterior surface of the back plate 684 may include raised or recessed features corresponding to various fluid directing features formed on the interior surface. For example, the exterior surface may include a first raised surface 734 defined an annular step radially inwards from an outer perimeter of the head portion 704 and a second raised surface 736 or chamber top surface extending form the first raised step 734 and positioned in a central region of the head portion 704. The height and configuration may be varied as desired. Additionally, one or more fastening recesses 738*a*, 738*b*, 738*c*, 738*d* may be spaced around various locations of the exterior surface, the location of which varies depending on the expected forces and connection locations for the engine 614.

With reference to FIG. 25B, the interior surface of the back plate 684 includes multiple channel defining structures, such as walls or ribs, that along with the front plate define flow pathways within the engine 614. In one example, the back plate 684 may include three interior walls 706, 708, 710 that along with the exterior perimeter walls define flow channels 712, 714, 716, 718 for each of the modes. For example, the first flow channel 712 may be fluidly connected to the first or full mode inlet 744, the second flow channel 714 may be fluidly connected to the second or mist mode inlet 746, the third flow channel 716 may be fluidly connected to the third or massage mode inlet 748, and the fourth flow channel 718 may be fluidly connected to the fourth or comb mode inlet 750. The interior walls 706, 708, 710 may be generally parallel to one another through the handle portion 705 of the back plate 684.

With continued reference to FIG. 25B, as the interior walls 706, 708, 710 extend into the head portion 704, the walls transition from being generally straight into a circular configuration or other curved, non-linear configuration generally matching the perimeter shape of the head portion 704. Additionally, in some instances, the spacing between the various flow channel walls may increase in the head portion 704. One or more walls may branch to form additional walls within the head portion 704. In one example, the head portion 704 may include a first head portion wall 752, a second head portion wall 754, and a third head portion wall 756, each of which may be formed concentrically and generally parallel to one another. In one example, the first head portion wall 752 is the head extension of the first wall 706 and as it extends in a circular manner, near its first end, it transitions to form the second wall 708. Similarly, the second head portion wall 747 may have a first end extending from the first wall 706 and its second end extending from the second wall 708. In this example, the two first and second head portion walls 752, 754 may be connected together and the first wall 706 and the second wall 708 may span between the two head portion walls 752, 754 forming a fluid barrier between the two head portion walls 752, 754. The third head portion wall 756 may have a first end extending from the third wall 710 and its second end terminating at the first wall 706, such that the first wall 706 spans between the second end of the second head portion wall 754 and the second end of the third head portion wall 756.

In addition to the flow pathway defining walls, the head portion 704 of the back plate 684 may include one or more support walls 758, 760*a*, 760*b* positioned at various locations of the bottom surface and in the flow channels. The flow channels 758, 760*a*, 760*b* may be configured to generally track the shape and orientation of the head portion walls and as such may form arc segments or the like, but may be considerably shorter than the head portion walls.

With reference to FIG. 25B, the various walls of the back plate 684 define fluid chambers or channels, which together with the front plate, define the flow pathways through the showerhead 600. In one example, a full or first mode channel 712 is defined between the top outer wall and the third wall 710 in the handle portion 705 and then the full or first mode head channel 732 by the outer perimeter wall of the head portion 704 and the third head portion wall 756. The support walls 758, 760*a*, 760*b* may also be positioned within the space defining the first mode head channel 732. The mist of second mode channel 714 is in fluid communication with a second or mist mode head channel 730 by the second and third head portion walls 757, 756 in the head portion 704. It should be noted that a spacing channel 728 may be defined in the head portion 704 between the third head portion wall 754 and the first head portion wall 752. A massage chamber 726 is in fluid communication with the massage channel 716 and is defined by the first head portion wall 752.

Figure 26A:
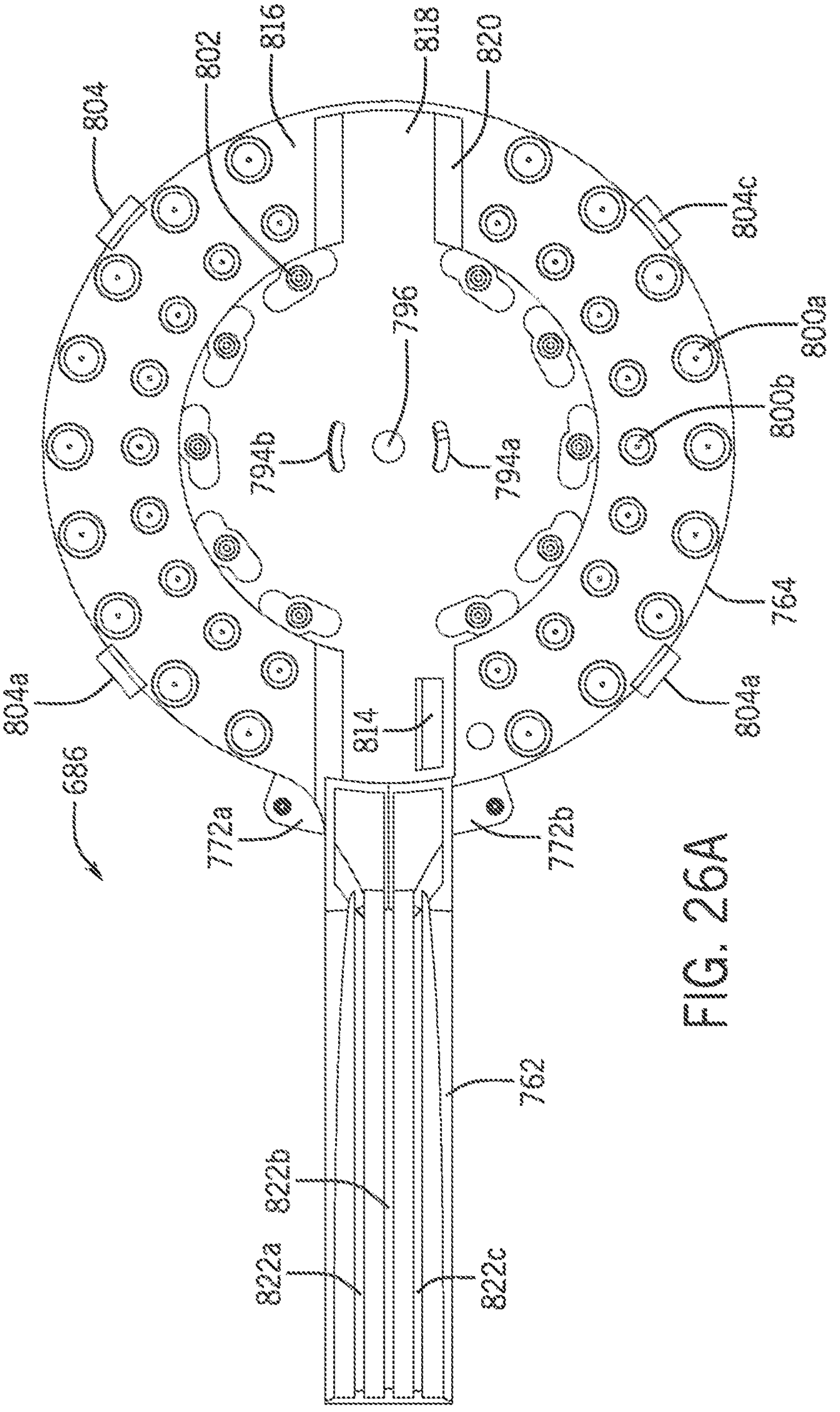
FIG. 26A is a front plan view of the front plate of the engine of FIG. 24A.
Figure 26B:
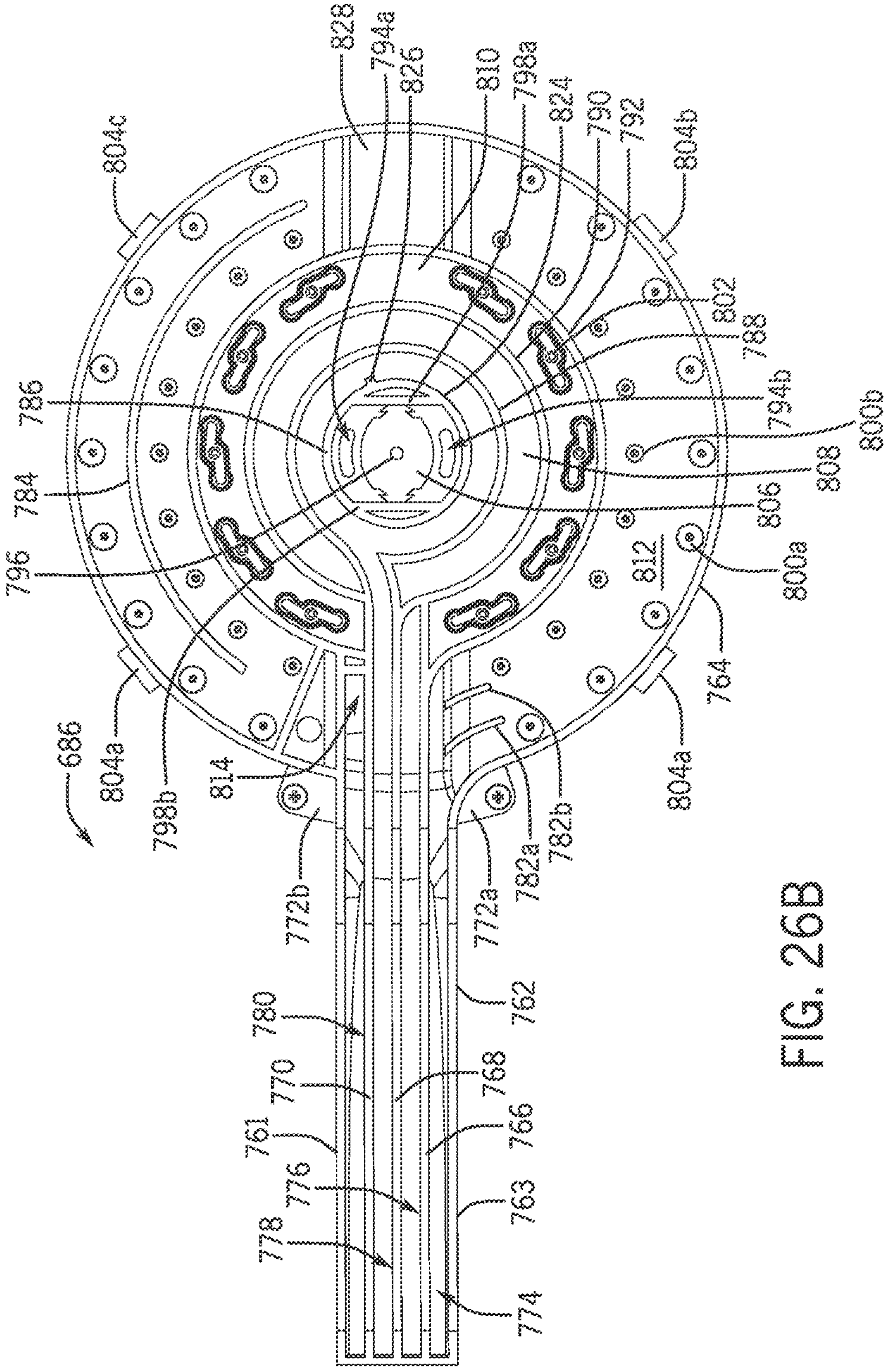
FIG. 26B is a rear plan view of the front plate of FIG. 26A.

The second or front plate 686 of the showerhead 600 will now be discussed in more detail. FIGS. 26A-26B illustrate top and bottom plan views, respectively, of the second or front plate 686. The front plate 686 may be configured generally match the shape of the back plate 684, since they connect together to define the interior flow compartments within the engine 614. As such, in embodiments where the showerhead 600 is a hand held, the front plate 686 may include a handle portion 762 formed as a straight elongated body and a head portion 764 extending radially outwards from a terminal end of the handle portion 762. The head portion 764 may be formed as a generally circular disc matching the shape and diameter of the housing. In some embodiments, the front plate 686 may include one or more securing elements, such as triangular shaped flanges 772*a*, 772*b* extending outwards from the intersection of the head portion 764 with the handle portion 762 and one or more securing brackets 804*a*, 804*b*, 804*c*, 804*d* spaced along the outer perimeter sidewall of the head portion 764.

The head portion 762 may be configured to seat within the back plate 684 and in therefore may be shorter from the handle portion 705 of the back plate 684. With reference to FIG. 26A, the handle portion 762 may include a plurality of strengthening ribs 822*a*, 822*b*, 822*c* extending longitudinally along a length of the handle portion 762 and parallel to one another. In some embodiments, the middle support rib 822*b* may extend to the outer perimeter of the head portion 764, whereas the outer support ribs 822*a*, 822*c* may terminate at an earlier location. With reference to FIG. 26B, the interior surface of the handle 762 includes flow directing walls 766, 768, 770, extending parallel to one another and along the length of the handle portion 762. Each of the flow directing walls 766, 768, 770 are spaced apart from each other and the outer perimeter walls in order to define a plurality of flow channels therebetween. In one example, the first outer perimeter wall 763 and the first handle wall 766 may define a first or full mode channel 774, the first handle wall 766 and the second handle wall 768 may together define a second or mist mode channel 776, the second handle wall 768 and the third handle wall 770 may together define a third or massage mode channel 778, and the third handle wall 770 and the second perimeter wall 761 may together define a fourth or comb mode channel 780. It should be noted that the number and type of channels may be varied depending on the desired channels for the showerhead 600.

A drop down aperture 814 is defined within the head portion 764 between the third handle wall 770 and the perimeter wall 761 as the walls extend into the head portion 764. The drop down aperture 814 is in fluid communication with the comb model channel 780 and may be formed a rectangular shaped port or outlet. The drop down aperture 814 may be positioned adjacent to or immediately within the head portion 764 on the handle portion.

With reference to FIG. 26B, the various handle flow walls may extend into and form head portion walls in the head portion 764. The second and third channel walls 768, 770 transition to a circular pattern at their terminal ends to form two ends of the first head portion wall 788. The second and third channel walls 768, 770 also branch to form the second head portion wall 790 positioned radially outward from the first head portion wall 788 and encircles the first head portion wall 788. A third head portion wall 792 is defined by the first handle wall 766 and the third handle wall 770.

The various head walls define flow channels within the head portion 764 of the front plate 686. In one example, a first or full channel mode channel 812 is defined between the outer perimeter of the head portion and the third interior wall 792, a mist mode channel 810 is defined between the two third head portion wall 792 and the second head portion wall 790. A spacing channel 808 is defined between the second head portion wall 790 and the first head portion wall 788. A massage channel is defined by the head portion wall 780. In one embodiment, the first or full channel mode 812 may be deeper or recessed from the other channels, but in other embodiments, may be differently configured.

With continued reference to FIG. 26B, the head portion 764 defines a water division chamber that may be positioned at a central region of the head portion 764. The water division chamber may be defined by a chamber floor or interior surface 806 bounded by a raised chamber wall 826, that may circular shaped. In one example, a keyed recessed structure may be formed in the chamber floor 806. In some embodiments, the chamber wall 826 may have a height that is higher than the flow division walls 788, 790, 792. A pin recess 726 may be formed in the center of the chamber floor 806 of the chamber. Two constraining edges 798*a*, 798*b* or walls extend through the chamber floor 806 from opposite ends of the chamber 826 wall to define a planar track. Dividing ports 794*a*, 794*b* are defined on opposite ends of the chamber floor 806 and are positioned between the constraining edges 798*a*, 798*b*. The diving ports 794*a*, 794*b* may be formed as arc shaped apertures and be dimensioned to be larger than the nozzle apertures 800*a*, 800*b*, 802, to prevent pressure drops as water flows through them for reasons discussed below. In one embodiment, the dividing ports 794*a*, 794*b* may be at least twice as large as the nozzle apertures and, in some embodiments, three times to five times as large.

A raised comb bar 828 may be defined between the outer perimeter wall and the third head portion wall 792 The comb bar 828 may have sloping sides so as to form a plateau within the full body mode channel 812. In one embodiment, the comb bar 828 may be aligned with the hand portion 762, but in other embodiments, may be located at different areas on the front plate 686.

With reference to FIG. 26B, the exterior surface of the front plate 686 may have a varying topography to accommodate the spray cap. In one example, the recessed comb trough 818 or comb formation may be formed on the exterior surface of the front plate 686, opposite of the raised comb bar 868 on the interior surface. Convexly shaped sloped walls 820 may transition from the raised portion 816 of the exterior surface to the comb trough 818. The comb trough 818 may be formed as a rectangular bar extending across a diameter of the head portion 764 and may include a circular recessed region in the center of the head portion 764. In one example, the comb port 814 is defined through a portion of the comb trough 818 to fluidly connect the exterior surface of the comb trough 818 to the fluid source. Similarly, the division ports 794*a*, 794*b* may be in fluid communication with the exterior surface of the comb trough 818.

It should be noted that in some embodiments, the nozzles of the face plate 686 may include raised structures surrounding the apertures, but in other embodiments, may be formed as a flush apertures. The structure of the nozzles may vary as desired.

Figure 27A:
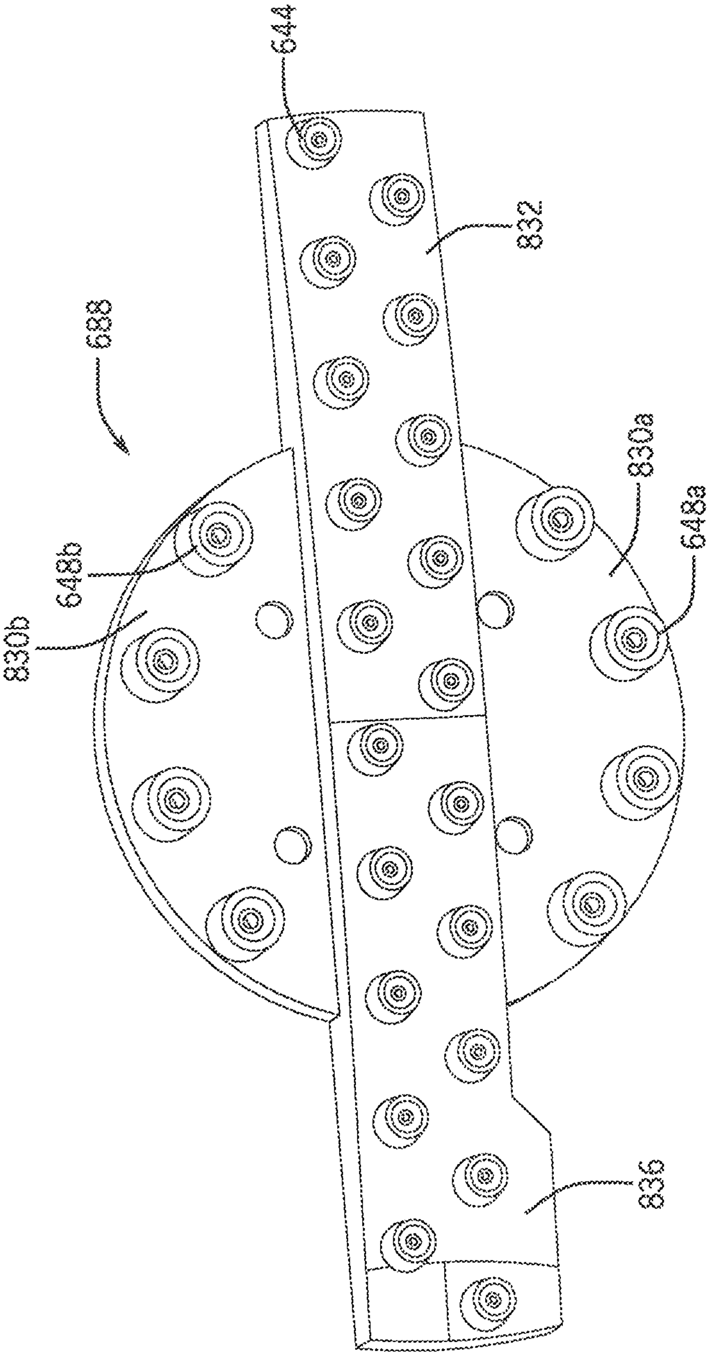
FIG. 27A is an isometric view of a spray cap of the showerhead of FIG. 21A.
Figure 27B:
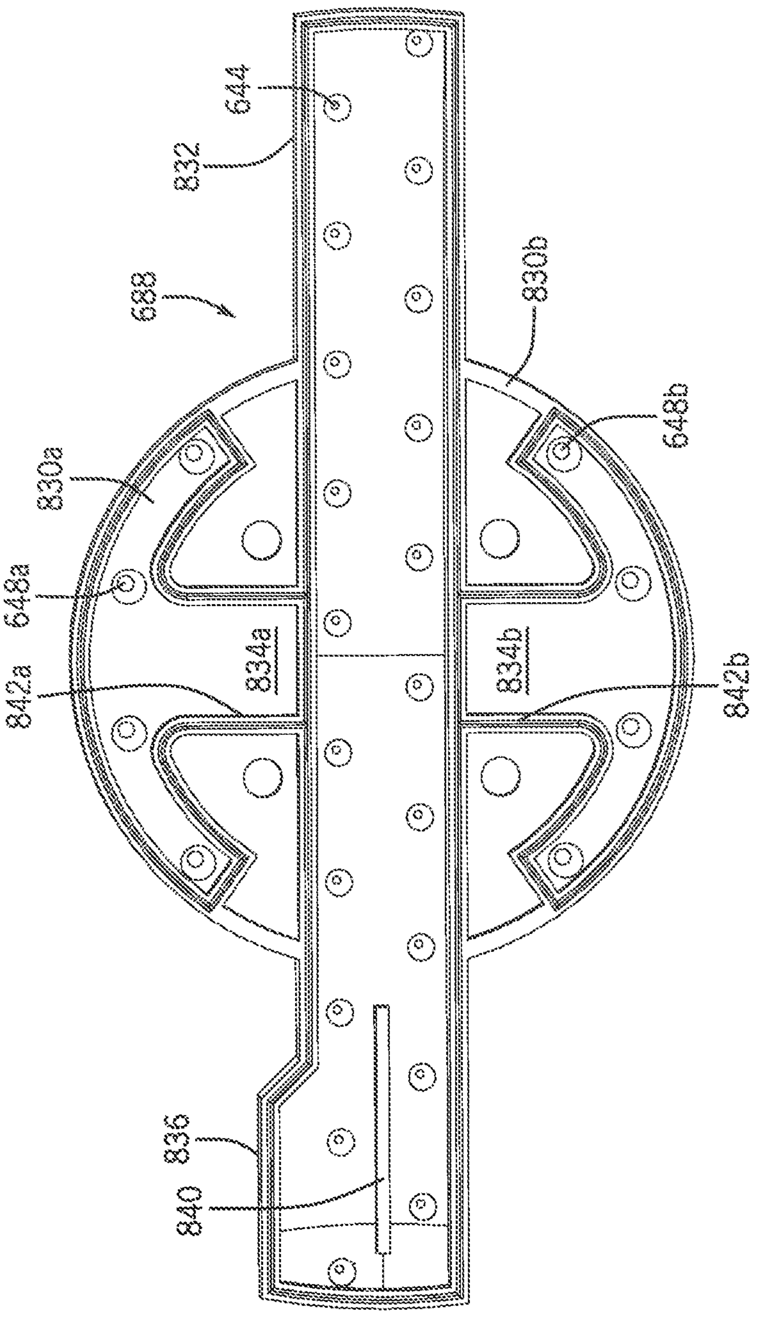
FIG. 27B is a rear plan view of the spray cap of FIG. 27A.

With reference to FIGS. 27A and 27B, the spray cap 688 will now be discussed in more detail. The spray cap 688 forms as a massage plate or exterior plate for the engine 614 to allow water to be directed to a secondary level below the face plate 686, allowing nozzles for different modes to be positioned in varying locations across the spray face 604. In one example, the spray cap 688 is formed as a circular platform intersected by a generally rectangular bar. However, depending on the shape of the showerhead and desired nozzle configurations, the shape of the spray cap 688 may be varied. In the example shown in FIGS. 27A-27B, a comb plate 832 is formed as the rectangular bar that bisects a massage plate forming a first and second massage plates or pads 830*a*, 830*b*. The comb plate 832 may be raised relative to the massage plates 830*a*, 830*b* such that it may form a raised section as it extends over the massage plates 830*a*, 830*b*. An inlet end of the comb plate 832 may include a cape 836 that jets out from a sidewall of the comb plate 832 to define an increased inlet area for the spray cap 688. A support wall 840 may extend upward from the interior bottom surface of the comb plate 832 and be at least partially aligned with the cap 836.

The comb nozzles 644 are defined through the comb plate 832 and may be aligned in two parallel rows of offset apertures. The comb nozzles 644 are shaped and aligned to define two plurality of streams aligned with one another that can act as a water comb on a user's hair.

The massage plates 830*a*, 830*b* each include a group or bank of massage mode nozzles 648*a*, 648*b*. In one example, there may be four massage nozzles 648*a*, 648*b* in each bank and the nozzles may be spaced around the circular plate so as to define an arc of nozzles. However, in other examples, the nozzles may be varied as desired.

With reference to FIG. 27B, the massage nozzles 648*a*, 648*b* are fluidly connected to the division ports 794*a*, 794*b*, as discussed below, and may include canals 842*a*, 834*b* defined by massage walls 842*a*, 842*c* to direct water as it exits the ports 794*a*, 794*b* toward the massage nozzles 648*a*, 648*b*. In one example, the massage walls 842*a*, 842*b* may include a straight section that intersects the comb plate perimeter wall perpendicularly and as the walls 842*a*, 842*b* extend outward toward the perimeter of the massage plates 830*a*, 830*b*, may angle and curve around the last massage nozzle in each bank to ensure water is delivered from the straight section to each of the massage nozzles. As can be appreciated, the canal structure and arrangement may be varied depending on the number and orientation of the massage nozzles 648*a*, 648*b*.

Figure 23B:
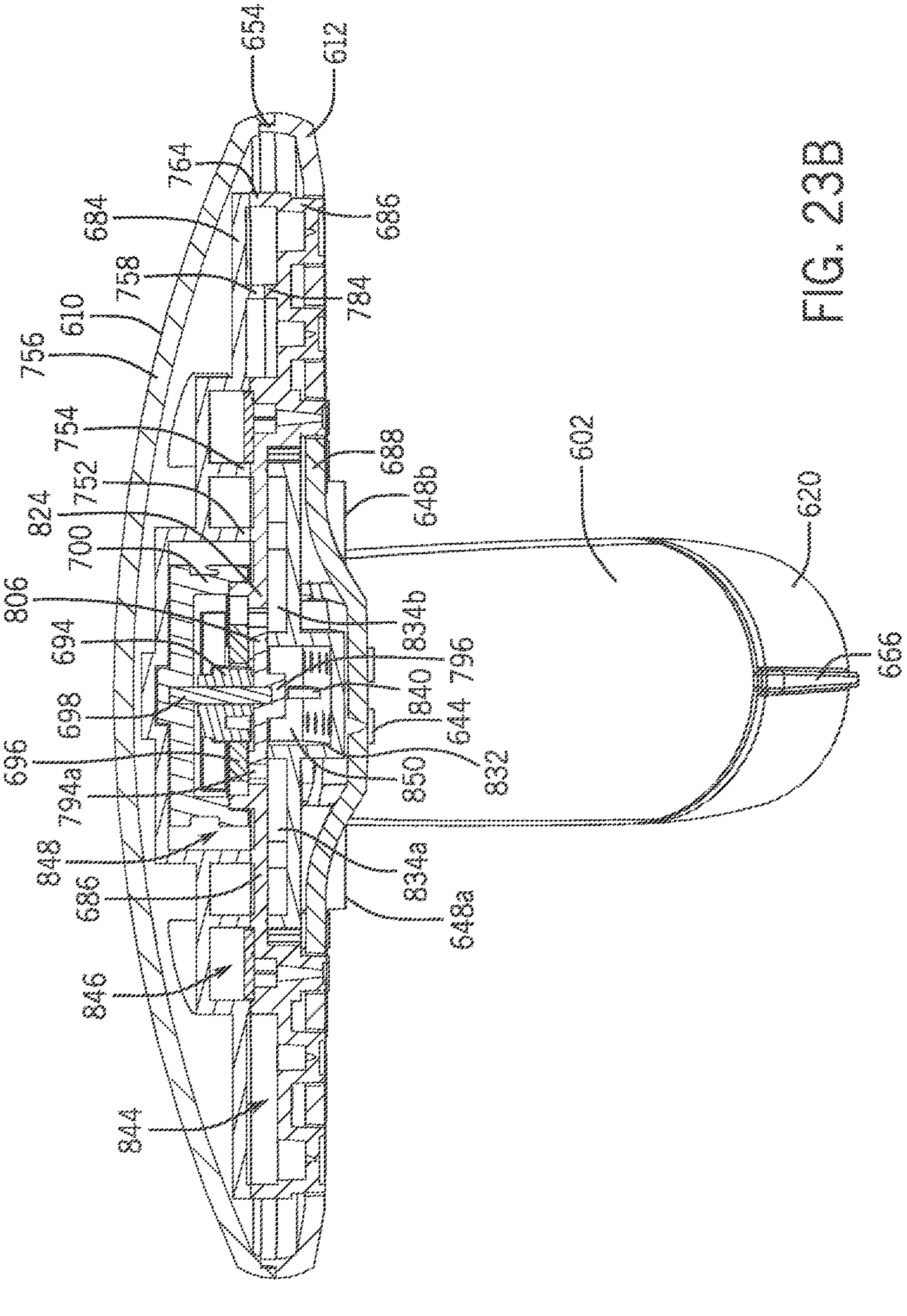
FIG. 23B is a cross-section view of the showerhead of FIG. 21A.

Connection and assembly of the showerhead 600 will now be discussed. With reference to FIGS. 22 and 24A-24B, the engine 614 may be secured together and the housings 610, 612 may then be received around the engine 614 and secured together. With reference to FIGS. 23B, 24A and 24B, the water direction assembly 680 may be received within the front plate 686. The shutter 696 may be positioned around the cam section of the turbine 694 and the pin 698 is threaded through the shutter 696 and the turbine 694. The shutter 696 is then positioned within the chamber cavity in the front plate 686 defined by the chamber wall 824 with the straight edges of the shutter 696 being aligned with the first and second constraining walls 798*a*, 798*b*. A first end of the pin 698 is received in the pin recess 796 in the chamber floor 806. The jet plate 700 is fitted over the turbine 694 and a corresponding pin recess in the jet plate 700 receives a second end of the pin 698. The jet plate 700 sits on the top surface and extends over an outer sidewall of the chamber wall 824 to define a massage chamber between the top interior surface of the jet plate 700 and the bottom interior floor 806 of the front plate 686.

With reference to FIGS. 23A, 23B, 24A, and 26B, the mist plate 690 may be positioned within the mist mode channel 810 on the front plate 686 and the mist apertures aligned with the mist most apertures 802 formed within the front plate 686. The second and third head portion walls 790, 792 act to retain the mist plate 690 in position. With the ends of the mist plate 690 abutting against a portion of the second and third handle walls 766, 770.

With the internal components of the engine 614 aligned in position on the front plate 686, the back plate 684 may be secured to the front plate 686. In one example, the terminal end of the handle portion 762 of the front plate 686 is seated on the handle portion 705 of the back plate 684 adjacent to the inlet end 720. With the perimeter walls 761, 763 and the flow directing walls 766, 768, 770, aligning with and seating on the corresponding perimeter and flow directing walls 706, 708 710 of the back plate 684. Similarly, the head portions 704, 764 of the back and front plates 684, 686 mate such that the head flow directing walls 752, 754, 756, 758 seat on the top surface of the corresponding head flow directing walls 788, 790. 792. Specifically, the first mode wall 752 seats on the first mode wall 788, the second mode wall 754 seats on the second mode wall 790, and the third mode wall 756 seats on the third mode wall 792. In this manner, full body channels 714, 732, 774, 812 define a full body pathway 844, the mist mode channels 714, 730, 776, 810 define a mist pathway 846, and the massage channels 716, 726, 778, define the massage pathway 848. The various pathways 844, 846, 848 may each been in fluid communication with a respective inlet 742, 744, 746, 748 on the inlet end 720 of the back plate 684. The comb mode may not include The back plate 684 and the front plate 686 may be secured together, such as through ultrasonic welding, adhesive, fasteners, or a combination of methods.

Before or after the two plates 684, 686 are connected together, the spray cap 688 is aligned with and connected to the exterior surface of the front plate 686. In one example, the spray cap 688 seats within the comb trough 818. In particular, the comb plate 832 is aligned with the rectangular ends of the comb trough 818 and the massage plates 830*a*, 830*b* are positioned within the central region of the outer surface of the front plate 686. The massage canals 834*a*, 834*b* are positioned below the division ports 794*a*, 794*b* so as to be fluidly connected thereto. The cape 836 of the comb plate 832 is aligned with the drop down aperture 814 to be fluidly connected thereto. The comb plate 832 perimeter wall fluidly separating the comb channel from the massage canals 834*a*, 834*b*. The spray cap 688 and the outer surface of the front plate 686, along with the comb channels 718, 780 define a comb pathway 850 through the engine 614.

With the engine plates secured together, the valve face 628 is positioned on the inlet end 720 of the back plate 684. The mode apertures 631*a*, 631*b*, 631*c*, 631*d*, 631*e* are aligned with the corresponding mode inlet apertures 744, 746, 748, 750 and the post 627 of the valve face 628 is inserted into the fastener post 742 of the inlet end 720.

With reference to FIGS. 22 and 23A, the mode assembly 606 is secured to the engine 614. A valve seal 624 is seated on the bottom surface of the circular base plate 629 of the valve face 628. The valve stud 630 is then inserted through the fastening aperture 678 of the valve 622 and into the post 627 of the valve face 628. The open threaded end of the valve stud 630 extends from the fastening aperture 678 of the valve 622. The feedback assemblies 618 are positioned in the respective feedback cavities 670 of the valve 622, with the spring element be positioned in the cavity and the plunger or other biased element being positioned on the spring and compressing the spring in the cavity 670.

The actuator 620 is aligned with the valve body 622, such that the connection tab 682 of the valve 622 is received within a groove defined by the securing ribs 668 on the interior surface of the actuator 620. In this manner, the actuator 620 is secured to the valve 622 such that rotation of the actuator 620 will rotate the valve 622.

The source connector 608 is then secured to the bottom end of the valve 622. The fastener bridge 662 is aligned with the fastening aperture 678 and the valve stud 630 and fastener 607 is inserted through the fastening bridge 622 and into the valve stud 630, securing the source connector 608 to the valve stud 630. The source connector 608 is partially inserted into the valve inlet end 672 and valve seal 626 may be positioned on an outer surface of the source connector 608 such that the seal 626 is compressed between the outer surface of the top end of the source connector 608 and the interior surface of the bottom end of the valve 622. The top end of the source connector 608 including the detents 664 is aligned with the bottom surface of the valve 622 such that the feedback assemblies 618 can engage and disengage from the detents 664.

With the engine 614 and the mode assembly 606 secured together, the first housing 610 and the second housing 612 are received around and secured to the engine 614. For example, the securing brackets 804*a*, 804*b*, 804*c*, 804*d* on the front plate 686 are secured to corresponding tabs 656 on the interior surface of the second housing 612. Additionally, fasteners 616, which may include one or more star washers, are positioned in fastening recesses 738*a*, 738*b*, 738*c*, 738*d*, and in corresponding recesses defined in the interior surface of the first housing 610. Similarly, fasteners may be inserted into apertures in the flanges 772*a*, 722*b* defined on the front plate 686 and received into fastening posts defined on the interior surface of the second housing 612. The two housings 610, 612 may be press fit into positon, with the rim 654 of the second housing 612 being received within a corresponding lip recess in the first housing 610. Alternatively, other securing means, such as adhesive, fasteners, welding, or the like, may be used to secure the housings 610, 612 together.

Operation of the showerhead 600 will now be discussed in more detail. With reference to FIGS. 23A, 23B, and 25B, as the water source is activated, e.g., a user turns on the shower faucet or activates the hot/cold knobs, the water will flow into the J-pipe and optionally into a hose connected to the showerhead 600. From the hose, the water enters into the source connector 608, flowing through the connection lumen 660 and around the fastener bridge 662. From the source connector 608, the water flows into the inlet of the valve 622 and through the valve outlet 676. Depending on the alignment of the valve 622, the water then flows through the mode apertures 631*a*, 631*b*, 631*c*, 631*d*, 631*e* of the valve face 628 into one of the mode inlets 744, 746, 748, 750 in the inlet end 720 of the back plate 684. From the mode inlets 744, 746, 748, 750 the water enters one of the pathways 844, 846, 848, 850 formed by the flow channels defined by the two flow directing plates 684, 686. To change modes, the actuator 620 is rotated by a user gripping the tab 666, causing the valve 622 to rotate relative to the engine 614 and valve face 628. As this occurs, the valve 622 outlet 676 aligns with a different mode inlet and the feedback assemblies compress and expand into the next detent on the top surface of the source connector 608.

When water is directed to the full body mode pathway 844, the water flows through the channels 712, 774, into the head portion and channels 732, 812, and out of the full body mode apertures 800*a*, 800*b*. When the valve 622 is aligned with the mist mode inlet 746, the water flows into the mist mode pathway 846 (i.e., through channels 716, 776 in the handle portions and channels 730, 810 in the head portions), through the mist mode plate 692 and out of the mist mode apertures 810.

When the valve 622 outlet 676 is aligned with the massage mode inlet 748, the water flows through the massage channels 716, 776 and into the massage chamber. From the massage chamber, the water flows into the jet plate 700 through the inlet jets 706. The water jets defined by the inlet jets 706, impact the turbine 694, causing the turbine 694 to rotate. As the turbine 694 rotates, the shutter 696 oscillates side to side, with its movement being constrained by the edges 798*a*, 798*b* of the chamber wall 824 in the front plate 686. In a first position of the shutter 696, the water in the chamber is fluidly connected to the first division port 794*a* and water exits the chamber and drops down a level into the spray cap 688. The first port 794*a* is aligned with the first canal 834*a* and the water is deposited into the canal 834*a*. From the canal 834*a*, the water is directed to the massage mode outlets 648*a*. As the turbine 694 continues to rotate, the shutter 696 is moved to the second positon and covers the first port 794*a* and uncovers or opens the second port 794*b*. In this position, the water drops into the spray cap 688 and the canal 834*b*. From the canal 834*b*, the water is directed to the second bank or group of massage nozzles 648*b*. The shutter 696 may then be returned to the first position, by the continued rotation of the chamber.

As briefly noted above, in many embodiments, the division ports 794*a*, 794*b* have a diameter that is at least two times larger than the diameter of the outlet nozzles. In these embodiments, the water in the canals 834*a*, 834*b* may not fully exit the showerhead when the next allotment of water is distributed by the division assembly 680 into the canals 834*a*, 834*b*. This additional water, exerts a force on the water already present, and helps to push the water out more forcefully. Further, because of the backlog of water in the canals 834*a*, 834*b* or ported chamber, the water streams exiting the massages outlets 648*a*, 648*b* may be "smoothed" out and the oscillating nature of the water division, lessened, if not reduced. Varying the dimensions of the division ports to the massage nozzle outlets can vary the exit characteristics of the fluid streams and in instances where more smooth streams are desired, a ratio of diameter size of approximately 3:1 may be desirable, but in other embodiments, other ratios may be selected (e.g., 2:1, 4:1, 5:1).

The dual-level of the ports relative to the outlet nozzles, as well as a lack of pressure drop from the division ports, allows the water exiting the massage chamber to be ported or otherwise directed to outlet nozzles substantially anywhere on the spray face. Thus, as compared to conventional showerhead, where the massage outlets need to be located directly below the massage engine, the massage outlets can be located laterally adjacent and otherwise vertically misaligned from the massage engine.

With reference to FIGS. 23A, 23B, 25B, 26B, when the valve outlet 676 is aligned with the comb mode inlet 750, fluid is directed into the come channels 718, 780. As the fluid travels through the channels, the fluid exits the flow directing plates 684, 684, via the drop down aperture 814. The drop down aperture 814 acts as an exit port for the bottom plate 686 and the water is ported to the spray cap 688, a level down from the bottom plate 686. From the drop down aperture 814, water is directed into the comb plate 832. The walls of the comb plate 832 prevent the water from entering into the massage canals 834*a*, 834*b*, and the water is directed to the comb outlet nozzles 644. Due to the linear arrangement of the parallel rows of nozzles 644, the water streams exiting the spray cap 688 during the comb mode form a "comb" like water shape with two parallel walls of water streams. This configuration allows a user to move the showerhead 600 over his or her head and the water streams act to part the hair and otherwise comb the hair.

Figure 28A:
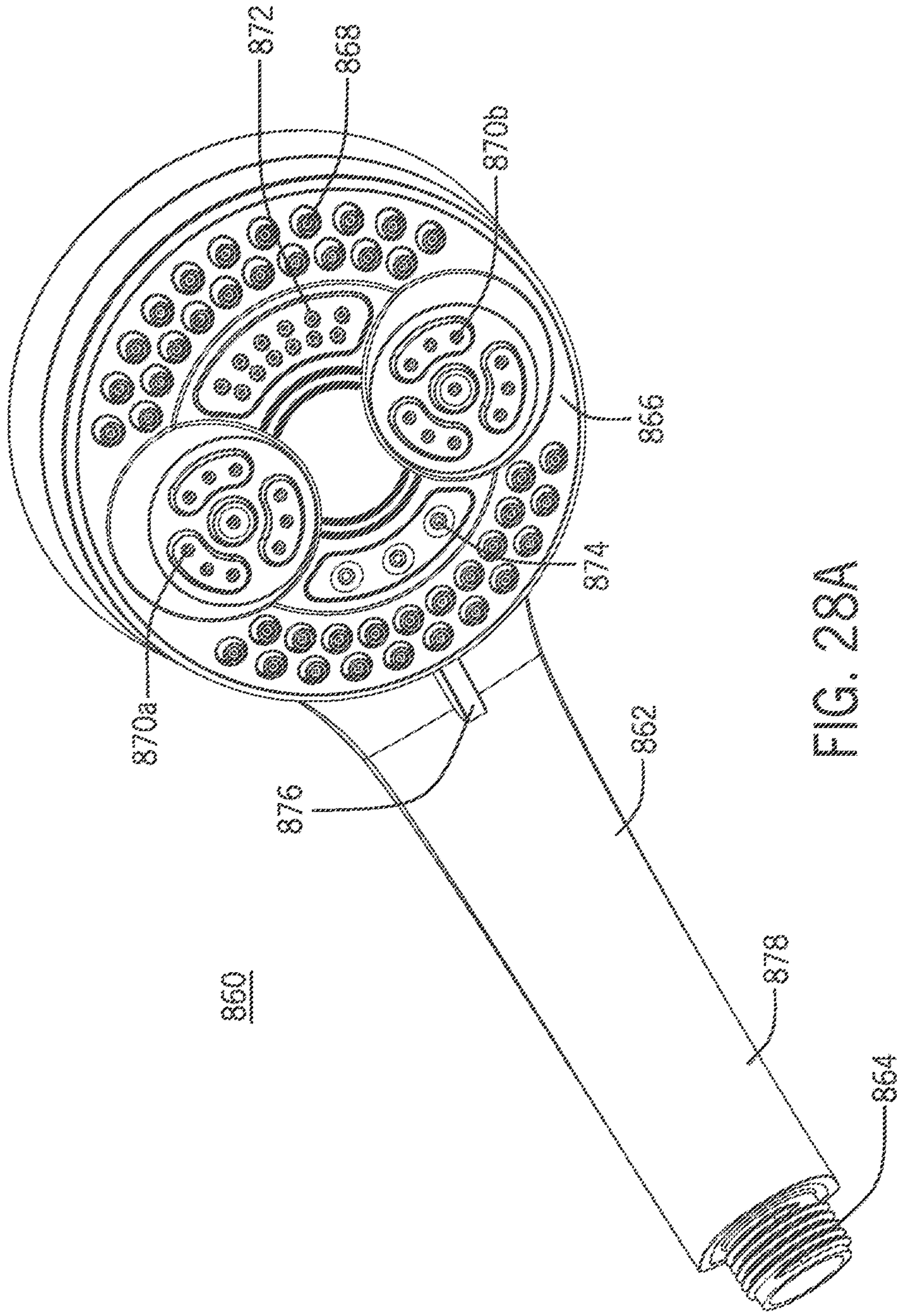
FIG. 28A is a front isometric view of another example of a showerhead with a water direction assembly.

With reference to FIGS. 28A-34 another example of a showerhead including the water direction assembly will now be discussed. FIGS. 28A and 28B illustrate various views of the showerhead 806 including a water direction assembly for remotely porting water to various nozzle locations across the spray face. In one example, the showerhead 860 may include a mode assembly mounted directly above the engine, as compared to the mode assembly 606 mounted within the handle portion of the showerhead.

Figure 28B:
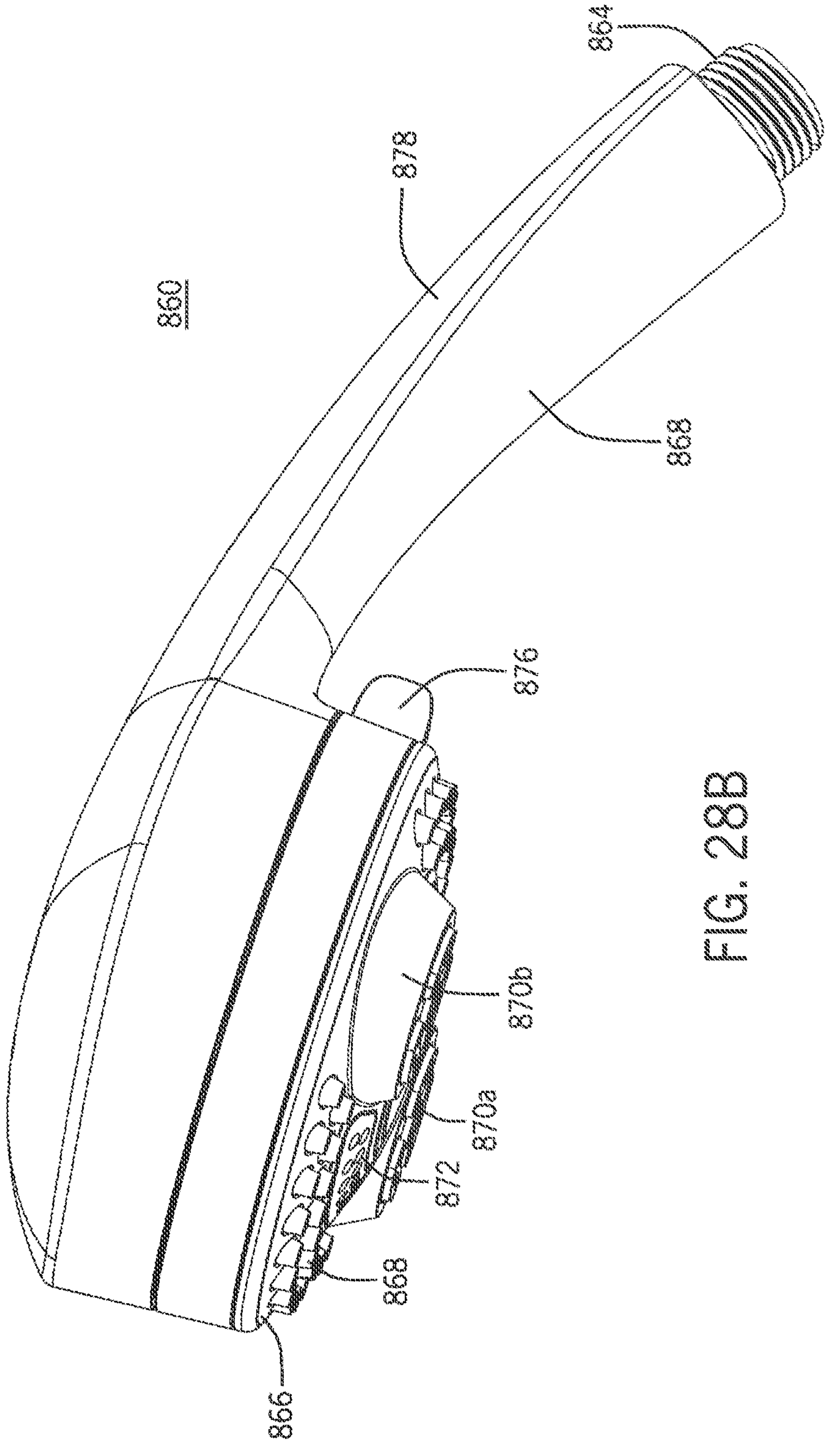
FIG. 28B is a side elevation view of the showerhead of FIG. 28A.

The showerhead 860, which may be a fixed mount, or as shown in FIGS. 28A and 28B, a handheld showerhead, includes a housing 862 including a handle portion 878 and a spray head 866. The handle portion 878 may be formed as an elongated member that extends outwards at one end to define a circular shaped spray head 866. In some embodiments, the housing 862 may be an integrally or uniformly formed member with the spray head 866 defining an open end in which the engine 914 and other internal components of the showerhead 860 are inserted.

In this example, the showerhead 860 includes multiple nozzle groups 868, 870*a*, 870*b*, 872, 874 corresponding to different shower modes. The type and number of the nozzle groups may be varied depending on the desired flow characteristics of the showerhead 860.

Figure 30:
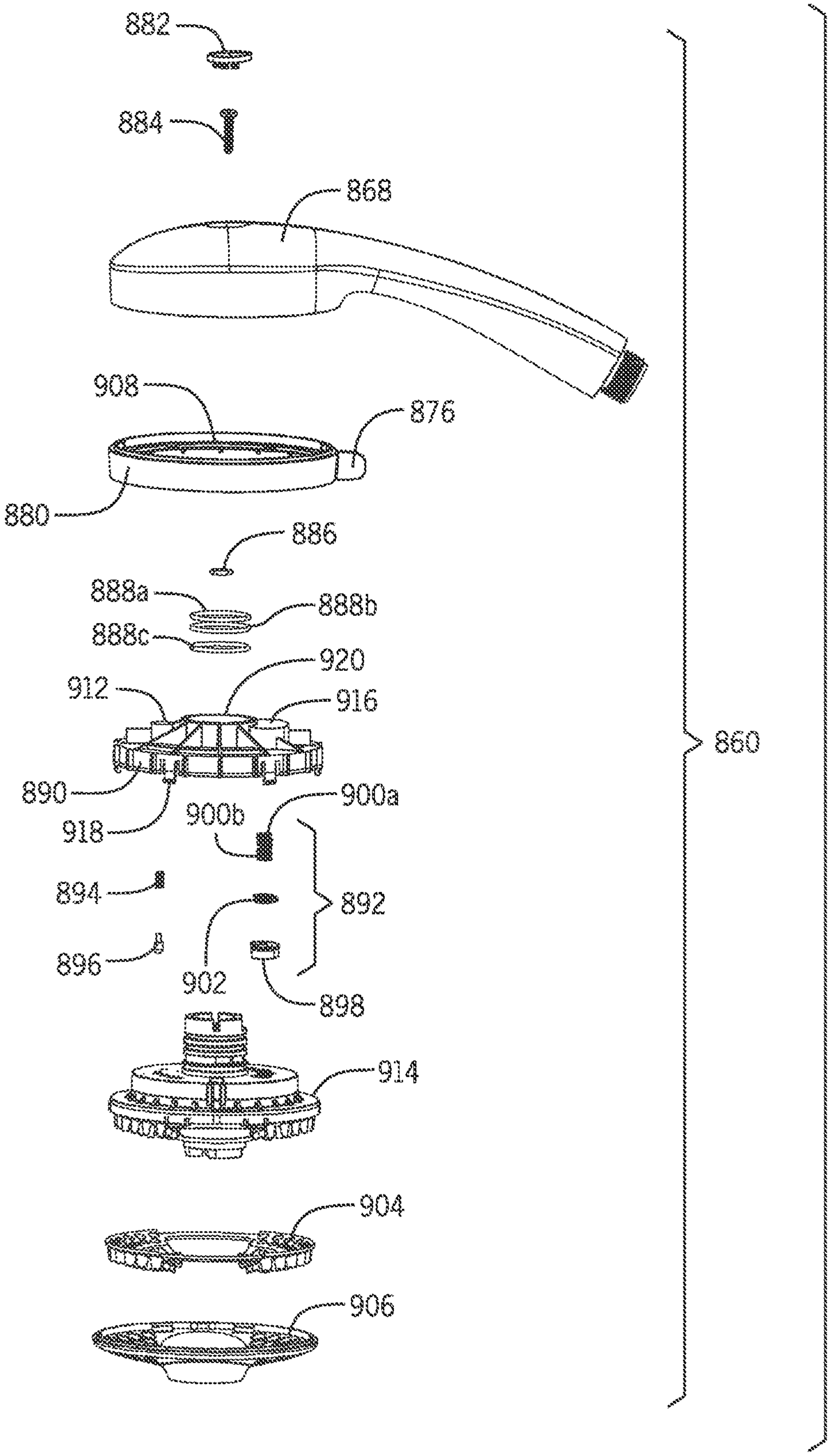
FIG. 30 is an exploded view of the showerhead of FIG. 28A.

FIG. 30 illustrates an exploded view of the showerhead 860. As shown in FIG. 30, the showerhead 860 may further include an engine cap 882, fastener 884, an engine 914, a mode actuator 880, a mode housing 890, a mode seal assembly 892, a nozzle boot 904, a face plate 906, and one or more seals 886, 888*a*, 888*b*, 888*c*, each of which may be operably coupled together.

The mode actuator 880 is configured to selectively move the mode housing 890 relative to the engine 914 in order to direct fluid into a flow pathway corresponding to one or more of the nozzle groups 868, 870*a*, 870*b*, 872, 874. In one example, the mode actuator 880 is formed as a circular ring including a plurality of gripping tabs 908 spaced apart from one another on an interior surface. Additionally, the mode actuator 880 may include a user tab 876 or gripping element to assist a user in rotating the mode actuator 880. The user tab 876 may extend outwards from an outer surface of the actuator 880.

Figure 29A:
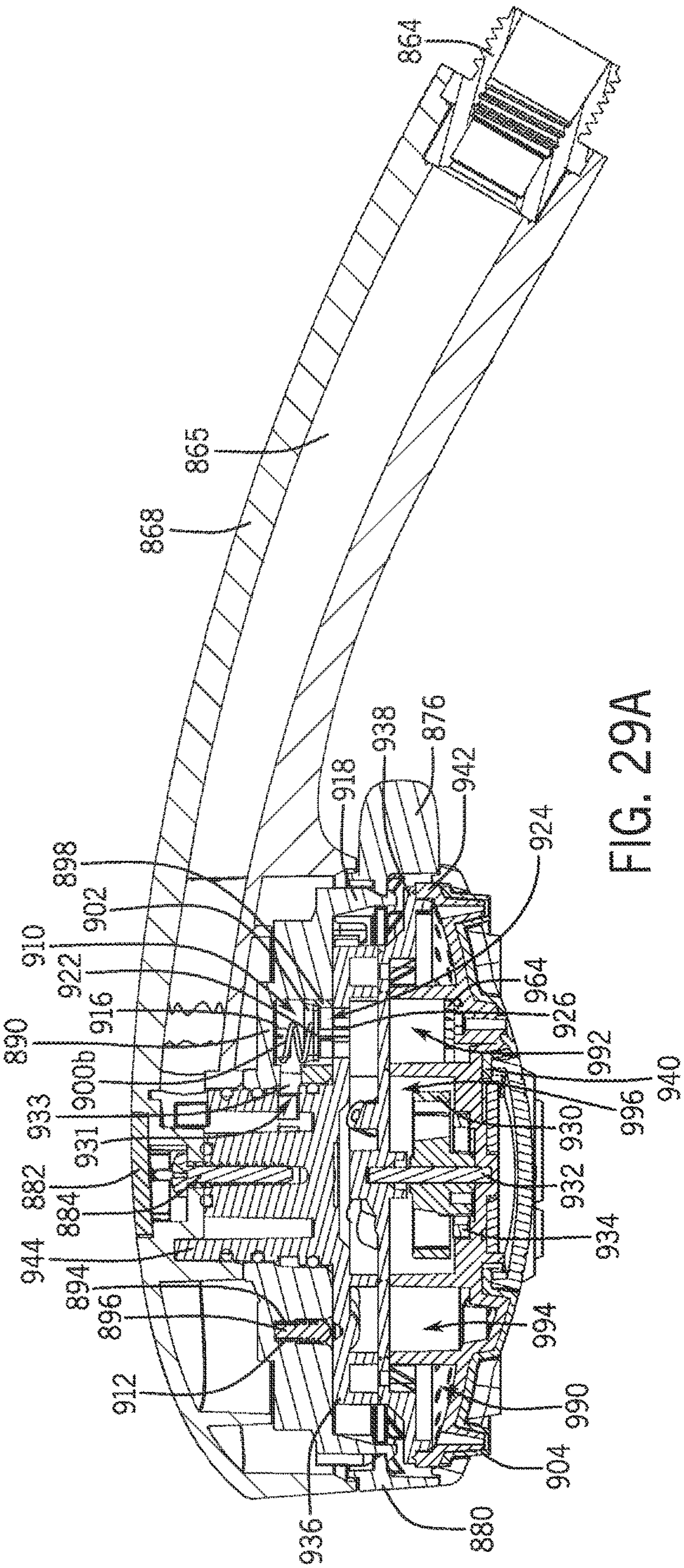
FIG. 29A is a cross-section view of the showerhead of FIG. 28A.
Figure 29B:
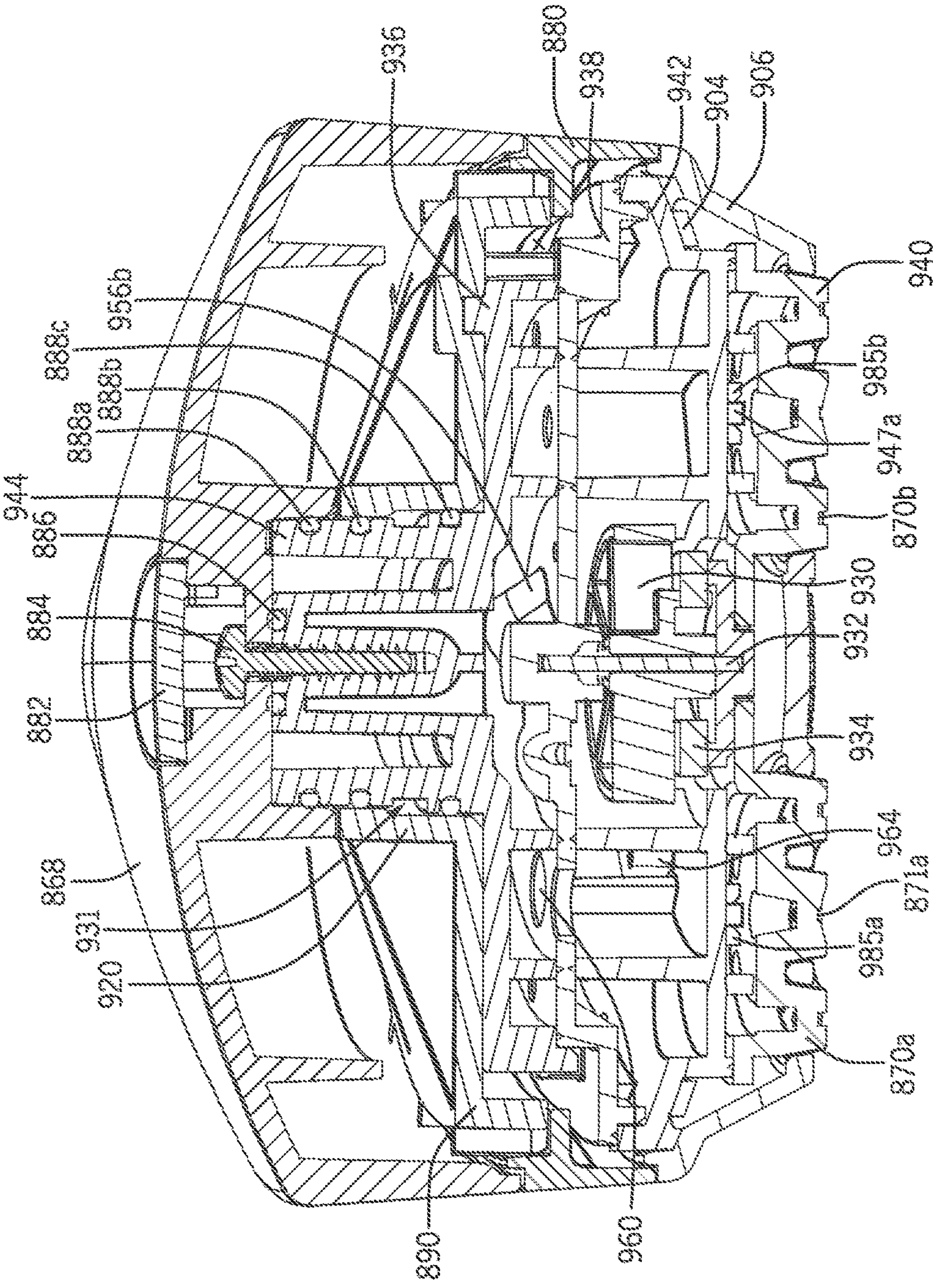
FIG. 29B is another cross-section view of the showerhead of FIG. 28A.

With reference to FIGS. 29A, 29B, and 30, the mode seal housing 890 may be generally formed as a circular base plate with a plurality of raised protrusions extending from the top surface thereof to form various cavities and compartments for the mode assembly, discussed below. A connection boss 920 extends upwards from the top surface and defines a passageway therethrough. The connection boss 920 may be supported on its outer surface by webbing or angled ribs extending from the top surface of the housing 890 to the outer sidewall of the boss 920. One or more engagement tabs 918 are spaced around a perimeter sidewall to engage the mode actuator 880. As shown in FIG. 29A, a seal cavity 910 may be formed by a raised wall extending upwards from the top surface and may be shaped as a somewhat oval shaped compartment. A mode inlet 933 is defined through an interior sidewall of the wall forming the seal cavity 910. One or more seal posts 916 extend downward from the interior surface of the top of the mode seal housing 890 into the seal cavity 910, in one example, there may be two spring posts 916.

The mode assembly 892 is configured to selectively seal mode inlet apertures of the engine 914 to direct water into a select mode or modes. In one example, the mode assembly 892 includes one or more biasing elements 900*a*, 900*b*, which may be one or more coil springs, a seal plate 902, and a mode seal 898. The seal plate 902 acts to equalize the force of the biasing elements 900*a*, 900*b* to provide a more uniform biasing force to the mode seal 898. In one example, the seal plate 902 may be formed as a planar arc shaped body having a mode aperture defined through a center area and optionally one or more spring apertures defined on either side of the mode aperture. In these embodiments, the seal plate 902 may be formed of a rigid material, such as a hard plastic, metal, alloy, or the like.

The mode seal 898 seals around a select mode inlet to direct fluid into a particular direction. In these embodiments, the mode seal 898 may be formed of a compressible material, such as rubber, silicone, or the like. The mode seal 898 includes a mode aperture 924 defined therethrough and may include a support rib 926 extending across the width of the mode aperture to provide additional structural support. In one example, the support rib 926 may bisect the mode aperture 924. One or more seal bosses 922 extending upwards from a top surface of the mode seal 898 and are configured to secure to the biasing elements 900*a*, 900*b*. Optionally, the mode seal 898 may include a top perimeter lip extending from the top surface.

The showerhead 860 may include a feedback mechanism or assembly for providing feedback to a user regarding a position of the mode assembly relative to the engine. In one example, the feedback mechanism includes a biasing element 894, such as a coil spring, or the like, and a plunger 896 coupled and biased by the biasing element 894.

The face plate 906 defines an outer surface of the showerhead 860 and as such may be designed to include an aesthetically pleasing shape and configuration. The face plate 906 defines a plurality of nozzle apertures therethrough which may be arranged based on the desired nozzle outlet types, e.g., nozzle groups. In one example, the face plate 906 may include four types of apertures therethrough, each corresponding to a different nozzle group or mode.

A nozzle boot 904 may be formed as a compressible element, such as rubber, and define a plurality of nozzles therethrough. The nozzle boot 904 may include only a select group of nozzles and in one example may include two separate nozzle banks corresponding to the full body mode, e.g., nozzles 868, which may be arranged as arc sections, which may be connected to an outer perimeter ring.

Figure 31A:
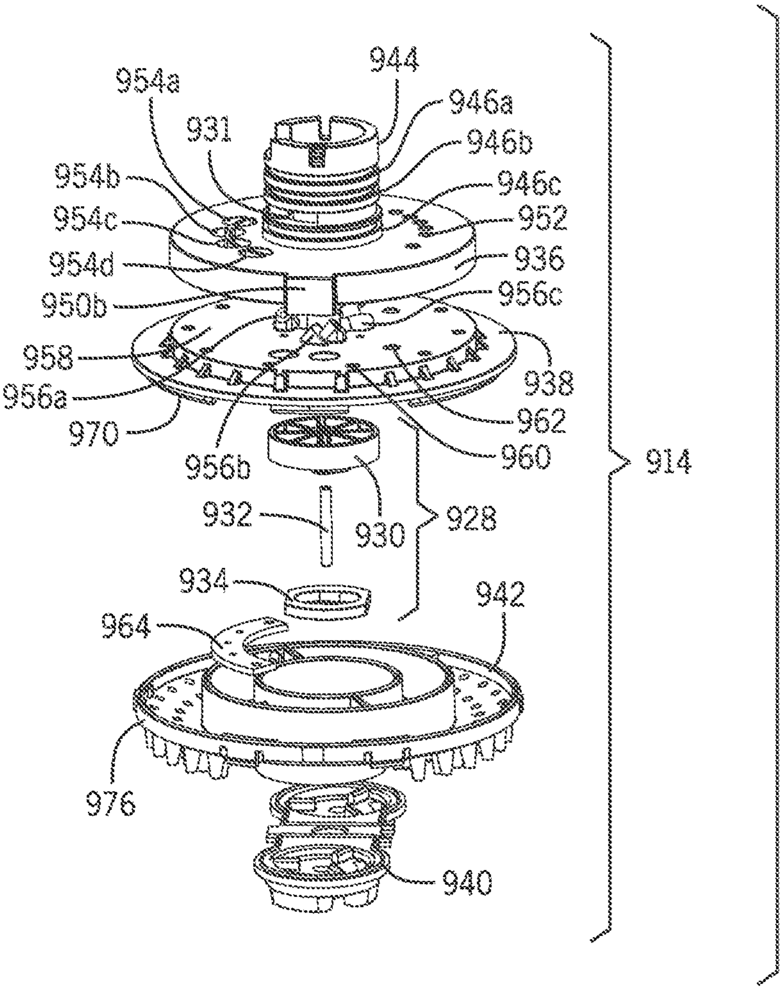
FIG. 31A is an exploded view of an engine of the showerhead of FIG. 28A.
Figure 31B:
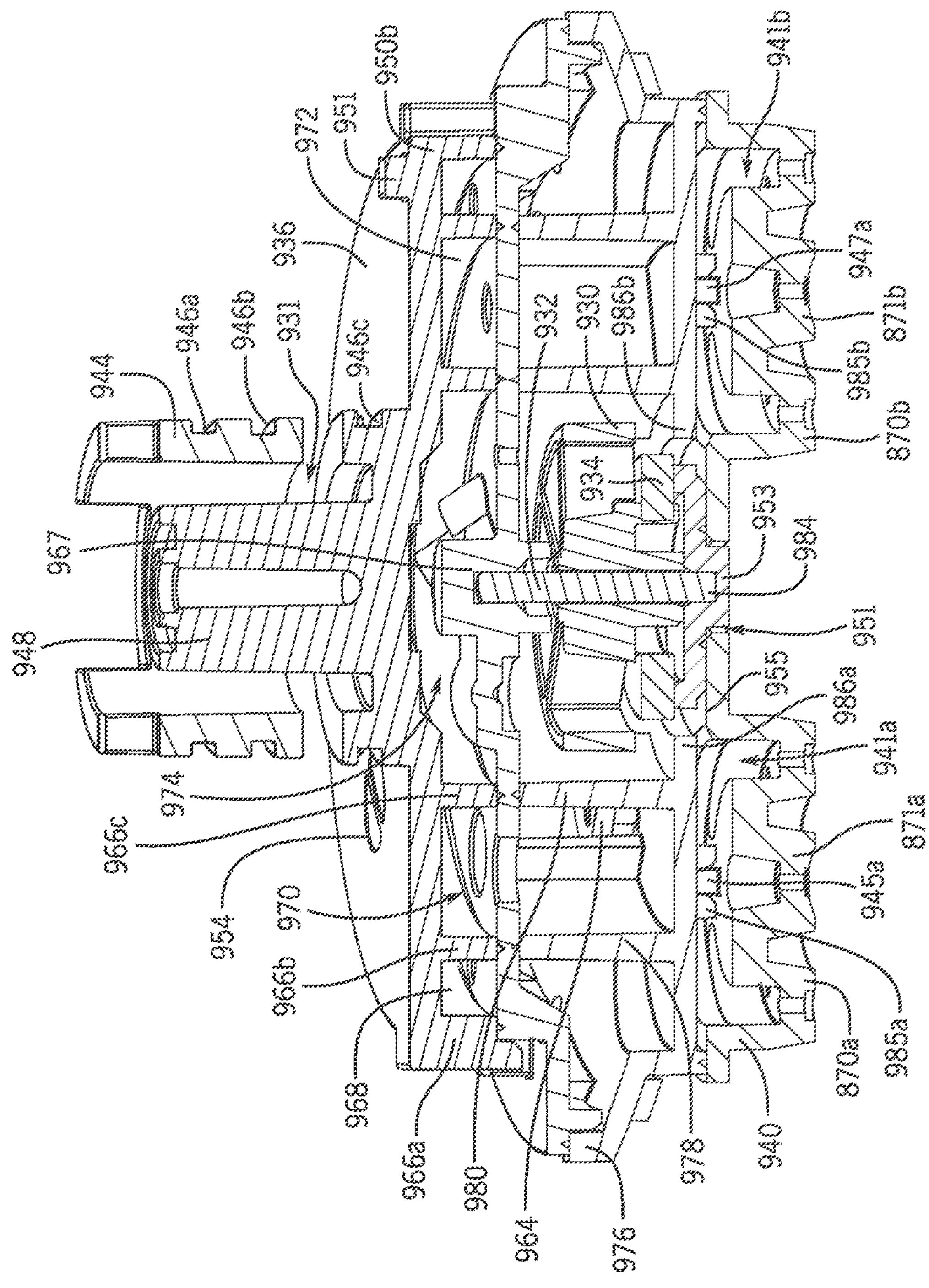
FIG. 31B is a cross-section view of the engine of FIG. 31A.

With reference to FIGS. 31A and 31B, the engine 914 will now be discussed in more detail. The engine 914 may include a plurality of flow directing plates 936, 938, 940, a spray cap 940, mist plate 964, and a water direction assembly 928. The water direction assembly 928 may be substantially similar to the water direction assembly 180 and operate in a similar manner. In one example, the water direction assembly 928 may include a turbine 930, pin 932, and a shutter 934, which may be similar to their counterparts in the water direction assembly 180.

The middle flow directing plate, which may also be a jet plate 938 is configured to direct fluid into a desired nozzle group or nozzle apertures formed in the front plate 942. With reference to FIGS. 31A and 31B, the jet plate 938 may be formed as a circular disc and include a one or more jets 956*a*, 956*b*, 956*c* spaced around a central post 967. The jets are angled and configured to receive water and direct the water at an angled stream toward the turbine 930. The spacing and angles of the jets 956*a*, 956*b*, 956*c* may be varied depending on the location and structure of the water direction assembly 928.

A retaining lip 970 may extend downward from a top surface of the jet plate 938 and be positioned radially inward from an outer perimeter of the jet plate 938. The retaining lip 970 may be discontinuous to define two or more arc portions or may be continuous defining a singular annular lip.

With continued reference to FIGS. 31A and 31B, jet plate 938 may include mode apertures 958, 960, 962 corresponding to the different modes (in some embodiments, the jets 956*a*, 956*b*, 956*c* form a mode aperture or inlet). The mode apertures 958, 960, 962 are spaced at various locations across the jet plate 938 depending on a desired location of the outlet nozzles corresponding to each of the modes. The number and positioning of the mode apertures 958, 960, 962 may vary. In one embodiment, the first or full body mode apertures 958 are formed as ten apertures spaced in a circular arrangement on the outer perimeter of the jet plate 958. Second or mist mode apertures 960 may be defined as two larger apertures positioned side by side radially inward from the full body mode apertures 958, but radially outward from the jets 956*a*, 956*b*, 956*c*. Third or concentrated spray mode apertures 962 may be formed as a set of four apertures having a diameter larger than the full mode apertures 958, but smaller than the mist apertures 960. The concentrated spay mode apertures 962 may be positioned at the same radial location on the jet plate 938 as the mist mode apertures 960 with three apertures grouped adjacent one another and a fourth spaced apart from the grouped apertures. It should be understood that the sizing, configuration, and grouping the mode apertures varies depending on the desired mode types and nozzle groupings of the showerhead 860, as such the discussion of any particular arrangement is meant as illustrative only.

Figure 32:
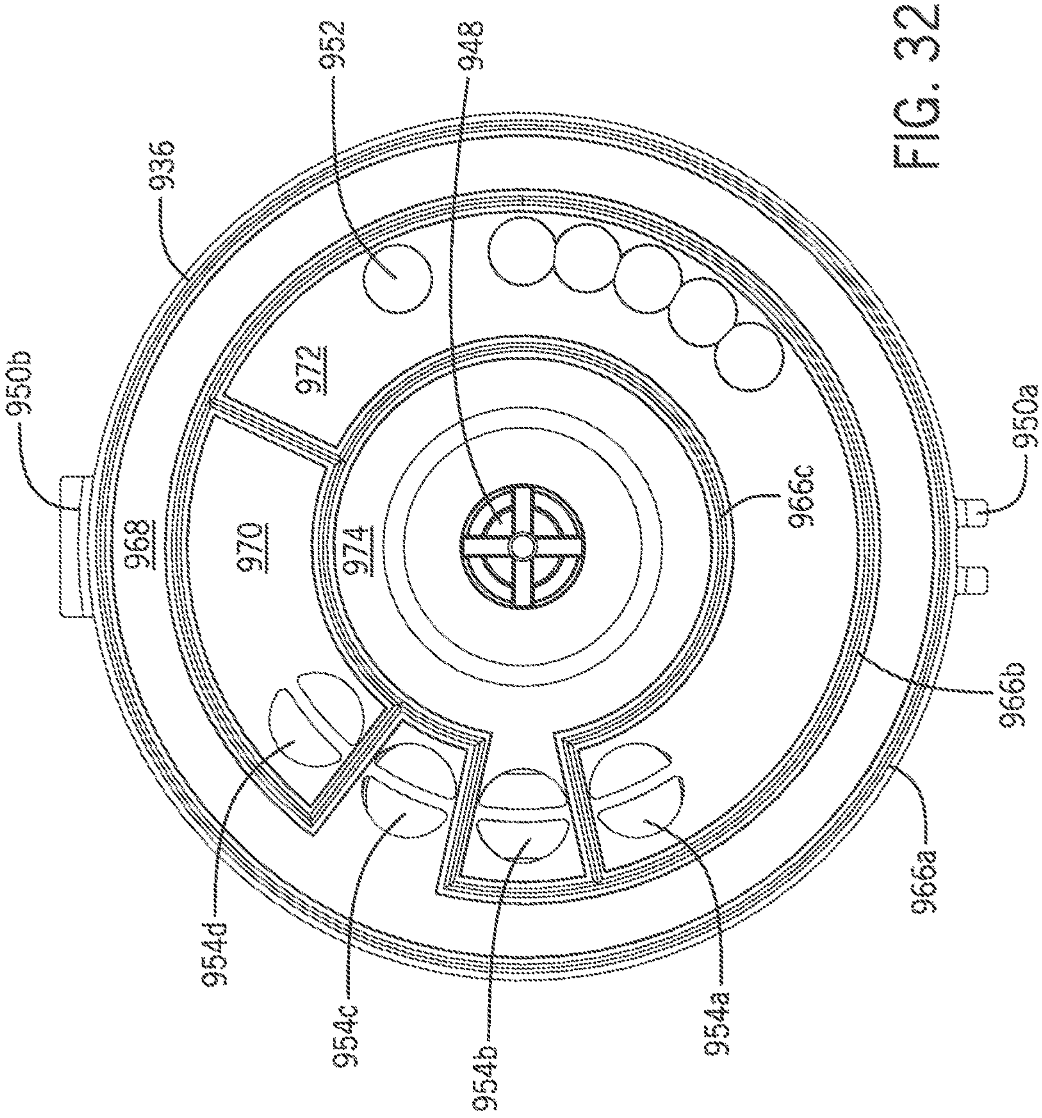
FIG. 32 is a front plan view of a back plate of the engine of FIG. 31A.

The back plate 936 engages with the mode assembly 892 to direct water to a particular nozzle group. FIG. 32 is a bottom plan view of the back plate 936. With reference to FIGS. 31A-32, the back plate 936 may be formed as a generally circular plate including a sidewall extending around the perimeter and a raised connection boss 944 extending from a center of the top surface. The connection boss 944 may include one or more sealing grooves 946*a*, 946*b*, 946*c* that may extend annularly around the outer surface thereof and an engine port 931 defined through a sidewall thereof. A fastening post 948 extends upwards from the top surface of the back plate 936 and may be positioned radially inward from the connection boss 944, such that the connection boss 944 encircles the connection post 948. The connection post 948 may defining a fastening cavity or recess.

A plurality of mode apertures 954*a*, 954*b*, 954*c*, 954*d* are defined through the top surface of the back plate 936. The mode apertures 954*a*, 954*b*, 954*c*, 954*d* may be shaped as desired, but in one embodiment are shaped as circular apertures having a support rib extending across a width thereof. A plurality of detents 952 may be formed as recesses on the top surface on an opposite side of the top surface from the mode apertures 954*a*, 954*b*, 954*c*, 954*d* with the number of the detents 952 generally corresponding to the number of modes, plus an optional trickle or pause mode.

The back plate 936 includes one or more engagement features, which may be defined a portion of the outer sidewall. In one example, a first engagement feature 950*a* is defined as two parallel ribs spaced apart from another defining a gap therebetween and a second engagement feature 950*b* is defined a tab extending outward from the sidewall, which may be positioned opposite of the first engagement feature 950*a*.

With reference to FIG. 32, the black plate 936 includes a plurality of flow directing walls to define flow channels or pathways through the showerhead 860 corresponding to each of the discrete modes. Each flow directing walls 966*a*, 966*b*, 966*c* may be formed, in part, as concentric arcs and may include end walls extending perpendicular to the arc sections to separate the different modes. With the flow directing walls 966*a*, 966*b*, 966*c* mode channels 968, 970, 972, 974 may be defined. The first mode channel 968 may correspond to a first or full body mode, the second or mist mode channel 970 corresponds to a mist mode and is in fluid communication with the mist apertures 960, a third or concentrated spay mode channel 972 may correspond to the concentrated spay apertures 962, and the forth mode channel 974 may correspond to a massage or divided mode.

Figure 33A:
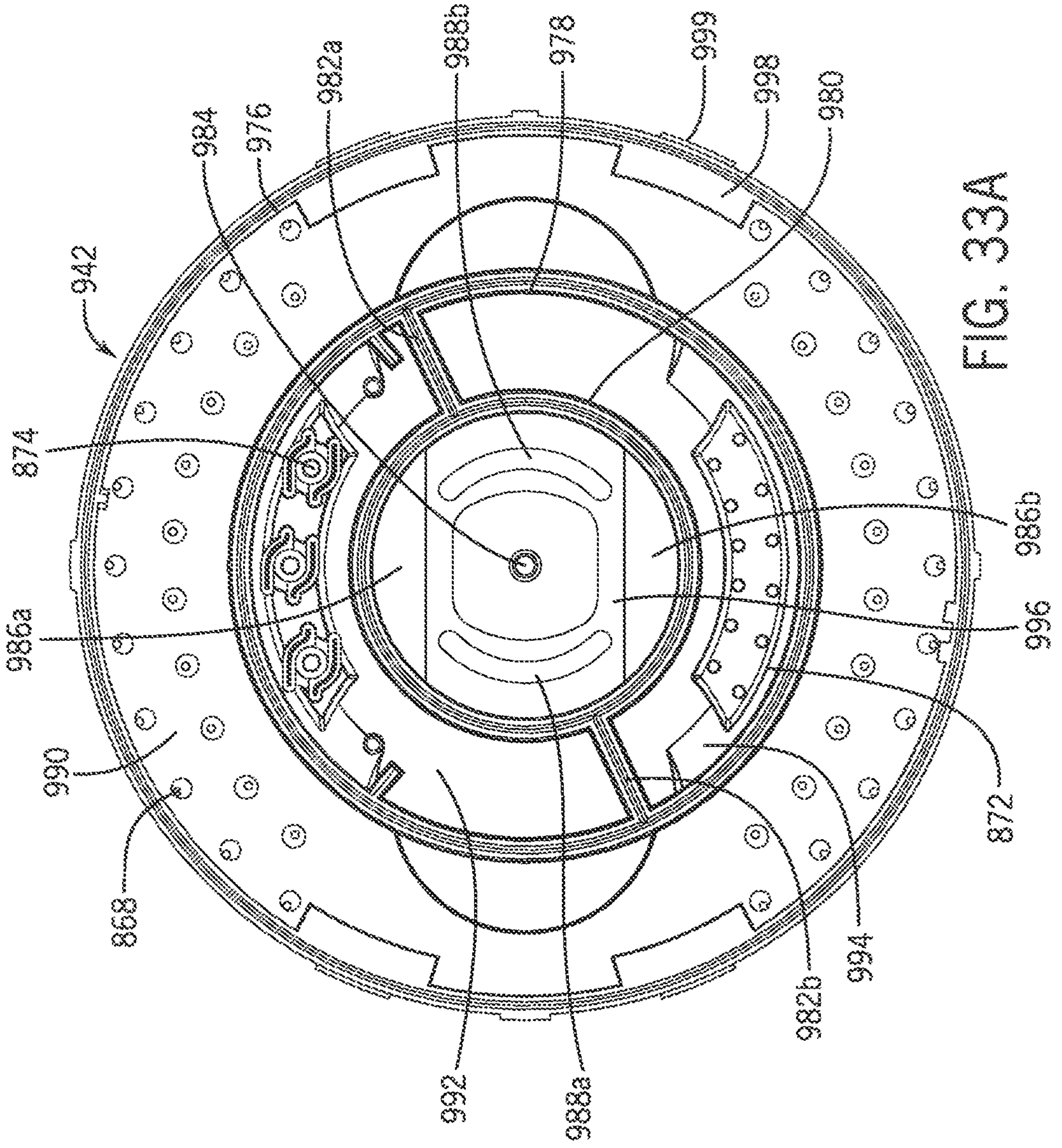
FIG. 33A is a rear plan view of a first example of a front plate of the engine of FIG. 31A.
Figure 33B:
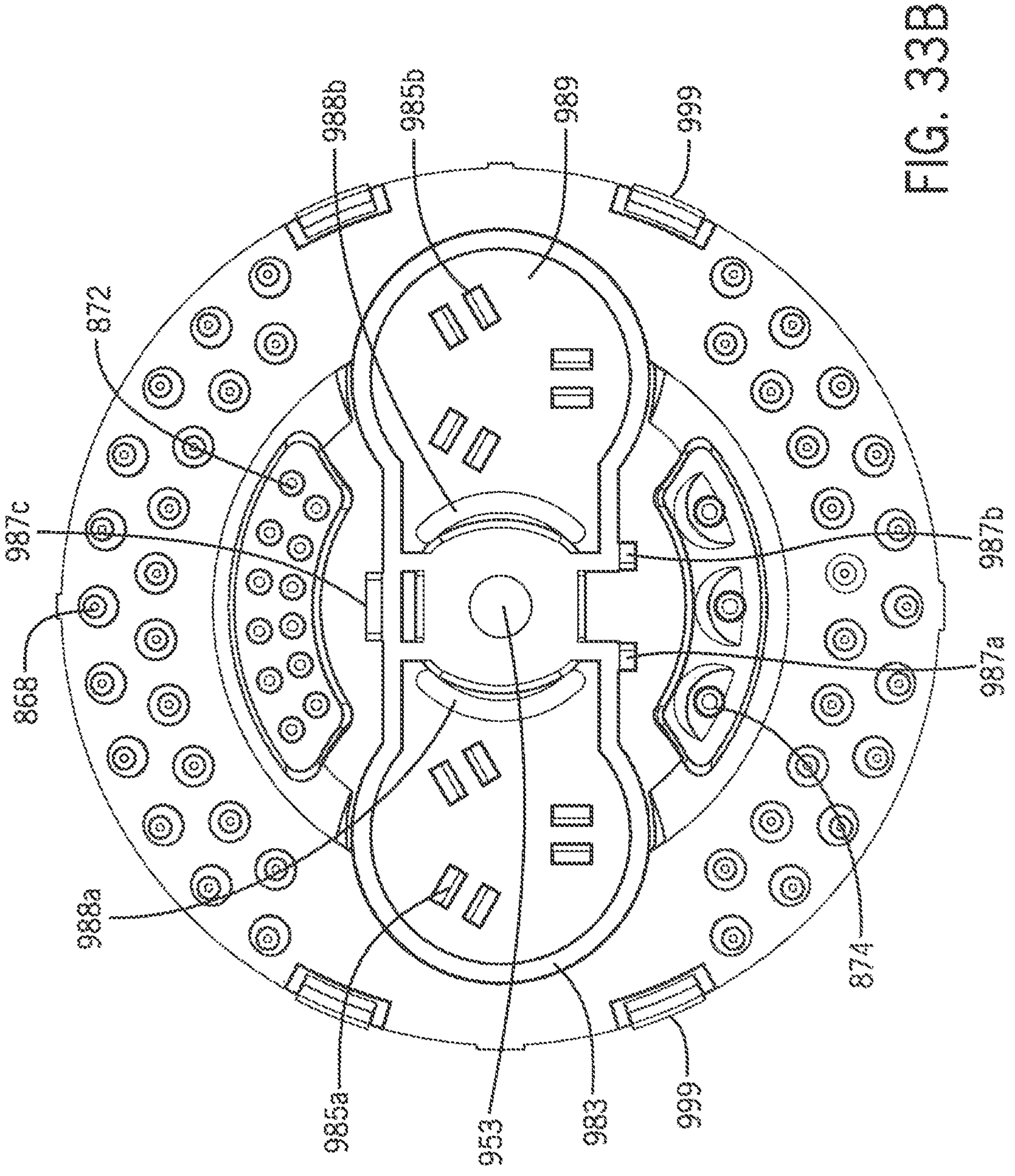
FIG. 33B is a front plan view of the first example of a front plate of FIG. 33A.

FIGS. 33A and 33B illustrate top and bottom plan views of the front plate 942. The front plate 942 may be convexly shaped and define a plurality of flow channels on its interior surface. In one example, the front plate 942 includes flow directing walls 976, 978, 980, 982*a*, 982*b* to define a plurality of flow channels. In one example, a perimeter flow directing wall 976 is defined around a perimeter of the front plate 942, a second flow directing wall 978 is defined radially inward from the perimeter flow directing wall 976 and may be circularly shaped, a third flow directing wall 980 is located radially inward from the second flow directing wall 978 and may also be circularly shaped such that the first three flow directing walls 976, 978, 980 define concentric circular rings extending upwards from the interior surface of the front plate 942. The fourth flow directing walls 982*a*, 982*b* may be defined a straight walls that intersect the second and third walls 978, 980, such as to bisect the walls. \In this example, a first flow channel 990 corresponding to a first or full body mode is defined between the outer perimeter wall 976 and the second flow directing wall 978, a second flow channel 992 is defined between a first side of the fourth flow directing walls 982*a*, 982*b*, the second flow directing wall 978, and the third flow directing wall 980, a third flow channel 994 is defined between the second side of the fourth flow directing walls 982*a*, 982*b*, the second flow directing wall 978, and the third flow directing wall 980, and a fourth flow channel 996 is defined by the third flow directing wall 980.

With reference to FIG. 33A, constraining walls 986*a*, 986*b* extend upwards and into the fourth flow channel 996 to define a track for the shutter. The constraining walls 986*a*, 986*b* may be parallel to one another and define straight edges within the circular compartment defined by the third flow directing wall 980. A pin recess 984 is defined in the center surface of the fourth flow channel 996 between the two constraining walls 986*a*, 986*b*. Division ports 988*a*, 988*b* are defined through the bottom surface of the front plate 942 and may be shaped as opposing arcs that are arranged on either side of the pin recess 984 and between the two constraining walls 986*a*, 986*b*.

Figure 33C:
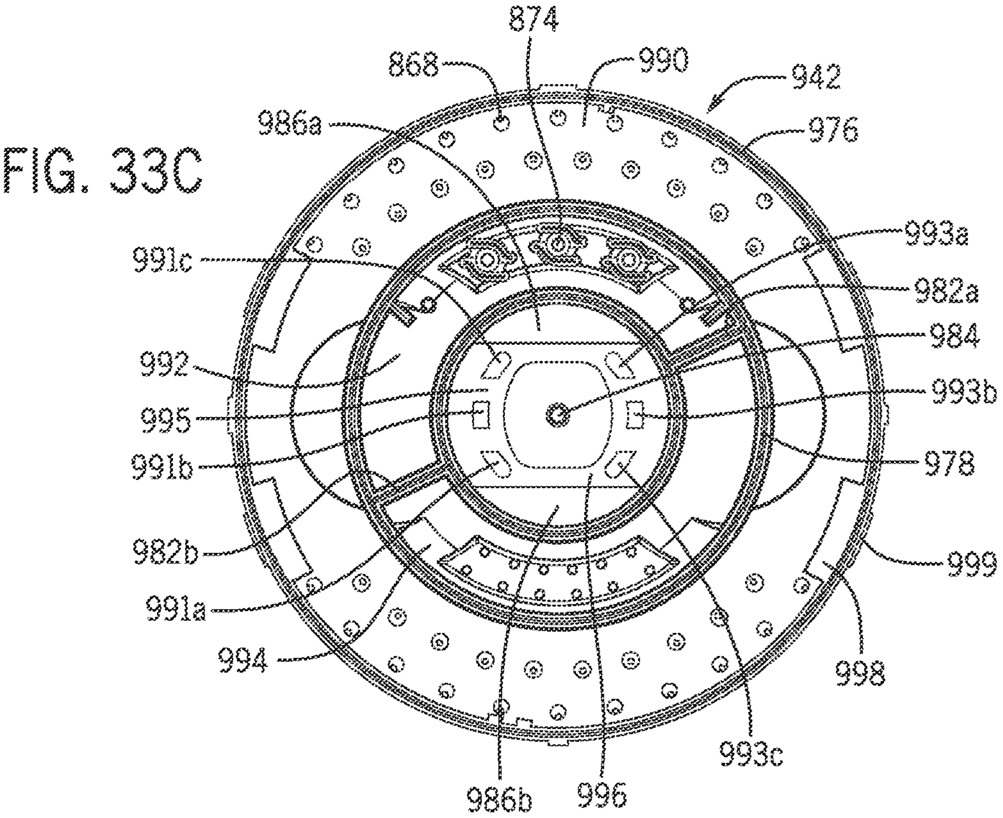
FIG. 33C is a rear plan view of a second example of a front plate of the engine of FIG. 31A.
Figure 33D:
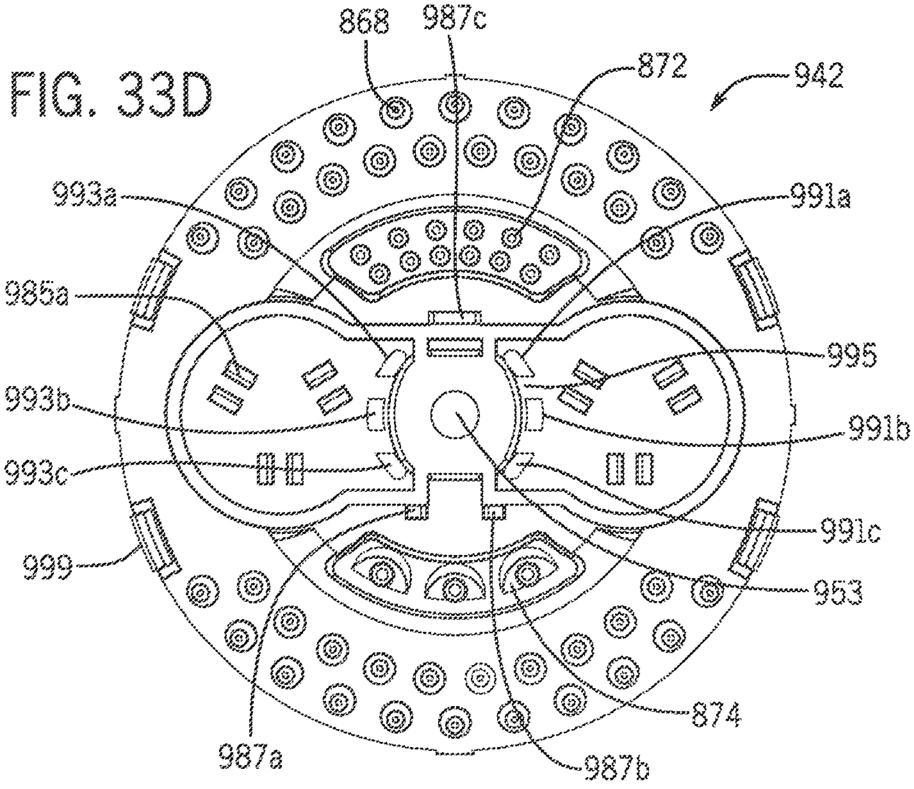
FIG. 33D is a front plan view of the second example of a front plate of FIG. 33B.

In other embodiments, the division ports may include one or more support ribs spanning the openings. With reference to FIGS. 33C and 33D, in this example of the front plate 942, the division ports 991, 993 are divided into two or more openings 991*a*, 991*b*, 991, 993*a*, 993*b*, 993*c* by one or more ribs 995. The ribs 995 may be formed integrally with the bottom surface of the front plate 942 and help to reduce the normal force between the shutter and the face plate. Further, the ribs 995 may help to prevent the shutter from catching on the end wall of the unobstructed ports 998*a*, 988*b*. It should be noted that the structure and configuration of the ports, including whether or not they include ribs, may be varied, depending on the operating pressures, as well as the rotational speed of the turbine and shutter.

Varying connection tabs 998,999 may be defined on the outer sidewall of the front plate 942 and/or extend from a top rim toward a center of the front plate 942. The configuration and spacing of the tabs 998, 999 may vary depending on the connection mechanisms desired.

With reference to FIG. 33B, the exterior surface of the front plate 942 defines a plurality of nozzles arranged in select nozzle groups. A first nozzle group 868 includes two banks arranged on top and bottom ends of the plate 942 and arranged in two curved arcs of nozzles, positioned just radially inward of the outer perimeter edge of the plate 942. A second nozzle group 874 is positioned above a top bank of the first nozzle group 868 and may be defined as a single arc of nozzles. A third nozzle group 872 is positioned beneath a top bank of the first nozzle group 868 and includes two arcs of nozzles clustered together and optionally include a smaller diameter than the nozzles in the first group 868.

With continued reference to FIG. 33B, a spray cap engagement surface 989 is defined as a raised platform on the outer surface of the front plate 942. The spray cap engagement surface 989 is in fluid communication with the division ports 988*a*, 988*b* and may include mirror connection structures for each port 988*a*, 988*b*. In one example two banks of engagement prongs 985*a*, 985*b* (each of which may include three sets of engagement prongs) may extend outwards form the spray cap engagement surface 989. A spray cap wall 983 surrounds the engagement surface 989 and may be shaped as a rectangular bar having two semicircular landing areas on each end. Further, attachment prongs 987*a*, 987*b*, 987*c* may be positioned opposite one another on an outer surface of the spray cap wall 983 at a center of the wall 983. A raised nub 953 may be defined in the center of the spray cap engagement surface 989 and may extend outwards therefrom.

Figure 34:
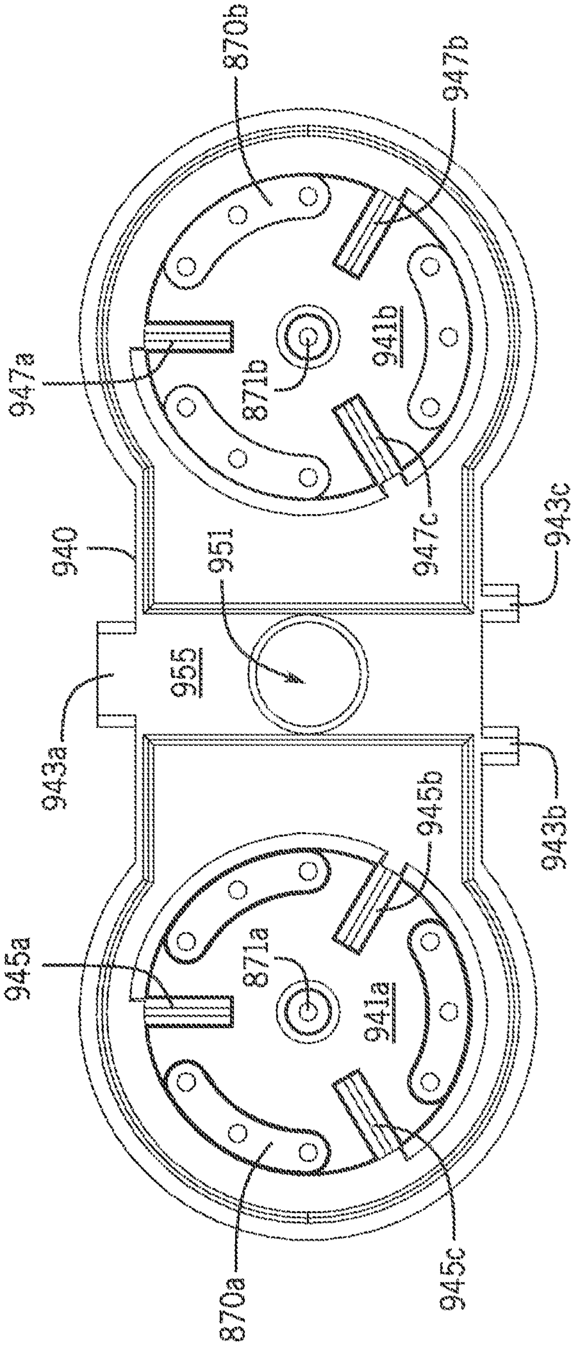
FIG. 34 is a rear plan view of a spray cap of the showerhead of FIG. 28A.
Figure 35:
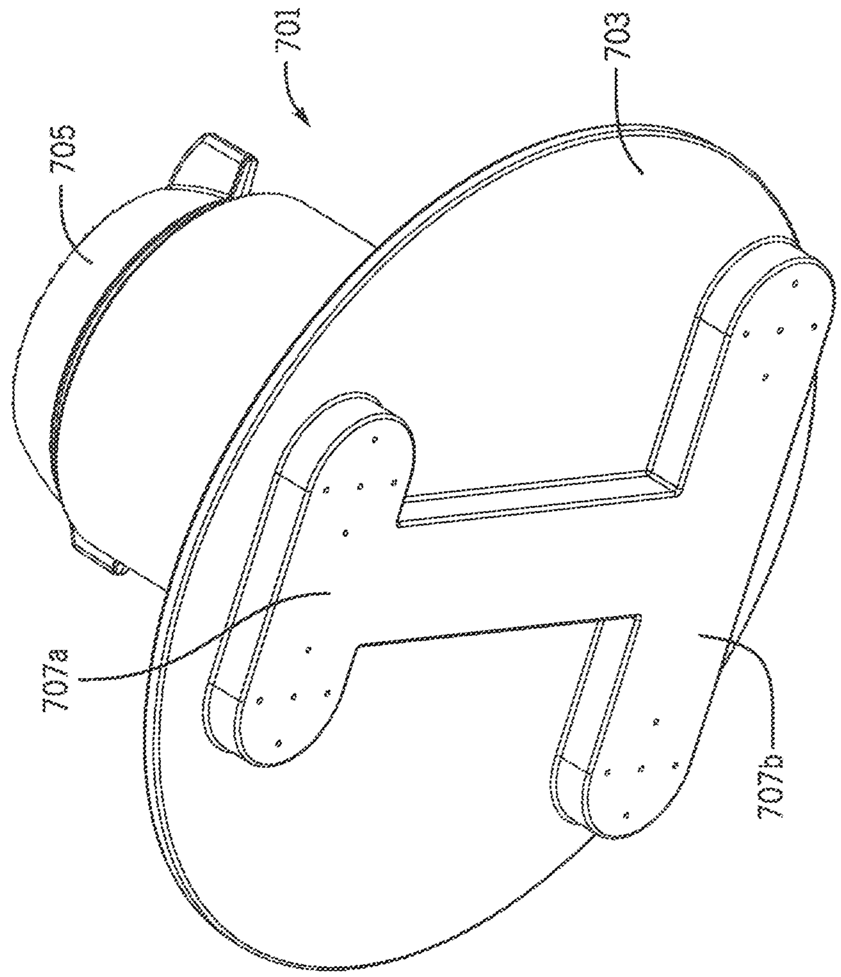
FIG. 35 is a front isometric view of a spray engine including a remote porting assembly for providing spatially separated massage banks.
Figure 36:
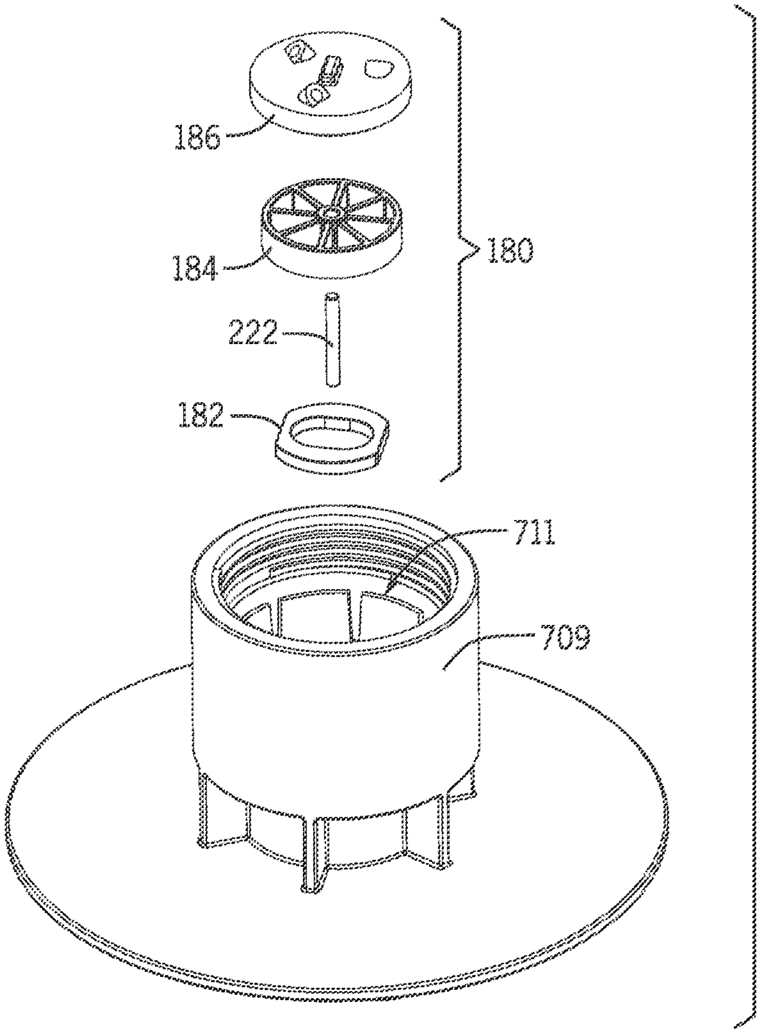
FIG. 36 is an exploded view of the spray engine of FIG. 35.

With reference to FIGS. 31B and 34, the spray cap 940 is configured to engage with the front plate 942 to define a secondary level of outlet nozzles. The spray cap 940 may be defined as a planar member including a support bridge 955 spanning between and structurally connecting two nozzle supports, which may be shaped as cylindrical bodies. A connection aperture 951 may be defined through a center of the support bridge 955 and may be shaped as a circular aperture. Connection tabs 943*a*, 943*b*, 943*c* may extend outward from sidewalls of the support bridge 955. A first massage chamber 941*a* and a second massage chamber 941*b* are defined on opposite sides of the bridge 955 in each of the cylindrical bodies. The bottom surface of the chambers includes a plurality of arc shaped nozzle banks 870*a*, 870*b* and optionally a center nozzle 871*a*, 871*b* defined in the center of the chamber 941*a*, 941*b*. In some examples, the nozzle banks 870*a*, 870*b*, may be formed as recessed compartments that extend downwards form the bottom surface of the chambers. Connection nubs 945*a*, 945*b*, 945*c*, 947*a*, 947*b*, 947*c* extend into the chambers 941*a*, 941*b* from the sidewalls of the cylindrical bodies.

Assembly of the showerhead 860 will now be discussed. With reference to FIGS. 31A and 31B, the engine may be assembled by securing the water direction assembly 928 and the mode spray plate 964 into a stacked arrangement of the flow directing plates. Specifically, the mode spray plate 964 may be positioned within the second flow channel 992 on the front plate 942 over the mode apertures 874 with optional stop walls holding the mode spray plate 964 in position. The water direction assembly 928 is inserted into the massage chamber 996 defined by the third flow directing wall 980 with the shutter 934 be connected around the cam of the turbine 930 and the pin 932 being received through the cam of the turbine 930 and then seated in the pin recess 984 on the bottom surface of the flow chamber 996. The shutter 934 is aligned such that the straight edges abut the edges of the constraining walls 986*a*, 986*b*.

The jet plate 938 is then positioned over the front plate 942, capturing the water direction assembly 928 therebetween. The pin 932 is received into the central post 967 of the jet plate 938. The mist mode apertures 960 are positioned above the mist mode flow channel 992, the full body mode apertures 958 are positioned above the full body flow channel 990 in the front plate 942, the concentrated spray apertures 962 are positioned above the concentrated spray mode channel 994 and the jets 956*a*, 956*b*, 956*c* are positioned above the massage channel 996 or chamber.

With reference to FIGS. 31B and 32, the back plate 936 is then positioned on top of the jet plate 938 and secured thereto. Connection tabs 950*a* may be received around a corresponding prong on the top surface of the jet plate 938 and connection tab 950*b* may be received between corresponding prongs on the to surface of the jet plate 938.

With reference to FIGS. 31B, 33B, and 34 the spray cap 940 is secured to the outer surface of the front plate 942. Specifically, the spray cap 940 is seated on and connected to the spray cap engagement surface 989. For example, the raised nub 953 of the front plate 942 is received within the connection aperture 951 formed in the bridge 955 of the spray cap 940. Tab 943*a* is positioned between tabs 987*a*, 987*b* and tabs 943*a*, 943*b* are positioned around tab 987*c* of the front plate 942. The prongs 985*a*, 985*b* in each landing pad of the engagement surface 989 capture nubs 945*a*, 945*b*, 945*c*, 947*a*, 947*b*, 947*c*.

With reference to FIGS. 29A, 29B, 30, once assembled, the engine 914 can be connected to the remaining components of the showerhead 860. In one example, the nozzle boot 904 is positioned on the face plate 942 and secured around the full body mode nozzles on the front plate 942. The feedback mechanism is inserted into the feedback cavity 912 of the mode housing 890, specifically, the spring 894 and plunger 896 are connected together and inserted into the feedback cavity 912. The mode seal assembly 892 is connected together such that the mode seal plate 902 is positioned over the mode seal 898 with the spring bosses 922 extending through the spring apertures in the seal plate 902. The springs 900*a*, 900*b* are received around the corresponding spring bosses 922 of the mode seal 898. The opposite end of the springs 900*a*, 900*b* are then received around the seal posts 916 of the mode seal housing 890.

Seals 888*a*, 888*b*, 888*c* are positioned within the annular grooves 946*a*, 946*b*, 946*c* of the connection boss 944 of the back plate 936 of the engine 914. The connection boss 944 of the back plate 936 is inserted through the connection boss 920 of the mode housing 890. The mode actuator 880 is received around the engine 914 and connects to the engagement tabs 918 of the mode housing 890 such that movement of the mode actuator 880 will rotate the mode housing 890. The face plate 906 seats over the nozzle boot 904, the spray cap 940, and the front plate 942 and seats within the mode actuator 880, allowing the mode actuator 880 to rotate without rotating the face plate 906.

To secure the engine 914 to the housing, the engine 914 and face plate 906 are positioned in the open end of the housing 868 and the fastener 884 is inserted into the a connection aperture in the upper surface of the housing 868 and then into the connection post 948 of the back plate 936 and secured. The engine cap 882 is then received within the cavity of the housing 868, enclosing the connection. The source connector 864 may then be threaded into the bottom terminal end of the handle portion of the housing 868.

Operation of the showerhead 860 will now be discussed. With reference to FIGS. 29A and 29B, water flows through the source connector 864 into a housing lumen 865 defined through the handle portion of the housing 868. From the housing 868, the water flows into a top end of the connection boss 944 of the back plate 936 of the engine, around the fastening post 948, and exits the connection boss 944 via the engine port 931. From the engine port 931, the water flows into the mode inlet 933 of the mode housing 890 and into the mode seal cavity 916. Water then flows into the mode aperture in the seal plate 902 and into the mode aperture 924 of the mode seal 898.

From the mode seal 898, the water is directed into a select mode aperture 954*a*, 954*b*, 954*c*, 954*d* of the back plate 936, with the aperture depending on a location of the mode housing 890 relative to the engine 914, e.g., as the mode housing 890 rotates, the mode seal aperture 924 aligns with different mode apertures 954*a*, 954*b*, 954*c*, 954*d* of the back plate 936. From the mode apertures 954*a*, 954*b*, 954*c*, 954*d*, the water is directed into a respective flow channel 968, 970, 972, 974.

With reference to FIGS. 29A, 29B, and 31B, in a first mode, the water is directed through the mode aperture 954*c* and into the flow channel 968, which then directs water through the full body apertures 958 defined through the jet plate 938. As the water flows through the jet plate 938, the water is directed into the first flow channel 990 of the front plate 942 and exits out of the first mode apertures 868. To change modes, the user grips the grip tab 876 on the mode actuator 880 and rotates in a first or second direction. Rotation of the actuator 880 causes the mode housing 890 to rotate correspondingly. As this occurs, the plunger 896 unseats from a detent 952, compressing the spring 894, until the mode housing 890 is rotated to reach the next adjacent detent 952. Simultaneously, the mode seal 898 moves along the top surface of the back plate 938 of the engine 914, with the springs 900*a*, 900*b* biasing the seal against the surface. When the user has reached the next position, the mode seal 898 fluidly connects the one or more mode apertures 954*a*, 954*b*, 954*c*, 954*d* with water.

In a second mode, the water is directed into mode aperture 954*d* and into flow channel 970. From flow channel 970, the water flows into the mist mode apertures 960 of the jet plate 938 and is directed into the flow channel 992 in the front plate 942. From the flow channel 992, the water flows through the mode plate 964 and out the mode apertures 874.

In a third mode, the water is directed into mode aperture 954*a* and into flow channel 972 of the back plate 936. From the back plate 936, the water flows into the concentrated spay mode apertures 962 through the jet plate 938 and into the flow channel 994 in the front plate 942, and eventually out of the concentrated spay apertures 872.

In a fourth mode, water is directed into mode aperture 954*b* on the back plate 936 and into flow channel 974. From flow channel 974, the water enters into the jets 956*a*, 956*b*, 956*c* of the jet plate 938 and enters into the massage chamber 996. The water streams from the jets, impinges the turbine 930, causing the turbine 930 to rotate about pin 932, causing the shutter 934 to oscillate between first and second positions. In the first position, the shutter 934 uncovers the first division port 988*a* and closes the second division port 988*b* and in the second positon the shutter 934 closes the first port 988*a* and opens the second port 988*b*. From the ports 988*a*, 98*bb*, the water drops a level into the spray cap and fluid flows into the respective massage chamber 941*a*, 941*b*, with flow between the two chambers 941*a*, 941*b* blocked by the support bridge 955. The water then exits the massage nozzles 870*a*, 871*a*, 870*b*, 871*b*. As with showerhead 600, in some embodiments, the massage nozzles will have a smaller diameter as compared to the ports 988*a*, 988*b*, such that the fluid in the chambers 941*a*, 941*b* may not be emptied before the next allotment of water is deposited by the water direction assembly 928. This water back up helps to increase the exit force of the water, as well as smooth the water streams.

In some embodiments, the water direction assembly may be used to alternatingly direct flow to spatially separated nozzle banks, including those at opposite ends of a spray face. FIGS. 35-38B illustrate various views of a showerhead engine 701 with irregularly shaped nozzle banks at opposite sides of the spray face 703. In this example, the spray face 703 may be used to selectively direct pulses onto a user's face, such as to relieve sinus pressure and pain and in these instances the nozzle banks 707*a*, 707*b* may be arranged in an "I" or "T" structure corresponding to sinus cavity locations on a user's face. The engine 701 may be used with a fixed mount or handheld housing, such as the housings described herein, as well as the water direction assembly 180.

With reference to FIGS. 35-38B, the spray face 703 may include a bottom nozzle bank structure extending downward from the bottom surface. The nozzle bank structure may be shaped in the "I" or "T" shape described above and include a first nozzle bank 707*a* arranged in a first horizontal bank and a second nozzle bank 707*b* arranged in a second horizontal bank that may be longer than the first nozzle bank 707*a*. The two nozzle banks 707*a*, 707*b* may be connected by a straight portion that intersects both perpendicularly. First and second massage cavities or chambers 717*a*, 717*b* are formed within the bank structure and between a top surface of the spray face 703. The massage chambers 717*a*, 717*b* are fluidly separated from another by a raised section 721.

A connection boss 709 may be formed as a hollow cylindrical structure extending upward from the top surface of the spray face 703. The connection boss 709 may include internal threading to receive attachment, such as a J-pipe, pivot ball, or other structure to fluidly connect the spray face 703 to a water source.

Figure 37:
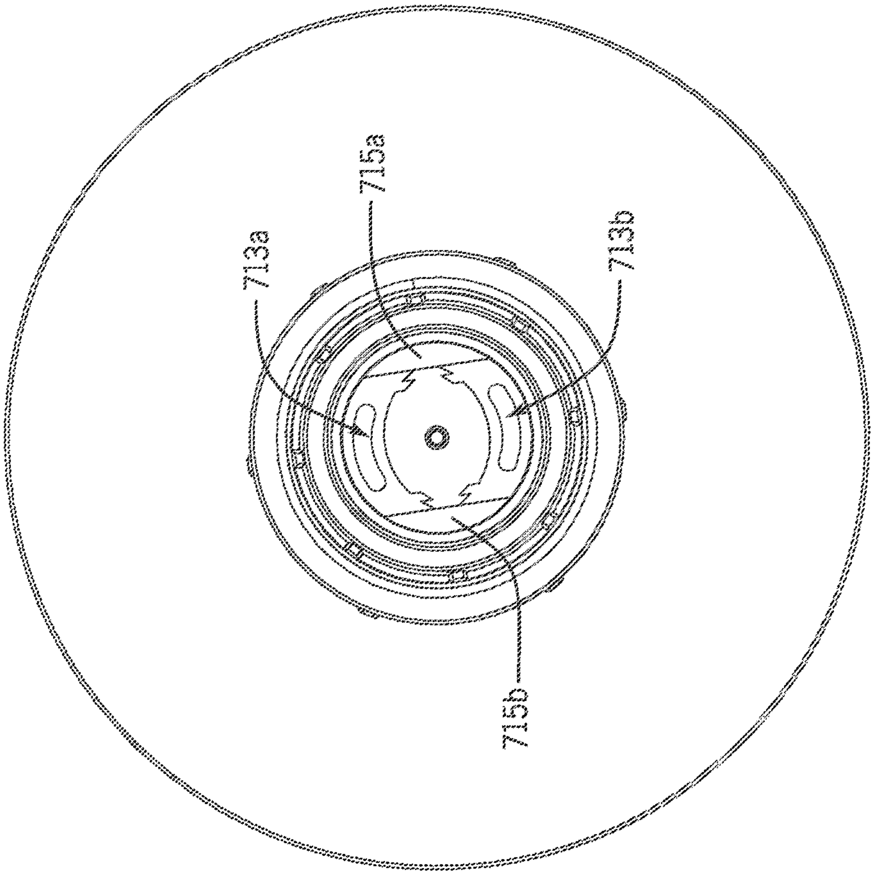
FIG. 37 is a rear plan view of a spray housing of FIG. 35.
Figure 38A:
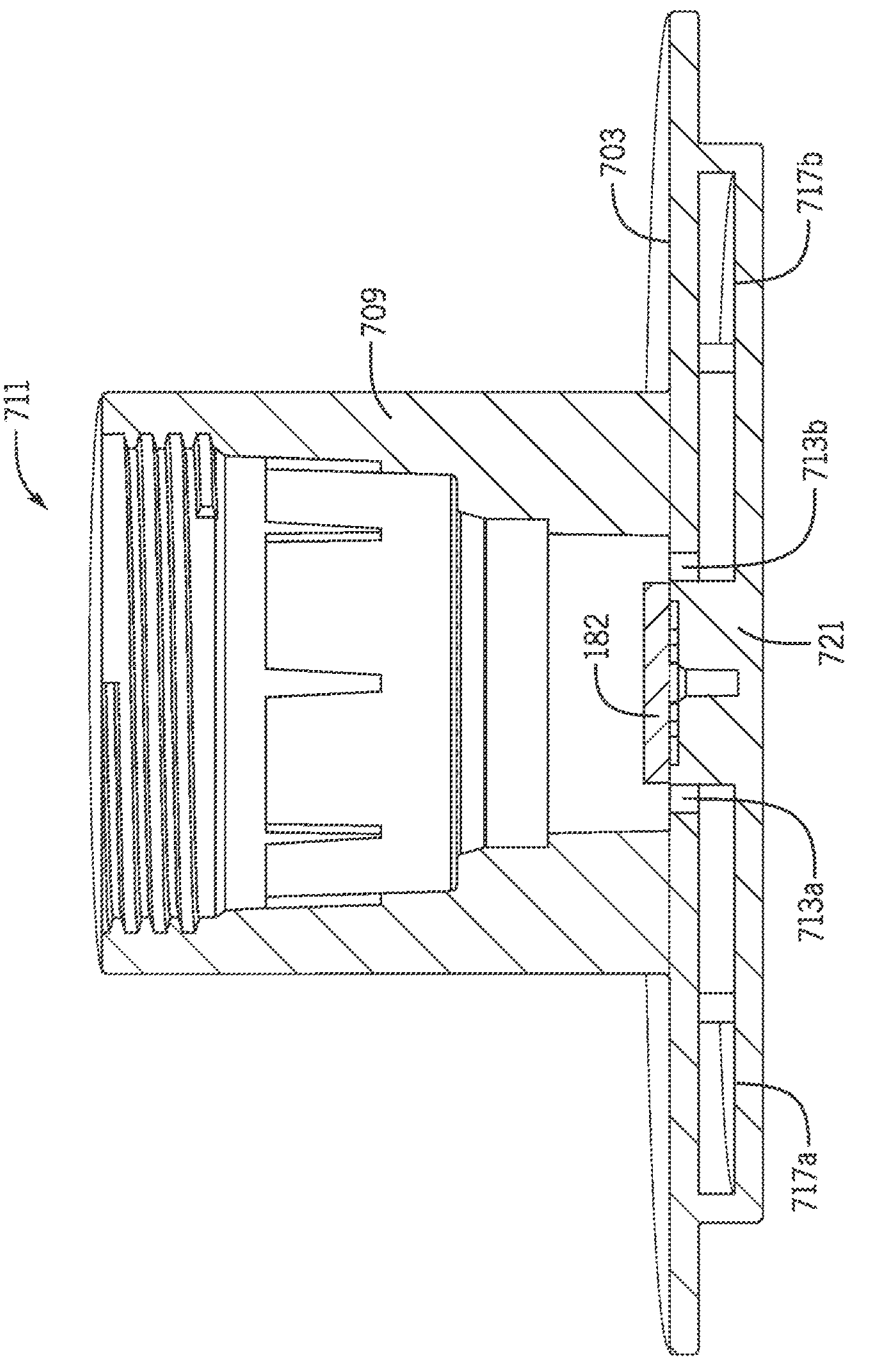
FIG. 38A is a cross-section view of the spray housing of FIG. 37.
Figure 38B:
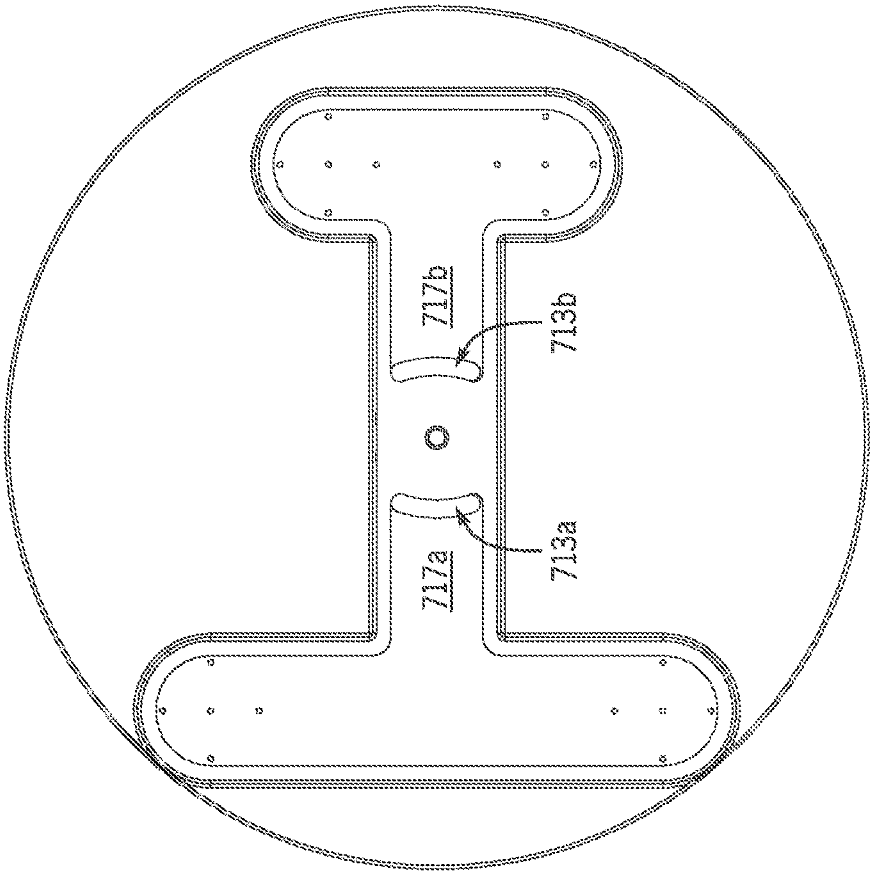
FIG. 38B is a second cross-section view of the spray housing of FIG. 37.

With reference to FIGS. 37-38B, a support structure 721 extends upwards from a bottom surface between the two massage chambers 717*a* 717*b*. The support structure 721 may include a pin recess in a central portion, as well as two outlet ports 713*a*, 713*b* defined an arc shaped apertures on opposing ends. Constraining walls 715*a*, 715*b* extend radially inward from an outer surface of the connection boss 709 surrounding the support structure 721.

In operation, the water direction assembly 180 alternatingly directs flow into the outlet ports 713*a*, 713*b*, which then port water into their respective chambers 717*a*, 717*b*. Due to the arrangement of the nozzle banks 707*a*, 707*b*, as fluid exits from the chambers 717*a*, 717*b*, the streams may generally align with a user's forehead and cheeks, providing massage pulses that may feel beneficial to a user experiencing sinus pressure and pain.

Figure 39C:
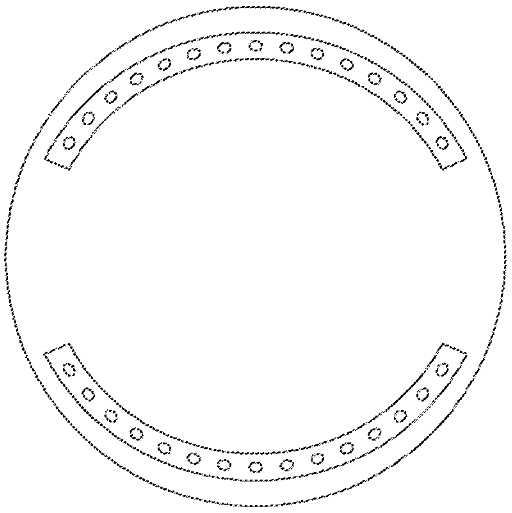
FIG. 39C is a third example of a spray face with nozzle banks that may be used with the showerheads and water division assemblies described herein.
Figure 39B:
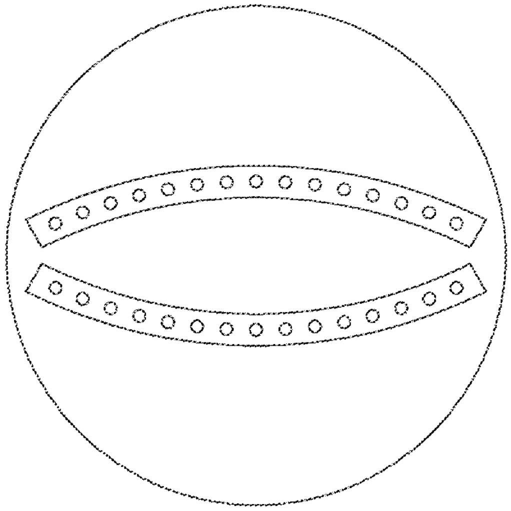
FIG. 39B is a second example of a spray face with nozzle banks that may be used with the showerheads and water division assemblies described herein.
Figure 39A:
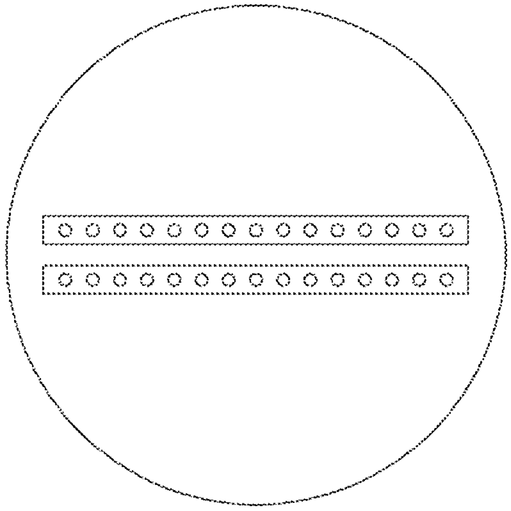
FIG. 39A is a first example of a spray face with nozzle banks that may be used with the showerheads and water division assemblies described herein.

FIGS. 39A-41 illustrate various examples of nozzle banks that can be used with the remote porting functionality provided by the water division assemblies described herein. As shown in FIGS. 39A-39C, the massage mode outlets may be arranged as parallel linear nozzle rows extending a height of the spray face (FIG. 39A), as curved or arc shaped arrays extending a height of the spray face (FIG. 39B), and/or as arc shaped nozzle banks on the outer perimeter of the spray face. These nozzle banks may be formed within the engine or as a separate spray cap that connects to a face plate of a showerhead engine.

Figure 40C:
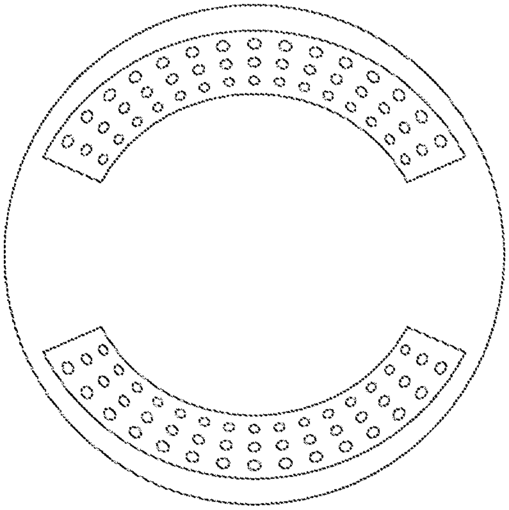
FIG. 40C is a sixth example of a spray face with nozzle banks that may be used with the showerheads and water division assemblies described herein.
Figure 40B:
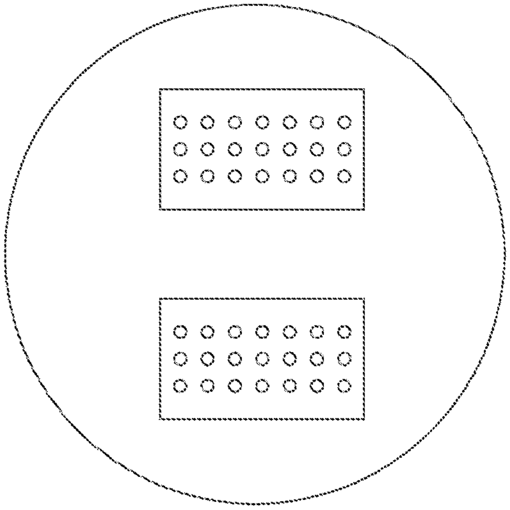
FIG. 40B is a fifth example of a spray face with nozzle banks that may be used with the showerheads and water division assemblies described herein.
Figure 40A:
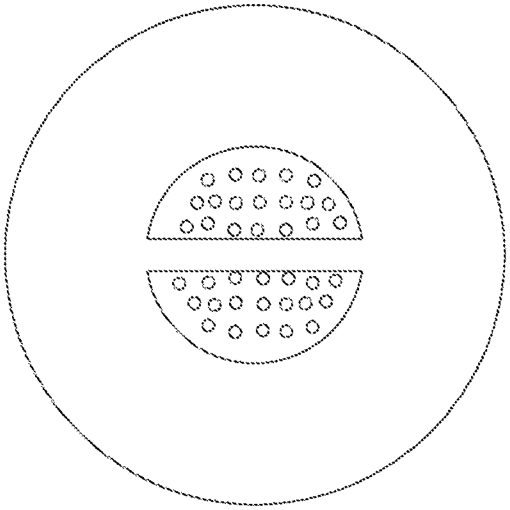
FIG. 40A is a fourth example of a spray face with nozzle banks that may be used with the showerheads and water division assemblies described herein.

FIGS. 40A-40B illustrate examples of clustered nozzle banks that may be fluidly connected to the massage producing water direction assembly 180. FIG. 40A illustrates a clustered nozzle bank of semicircular nozzle banks or pads. FIG. 40B illustrates a spray face with rectangular shaped massage pads or banks. FIG. 40C illustrates clustered arcs arranged on the outer perimeter with a dense nozzle arrangement.

Figure 41:
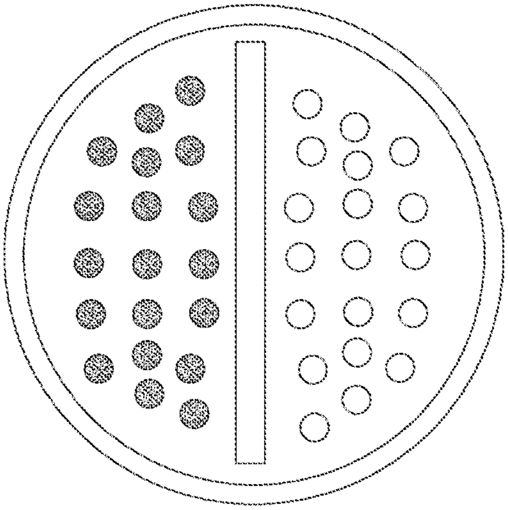
FIG. 41 is a seventh example of a spray face with nozzle banks that may be used with the showerheads and water division assemblies described herein.

In some instances the nozzles or outlets associated with the water divisional assembly 180 may be dispersed across the entirety of the spray face. FIG. 41 illustrates an example where half of the nozzles on the spray face are associated with a first outlet port and the second half are associated with a second outlet port. In this example, the showerhead or spray face may provide a full body pulsating massage stream as the two banks are alternatingly connected and disconnected from the fluid source.

CONCLUSION

It should be noted that any of the features in the various examples and embodiments provided herein may be interchangeable and/or replaceable with any other example or embodiment. As such, the discussion of any component or element with respect to a particular example or embodiment is meant as illustrative only.

It should also be noted that although the various examples discussed herein have been discussed with respect to showerheads, the devices and techniques may be applied in a variety of applications, such as, but not limited to, sink faucets, kitchen and bath accessories, lavages for debridement of wounds, pressure washers that rely on oscillating or pulsating flow for cleaning, car washes, lawn sprinklers, and/or toys.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the present disclosure, and do not create limitations, particularly as to the position, orientation, or use of the present disclosure unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In some instances, components are described by reference to "ends" having a particular characteristic and/or being connected with another part. However, those skilled in the art will recognize that the present disclosure is not limited to components which terminate immediately beyond their point of connection with other parts. Thus the term "end" should be broadly interpreted, in a manner that includes areas adjacent rearward, forward of or otherwise near the terminus of a particular element, link, component, part, member or the like. In methodologies directly or indirectly set forth herein, various steps and operations are described in one possible order of operation but those skilled in the art will recognize the steps and operation may be rearranged, replaced or eliminated without necessarily departing from the spirit and scope of the present disclosure. It is intended that all matter contained in the above description or shown in the accompanying drawings shall be interpreted as illustrative only and not limiting. Changes in detail or structure may be made without departing from the spirit of the present disclosure as defined in the appended claims.

The invention claimed is:

1. A method of reducing water flow through a showerhead, the method comprising:

dividing an inlet water stream into two separate water groups;

alternating the flow of water through the two separate water groups to reduce water flow through the showerhead, wherein:

dividing the water stream into two separate water groups comprises directing the water stream into an inlet of a first chamber or plenum defined within the showerhead and into an inlet of a second chamber or plenum defined within the showerhead;

dividing the water stream into two separate water groups further comprises directing the water stream out of at least two outlets of the first chamber or plenum and out of at least two outlets of the second chamber or plenum;

wherein dividing the water stream into two separate water groups further comprises directing the water stream out of the at least two outlets of the first chamber or plenum into a first group of nozzles and out of the at least two outlets of the second chamber or plenum into a second group of nozzles; and wherein nozzles in the first group of nozzles are intermixed amongst nozzles in the second group of nozzles across a faceplate of the showerhead.

2. The method of claim 1, wherein each of the first and second chambers or plenums is in selective fluid connection with a fluid inlet.

3. The method of claim 2, wherein each of the two first and second chambers or plenums is fluidly connected to a plurality of nozzles distributed along a faceplate of the showerhead.

4. The method of claim 3, further comprising maintaining substantially equal nozzle velocity across the plurality of nozzles.

5. The method of claim 2, further comprising defining the two separate chambers or plenums between two flow plates within the showerhead.

6. The method of claim 2, wherein dividing the water stream into two separate water groups comprises directing all of the water of the water stream at a first instance in time to one of the first or second chambers or plenums and directing all of the water of the water stream at a second instance of time to the other of the first or second chambers or plenums.

7. The method of claim 1, wherein the first group of nozzles and the second group of nozzles are positioned radially outward of a fluid inlet of the showerhead.

8. The method of claim 1, wherein dividing the water stream into two separate water groups further comprises directing the water stream out of an outlet of the first chamber or plenum that is laterally offset from and larger than the inlet of the first chamber or plenum and directing the water stream out of an outlet of the second chamber or plenum that is laterally offset from and larger than the inlet of the second chamber or plenum.

9. The method of claim 8, wherein dividing the water stream into two separate water groups further comprises directing the water stream out of the outlet of the first chamber or plenum into a first group of nozzles and out of the outlet of the second chamber or plenum into a second group of nozzles.

10. The method of claim 9, wherein nozzles in the first group of nozzles are intermixed amongst nozzles in the second group of nozzles across a faceplate of the showerhead.

11. The method of claim 9, wherein the first group of nozzles and the second group of nozzles are positioned radially outward of a fluid inlet of the showerhead.

12. The method of claim 1, wherein alternating the flow of water through the two separate water groups comprises oscillating a shutter between a first position fluidly connecting the first chamber or plenum defined within the showerhead with a fluid inlet of the showerhead and a second position fluidly connecting the second chamber or plenum defined within the showerhead with the fluid inlet.

13. The method of claim 12, wherein alternating the flow of water through the two separate water groups further comprises rotating a turbine to oscillate the shutter between the first position and the second position.

* * * * *